(12) United States Patent
Nammi et al.

(10) Patent No.: US 9,397,735 B2
(45) Date of Patent: Jul. 19, 2016

(54) RETRANSMISSION METHODS INCLUDING DISCONTINUOUS TRANSMISSION AND RELATED DEVICES

(71) Applicant: Telefonaktiebolaget L M Ericsson (publ), Stockholm (SE)

(72) Inventors: Sairamesh Nammi, Stockholm (SE); Namir Lidian, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 198 days.

(21) Appl. No.: 13/913,984

(22) Filed: Jun. 10, 2013

(65) Prior Publication Data

US 2014/0044028 A1    Feb. 13, 2014

Related U.S. Application Data

(63) Continuation-in-part of application No. PCT/SE2013/050488, filed on May 3, 2013, which is a continuation-in-part of application No. PCT/SE2013/050486, filed on May 3, 2013, (Continued)

(51) Int. Cl.
*H04L 1/18*    (2006.01)
*H04B 7/04*    (2006.01)

(Continued)

(52) U.S. Cl.
CPC .............. *H04B 7/0417* (2013.01); *H04L 1/06* (2013.01); *H04L 1/1812* (2013.01); *H04L 1/1825* (2013.01); *H04L 1/1845* (2013.01); *H04L 1/1887* (2013.01); *H04L 1/1893* (2013.01); *H04L 5/0094* (2013.01); *H04W 24/02* (2013.01);

(Continued)

(58) Field of Classification Search
None
See application file for complete search history.

(56) References Cited

U.S. PATENT DOCUMENTS

2004/0081181 A1    4/2004    Malkamaki
2006/0245524 A1    11/2006    Niederholz et al.

(Continued)

FOREIGN PATENT DOCUMENTS

EP    2 234 308 A1    9/2010
WO    WO 02/01749 A2    1/2002

(Continued)

OTHER PUBLICATIONS

3GPP TS 25.212 V11.0.0, 3rd Generation Partnership Project; Technical Specification Group Radio Access Network; Multiplexing and channel coding (FDD), (Release 11), (Dec. 2011).*

(Continued)

*Primary Examiner* — Alex Skripnikov
(74) *Attorney, Agent, or Firm* — Myers Bigel & Sibley, P.A.

(57) ABSTRACT

A method of operating a node of a radio access network may include transmitting first and second data blocks from the radio access network over respective first and second MIMO layers of a MIMO wireless channel to a wireless terminal during a first TTI. Responsive to receiving a NACK message for the second data block, downlink signaling for a second TTI may be transmitted from the radio access network to the wireless terminal with the downlink signaling including a DTX indicator for the first MIMO layer and a retransmission data indicator for the second MIMO layer. Responsive to receiving the NACK message for the second data block, the second data block may be retransmitted from the radio access network over the second MIMO layer to the wireless terminal during a second TTI.

24 Claims, 30 Drawing Sheets

Related U.S. Application Data application No. 13/913,984, which is a continuation-in-part of application No. PCT/SE2013/050487, filed on May 3, 2013.

(60) Provisional application No. 61/682,547, filed on Aug. 13, 2012, provisional application No. 61/694,519, filed on Aug. 29, 2012, provisional application No. 61/702,373, filed on Sep. 18, 2012.

(51) Int. Cl.

| | | |
|---|---|---|
| *H04W 72/04* | (2009.01) | |
| *H04W 24/02* | (2009.01) | |
| *H04L 1/06* | (2006.01) | |
| *H04L 1/00* | (2006.01) | |
| *H04L 5/00* | (2006.01) | |

(52) U.S. Cl.
CPC ............ *H04W 72/04* (2013.01); *H04L 1/0026* (2013.01); *H04L 1/0071* (2013.01); *H04L 5/0023* (2013.01); *H04L 5/0026* (2013.01); *H04L 5/0046* (2013.01); *H04L 5/0055* (2013.01); *H04L 5/0057* (2013.01); *H04L 5/0098* (2013.01)

(56) References Cited

U.S. PATENT DOCUMENTS

| | | |
|---|---|---|
| 2007/0189231 A1 | 8/2007 | Chang et al. |
| 2008/0192718 A1 | 8/2008 | Jongren et al. |
| 2008/0192720 A1 | 8/2008 | Frederiksen et al. |
| 2009/0073904 A1 | 3/2009 | Ranta-aho et al. |
| 2009/0098876 A1* | 4/2009 | Khan et al. ................. 455/445 |
| 2009/0245212 A1 | 10/2009 | Sambhwani et al. |
| 2009/0327828 A1* | 12/2009 | Ojala .................... H04L 1/1887 714/749 |
| 2010/0316159 A1 | 12/2010 | Bo et al. |
| 2012/0269137 A1 | 10/2012 | Kang et al. |
| 2012/0269140 A1 | 10/2012 | Nam et al. |
| 2013/0028213 A1 | 1/2013 | Ko et al. |
| 2013/0047051 A1 | 2/2013 | Niewczas et al. |

FOREIGN PATENT DOCUMENTS

| | | |
|---|---|---|
| WO | WO 2008/054313 A1 | 5/2008 |
| WO | WO 2009/137646 A2 | 11/2009 |
| WO | WO 2012/095188 A1 | 7/2012 |

OTHER PUBLICATIONS

Alcatel-Lucent et al. "HARQ retransmission in UL MIMO", 3GPP TSG-RAN WG1 Meeting #69, R1-122464, Prague, Czech Republic, May 21-25, 2012, 5 Pages.
Ericsson "Transmission and Reception Procedures with DTX codeword in a Four branch MIMO system", 3GPP TSG-RAN WG1 #70bis, R1-124502, San Diego, USA, Oct. 8-12, 2012, 3 Pages.
Freescale Semiconductor Inc. "EUTRA Downlink MIMO configurations and comparisons", 3GPP TSG RAN WG1 #43, Tdoc R1-060248, Helsinki, Finland, Jan. 23-25, 2006, 5 Pages.
Huawei et al. "Retransmission for 4-branch MIMO", 3GPP TSG-RAN WG1 Meeting #70, R1-123819, Qingdao, China, Aug. 13-17, 2012, 6 Pages.
International Search Report and Written Opinion Corresponding to International Application No. PCT/SE2013/050487; Date of Mailing: Sep. 12, 2013; 14 Pages.
International Search Report and Written Opinion Corresponding to International Application No. PCT/SE2013/050488; Date of Mailing: Sep. 12, 2013; 12 Pages.
Invitation to Pay Additional Fees Corresponding to International Application No. PCT/SE2013/050486; Date of Mailing: Sep. 12, 2013; 7 Pages.

Nokia Siemens Networks, "Dual code word retransmission", 3GPP TSG RAN WG1 Meeting #70, R1-123718, Qingdao, P.R. China, Aug. 13-17, 2012, 3 Pages.
Qualcomm Europe "PDCCH Formats and Contents", 3GPP TSG-RAN WG1 #51, R1-074951, Jeju, Korea, Nov. 5-9, 2007, 7 Pages.
E. Telatar: "Capacity of Multi-antenna Gaussian Channels" European Transactions on Telecommunications, vol. 10, Nov. 1999, pp. 585-595.
I. Emre Telatar: "Capacity of Multi-antenna Gaussian Channels" Tech. Rep, 1995 :Bell Labs, Lucent Technologies, 28 pages.
International Preliminary Report on Patentability Corresponding to International Application No. PCT/SE2013/050486; Date of Mailing: Sep. 30, 2014; 28 pages.
International Preliminary Report on Patentability Corresponding to International Application No. PCT/SE2013/050487; Date of Mailing: Sep. 30, 2014; 16 pages.
TELETAR: "Capacity of Multi-antenna Gaussian Channels", Lucent Technologies, European Transactions on Telecommunications, vol. 10, pp. 585-595, Nov. 1999.
International Preliminary Report on Patentability Corresponding to International Application No. PCT/SE2013/050488; Date of Mailing: Oct. 22, 2014; 9 pages.
International Search Report and Written Opinion Corresponding to International Application No. PCT/SE2013/050486; Date of Mailing: Oct. 28, 2013; 21 pages.
Ericsson, "Transmission and Reception Procedures with DTX codeword in a Four branch MIMO System", 3GPP TSG-RAN WG1 #70bis, R1-124502, San Diego, USA, Oct. 8-12, 2012, 3 pages.
Ericsson: "Retransmission Operations in a 2 Codeword MIMO System" R1-122814, 3GPP TSG-RAN WG1 #69, Prague, Czech Republic, May 21-25, 2012, 8 pp.
Ericsson: "4-branch MIMO for HSDPA" R1-111763, 3GPP TSG-RAN WG1 Meeting #65, Barcelona, Spain, May 9-13, 2011, 17 pp.
Ericsson, "New WI: Four Branch MIMO transmission for HSDPA (core part)", 3GPP TSG-RAN Meeting #53, RP-111393, vol. 13.1.2; Fukuoka, Japan, Sep. 13-16, 2011, 6 pp.
Ericsson, "New WI: Four Branch MIMO transmission for HSDPA (feature part)", 3GPP TSG-RAN Meeting #53, RP-111393, vol. 13.1.2; Fukuoka, Japan, Sep. 13-16, 2011, 5 pp.
Ericsson, "New WI: Four Branch MIMO transmission for HSDPA (performance part)", 3GPP TSG-RAN Meeting #53, RP-111393, vol. 13.1.2; Fukuoka, Japan, Sep. 13-16, 2011, 5 pp.
ETSI TS 136 321 V10.4.0 (Jan. 2012), Technical Specification, LTE; Evolved Universal Terrestrial Radio Access (E-UTRA); Medium Access Control (MAC) protocol specification (3GPP TS 36.321 version 10.4.0 Release 10), 56 pages.
ETSI TS 136 211 V10.4.0 (Jan. 2012), Technical Specification, LTE; Evolved Universal Terrestrial Radio Access (E-UTRA); Physical channels and modulation (3GPP TS 36.211 version 10.4.0 Release 10), 103 pages.
ETSI TS 125 321 V10.5.0 (Jan. 2012), Technical Specification, Universal Mobile Telecommunications System (UMTS); Medium Access Control (MAC) protocol specification (3GPP TS 25.321 version 10.5.0 Release 10), 202 pages.
3GPP TS 25.321 V10.8.0 (Dec. 2012), 3rd Generation Partnership Project; Technical Specification Group Radio Access Network; Medium Access Control (MAC) protocol specification (Release 10), 198 pages.
Samsung, "Considerations on codewords to layers mapping for downlink MIMO", 3GPP TSG RAN WG1 Meeting #47bis, R1-070130; Sorrento, Italy, Jan. 15-19, 2007, 8pp.
Thomas Salzer, Huawei—HSPA session chairman, "Summary of 4-branch MIMO for HSPA session", 3GPP TSG-RAN WG1 Meeting #67, R1-114366, Item 6.4; San Francisco, CA USA, Nov. 14-18, 2011, 2 pp.
Ericsson, "Introduction of 4Tx_HSDPA", TSG-RAN1 Meeting #70bis, R1-124506, Change Request, 25.212, Version 11.0.0; San Diego, USA, Oct. 8-12, 2012, 45pp.

(56) References Cited

OTHER PUBLICATIONS

Ericsson, "Introduction of 4Tx_HSDPA in 25.331", 3GPP TSG-RAN WG2 Meeting #79bis, [*Draft*] R2-125043, Change Request, 25.331, Version 11.3.0; Bratislava, Slovakia, Oct. 8-12, 2012, 131pp.

3GPP TS 25.321 V11.0.0 (Dec. 2011) "Technical Specification Group Radio Access Network"; $3^{rd}$ Generation Partnership Project; Medium Access Control (MAC) Protocol Specification (Release 11), 198 pp.

3GPP TS 25.321 V11.3.0 (Dec. 2012) "Technical Specification Group Radio Access Network"; $3^{rd}$ Generation Partnership Project; Medium Access Control (MAC) Protocol Specification (Release 11), 207 pp.

Ericsson, "Selection of transport blocks with 2 codeword in four branch MIMO", 3GPP TSG-RAN WG2 Meeting #77, R2-120798; Dresden, Germany, Feb. 6-10, 2012, 3 pp.

Ericsson, "Data Bundling in a 2 codeword MIMO System", 3GPP TSG-RAN WG1 Meeting #68, R1-120356; Dresden, Germany, Feb. 6-10, 2012, 9 pp.

Ericsson, "Feedback Channel Design for four branch MIMO System", 3GPP TSG-RAN WG1 Meeting #68, R1-120361; Dresden, Germany, Feb. 6-10, 2012, 7 pp.

3GPP TSG RAN WG1 #51, R1-080263, Jan. 14-18, 2008, Sevilla, Spain.

3GPP TS 25.212 V11.0.0 (Dec. 2011), 3rd Generation Partnership Project; Technical Specification Group Radio Access Network; Multiplexing and channel coding (FDD) (Release 11), 129 pages.

\* cited by examiner

Figure 7A

|  | HARQ process | |
| --- | --- | --- |
|  | 1st HARQ | 2nd HARQ |
| 4Tx Streams Combinations | Stream 1, Stream 2 | Stream 3, Stream 4 |
|  | Stream 1, Stream 3 | Stream 2, Stream 4 |
|  | Stream 1, Stream 4 | Stream 2, Stream 3 |

Figure 7B

|  | HARQ process | |
| --- | --- | --- |
|  | 1st HARQ | 2nd HARQ |
| 3Tx StreamsCombinations | Stream 1, Stream 2 | Stream 3 |
|  | Stream 1, Stream 3 | Stream 2 |
|  | Stream 1 | Stream 2, Stream 3 |

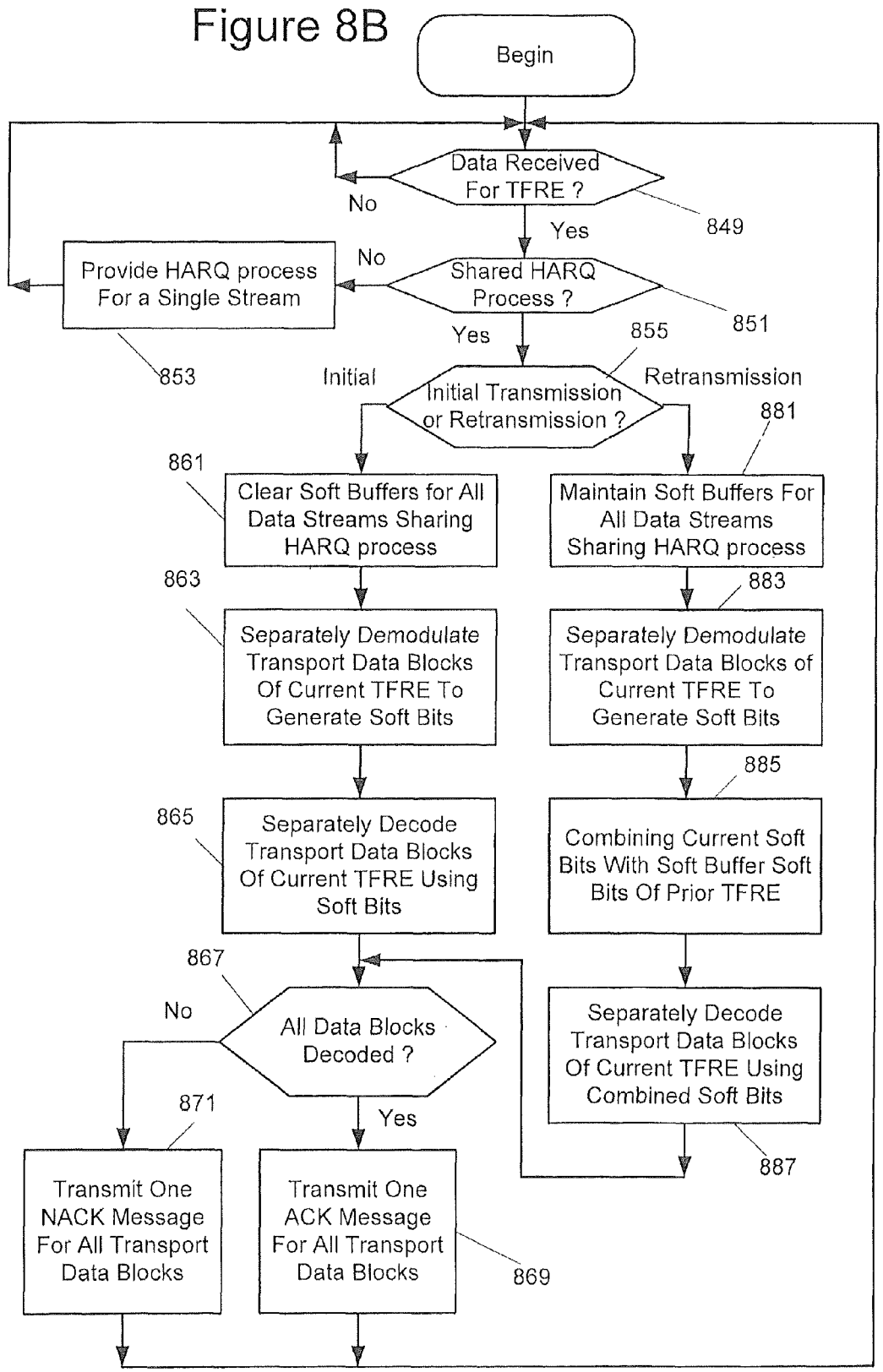

Figure 10

| Initial Transmission (Rank 1) | | Retransmission | | | |
|---|---|---|---|---|---|
| HARQ-1 | HARQ-2 | UE reported Rank | Scheduled Rank | HARQ-1 | HARQ-2 |
| P | -- | 4 | 4 | NT | NT |
| F | -- | 4 | 2 | OT | NT |
| P | -- | 3 | 3 | NT | NT |
| F | -- | 3 | 2 | OT | NT |
| P | -- | 2 | 2 | NT | NT |
| F | -- | 2 | 2 | OT | NT |
| P | -- | 1 | 1 | NT | --- |
| F | -- | 1 | 1 | OT | --- |

Figure 11

| Initial Transmission (Rank 2) | | Retransmission | | | |
|---|---|---|---|---|---|
| HARQ-1 | HARQ-2 | UE reported Rank | Scheduled Rank | HARQ-1 | HARQ-2 |
| P | P | 4 | 4 | NT | NT |
| P | F | 4 | 3 | NT | OT |
| F | P | 4 | 2 | OT | NT |
| F | F | 4 | 2 | OT | OT |
| P | P | 3 | 3 | NT | NT |
| P | F | 3 | 3 | NT | OT |
| F | P | 3 | 1 or 2 | OT | --- (with R1) or NT (with R2) |
| F | F | 3 | 2 | OT | OT |
| P | P | 2 | 2 | NT | NT |
| P | F | 2 | 2 | NT | OT |
| F | P | 2 | 2 | OT | NT |
| F | F | 2 | 2 | OT | OT |
| P | P | 1 | 1 | NT | ----- |
| P | F | 1 | 1 | ------ | OT |
| F | P | 1 | 1 | OT | ---- |
| F | F | 1 | 2 | OT | OT |

Figure 12

| Initial Transmission (Rank 3) | | Retransmission | | | |
|---|---|---|---|---|---|
| HARQ-1 | HARQ-2 | UE reported Rank | Scheduled Rank | HARQ-1 | HARQ-2 |
| P | P | 3 | 3 | NT | NT |
| P | F | 3 | 3 | NT | OT |
| F | P | 3 | 3 | OT | NT |
| F | F | 3 | 3 | OT | OT |
| P | P | 4 | 4 | NT | NT |
| P | F | 4 | 3 | NT | OT |
| F | P | 4 | 4 | OT | NT |
| F | F | 4 | 3 | OT | OT |
| P | P | 2 | 2 | NT | NT |
| P | F | 2 | 2 | NT | OT |
| F | P | 2 | 3 | OT | NT |
| F | F | 2 | 3 | OT | OT |
| P | P | 1 | 1 | NT | ----- |
| P | F | 1 | 1 | ------ | OT |
| F | P | 1 | 3 | OT | NT |
| F | F | 1 | 3 | OT | OT |

Figure 13

| Initial Transmission (Rank 4) | | Retransmission | | | |
|---|---|---|---|---|---|
| HARQ-1 | HARQ-2 | UE reported Rank | Scheduled Rank | HARQ-1 | HARQ-2 |
| P | P | 4 | 4 | NT | NT |
| P | F | 4 | 4 | NT | OT |
| F | P | 4 | 4 | OT | NT |
| F | F | 4 | 4 | OT | OT |
| P | P | 3 | 3 | NT | NT |
| P | F | 3 | 4 | NT | OT |
| F | P | 3 | 3 | OT | NT |
| F | F | 3 | 4 | OT | OT |
| P | P | 2 | 2 | NT | NT |
| P | F | 2 | 4 | NT | OT |
| F | P | 2 | 3 | OT | NT |
| F | F | 2 | 4 | OT | OT |
| P | P | 1 | 1 | NT | ----- |
| P | F | 1 | 4 | NT | OT |
| F | P | 1 | 3 | OT | NT |
| F | F | 1 | 4 | OT | OT |

Figure 14

| Rank | Layer | HARQ Process |
|---|---|---|
| 1 | Layer 1 (CW1) | HARQ-1 |
| 2 | Layer 1 (CW1) | HARQ-1 |
|   | Layer 2 (CW2) | HARQ-2 |
| 3 | Layer 1 (CW1) | HARQ-1 |
|   | Layer 2 (CW2) Layer 3 (CW3) | HARQ-2 |
| 4 | Layer 1 (CW1) Layer 4 (CW4) | HARQ-1 |
|   | Layer 2 (CW2) Layer 3 (CW3) | HARQ-2 |

Figure 15

| Initial Transmission (Rank 1) | | Retransmission | | | |
|---|---|---|---|---|---|
| HARQ-1 | HARQ-2 | UE reported Rank | Scheduled Rank | HARQ-1 | HARQ-2 |
| P | --- | 4 | 4 | NT | NT |
| F | --- | 4 | 3 | OT | NT |
| P | --- | 3 | 3 | NT | NT |
| F | --- | 3 | 3 | OT | NT |
| P | --- | 2 | 2 | NT | NT |
| F | --- | 2 | 2 | OT | NT |
| P | --- | 1 | 1 | NT | --- |
| F | --- | 1 | 1 | OT | --- |

Figure 16

| Initial Transmission (Rank 2) | | Retransmission | | | |
|---|---|---|---|---|---|
| HARQ-1 | HARQ-2 | UE reported Rank | Scheduled Rank | HARQ-1 | HARQ-2 |
| P | P | 4 | 4 | NT | NT |
| P | F | 4 | 2 | NT | OT |
| F | P | 4 | 3 | OT | NT |
| F | F | 4 | 2 | OT | OT |
| P | P | 3 | 3 | NT | NT |
| P | F | 3 | 2 | NT | OT |
| F | P | 3 | 3 | OT | NT |
| F | F | 3 | 2 | OT | OT |
| P | P | 2 | 2 | NT | NT |
| P | F | 2 | 2 | NT | OT |
| F | P | 2 | 2 | OT | NT |
| F | F | 2 | 2 | OT | OT |
| P | P | 1 | 1 | NT | ----- |
| P | F | 1 | 2 | NT | OT |
| F | P | 1 | 1 | OT | ---- |
| F | F | 1 | 2 | OT | OT |

Figure 17

| Initial Transmission (Rank 3) | | Retransmission | | | |
|---|---|---|---|---|---|
| HARQ-1 | HARQ-2 | UE reported Rank | Scheduled Rank | HARQ-1 | HARQ-2 |
| P | P | 4 | 4 | NT | NT |
| P | F | 4 | 4 | NT | OT |
| F | P | 4 | 3 | OT | NT |
| F | F | 4 | 3 | OT | OT |
| P | P | 3 | 3 | NT | NT |
| P | F | 3 | 3 | NT | OT |
| F | P | 3 | 3 | OT | NT |
| F | F | 3 | 3 | OT | OT |
| P | P | 2 | 2 | NT | NT |
| P | F | 2 | 3 | NT | OT |
| F | P | 2 | 2 | OT | NT |
| F | F | 2 | 3 | OT | OT |
| P | P | 1 | 1 | NT | ----- |
| P | F | 1 | 3 | NT | OT |
| F | P | 1 | 1 | OT | ----- |
| F | F | 1 | 3 | OT | OT |

Figure 18

| Initial Transmission (Rank 4) | | Retransmission | | | |
|---|---|---|---|---|---|
| HARQ-1 | HARQ-2 | UE reported Rank | Scheduled Rank | HARQ-1 | HARQ-2 |
| P | P | 4 | 4 | NT | NT |
| P | F | 4 | 4 | NT | OT |
| F | P | 4 | 4 | OT | NT |
| F | F | 4 | 4 | OT | OT |
| P | P | 3 | 3 | NT | NT |
| P | F | 3 | 3 | NT | OT |
| F | P | 3 | 4 | OT | NT |
| F | F | 3 | 4 | OT | OT |
| P | P | 2 | 2 | NT | NT |
| P | F | 2 | 4 | NT | OT |
| F | P | 2 | 4 | OT | NT |
| F | F | 2 | 4 | OT | OT |
| P | P | 1 | 1 | NT | ----- |
| P | F | 1 | 4 | NT | OT |
| F | P | 1 | 4 | OT | NT |
| F | F | 1 | 4 | OT | OT |

Figure 20A

| ACK/NACK Indication For First Transmission (Rank 4) | | UE Preferred Rank Indicator | NodeB Assigned Rank Indicator | Proposed Second Transmission | |
|---|---|---|---|---|---|
| HARQ-1 (CW-1) | HARQ-2 (CW-2) | | | HARQ-1 (CW-1) | HARQ-2 (CW-2) |
| ACK (P) | ACK (P) | 4 | N/A | - - - - | - - - - |
| ACK (P) | NACK (F) | 4 | 4 (or 3) | DTX | OT |
| NACK (F) | ACK (P) | 4 | 4 | OT | DTX |
| NACK (F) | NACK (F) | 4 | 4 | OT | OT |
| ACK (P) | ACK (P) | 3 | N/A | - - - - | - - - - |
| ACK (P) | NACK (F) | 3 | 4 (or 3) | DTX | OT |
| NACK (F) | ACK (P) | 3 | 4 | OT | DTX |
| NACK (F) | NACK (F) | 3 | 4 | OT | OT |
| ACK (P) | ACK (P) | 2 | N/A | - - - - | - - - - |
| ACK (P) | NACK (F) | 2 | 4 (or 3) | DTX | OT |
| NACK (F) | ACK (P) | 2 | 4 | OT | DTX |
| NACK (F) | NACK (F) | 2 | 4 | OT | OT |
| ACK (P) | ACK (P) | 1 | N/A | - - - - | - - - - |
| ACK (P) | NACK (F) | 1 | 4 (or 3) | DTX | OT |
| NACK (F) | ACK (P) | 1 | 4 | OT | DTX |
| NACK (F) | NACK (F) | 1 | 4 | OT | OT |

Figure 20B

| ACK/NACK Indication For First Transmission (Rank 3) | | UE Preferred Rank Indicator | NodeB Assigned Rank Indicator | Proposed Second Transmission | |
|---|---|---|---|---|---|
| HARQ-1 (CW-1) | HARQ-2 (CW-2) | | | HARQ-1 (CW-1) | HARQ-2 (CW-2) |
| ACK (P) | ACK (P) | 4 | N/A | - - - - | - - - - |
| ACK (P) | NACK (F) | 4 | 3 (or 4) | DTX | OT |
| NACK (F) | ACK (P) | 4 | 3 | OT | DTX |
| NACK (F) | NACK (F) | 4 | 3 | OT | OT |
| ACK (P) | ACK (P) | 3 | N/A | - - - - | - - - - |
| ACK (P) | NACK (F) | 3 | 3 (or 4) | DTX | OT |
| NACK (F) | ACK (P) | 3 | 3 | OT | DTX |
| NACK (F) | NACK (F) | 3 | 3 | OT | OT |
| ACK (P) | ACK (P) | 2 | N/A | - - - - | - - - - |
| ACK (P) | NACK (F) | 2 | 3 | DTX | OT |
| NACK (F) | ACK (P) | 2 | 3 (or 2) | OT | DTX |
| NACK (F) | NACK (F) | 2 | 3 | OT | OT |
| ACK (P) | ACK (P) | 1 | N/A | - - - - | - - - - |
| ACK (P) | NACK (F) | 1 | 3 | DTX | OT |
| NACK (F) | ACK (P) | 1 | 3 (or 1) | OT | - - - - |
| NACK (F) | NACK (F) | 1 | 3 | OT | OT |

Figure 20C

| ACK/NACK Indication For First Transmission (Rank 2) | | UE Preferred Rank Indicator | NodeB Assigned Rank Indicator | Proposed Second Transmission | |
|---|---|---|---|---|---|
| HARQ-1 (CW-1) | HARQ-2 (CW-2) | | | HARQ-1 (CW-1) | HARQ-2 (CW-2) |
| ACK (P) | ACK (P) | 4 | N/A | ---- | ---- |
| ACK (P) | NACK (F) | 4 | 2 | DTX | OT |
| NACK (F) | ACK (P) | 4 | 2 (or 3) | OT | DTX |
| NACK (F) | NACK (F) | 4 | 2 | OT | OT |
| ACK (P) | ACK (P) | 3 | N/A | ---- | ---- |
| ACK (P) | NACK (F) | 3 | 2 | DTX | OT |
| NACK (F) | ACK (P) | 3 | 2 (or 3) | OT | DTX |
| NACK (F) | NACK (F) | 3 | 2 | OT | OT |
| ACK (P) | ACK (P) | 2 | N/A | ---- | ---- |
| ACK (P) | NACK (F) | 2 | 2 | DTX | OT |
| NACK (F) | ACK (P) | 2 | 2 | OT | DTX |
| NACK (F) | NACK (F) | 2 | 2 | OT | OT |
| ACK (P) | ACK (P) | 1 | N/A | ---- | ---- |
| ACK (P) | NACK (F) | 1 | 2 | DTX | OT |
| NACK (F) | ACK (P) | 1 | 2 (or 1) | OT | ---- |
| NACK (F) | NACK (F) | 1 | 2 | OT | OT |

Figure 22

| Bit Pattern | RI | Modulation-1 | Modulation-II |
|---|---|---|---|
| 00000 | 1 | QPSK | NA |
| 00001 | 1 | 16QAM | NA |
| 00010 | 1 | 64 QAM | NA |
| 00011 | 2 | QPSK | QPSK |
| 00100 | 2 | QPSK | 16QAM |
| 00101 | 2 | QPSK | 64QAM |
| 00110 | 2 | 16QAM | QPSK |
| 00111 | 2 | 16QAM | 16QAM |
| 01000 | 2 | 16QAM | 64QAM |
| 01001 | 2 | 64QAM | QPSK |
| 01010 | 2 | 64QAM | 16QAM |
| 01011 | 2 | 64QAM | 64QAM |
| 01100 | 3 | QPSK | QPSK |
| 01101 | 3 | QPSK | 16QAM |
| 01110 | 3 | QPSK | 64QAM |
| 01111 | 3 | 16QAM | QPSK |
| 10000 | 3 | 16QAM | 16QAM |
| 10001 | 3 | 16QAM | 64QAM |
| 10010 | 3 | 64QAM | QPSK |
| 10011 | 3 | 64QAM | 16QAM |
| 10100 | 3 | 64QAM | 64QAM |
| 10101 | 4 | QPSK | QPSK |
| 10110 | 4 | QPSK | 16QAM |
| 10111 | 4 | QPSK | 64QAM |
| 11000 | 4 | 16QAM | QPSK |
| 11001 | 4 | 16QAM | 16QAM |
| 11010 | 4 | 16QAM | 64QAM |
| 11011 | 4 | 64QAM | QPSK |
| 11100 | 4 | 64QAM | 16QAM |
| 11101 | 4 | 64 QAM | 64QAM |
| 11110 | NA | NA | NA |
| 11111 | NA | NA | NA |

Figure 23

| Bit Pattern | RI | Modulation-1 | Modulation-II |
|---|---|---|---|
| 00000 | 1 | QPSK | NA |
| 00001 | 1 | 16QAM | NA |
| 00010 | 1 | 64 QAM | NA |
| 00011 | 2 | QPSK | QPSK |
| 00100 | 2 | QPSK | 16QAM |
| 00101 | 2 | QPSK | 64QAM |
| 00110 | 2 | 16QAM | QPSK |
| 00111 | 2 | 16QAM | 16QAM |
| 01000 | 2 | 16QAM | 64QAM |
| 01001 | 2 | 64QAM | QPSK |
| 01010 | 2 | 64QAM | 16QAM |
| 01011 | 2 | 64QAM | 64QAM |
| 01100 | 3 | QPSK | QPSK |
| 01101 | 3 | QPSK | 16QAM |
| 01110 | 3 | QPSK | 64QAM |
| 01111 | 3 | 16QAM | QPSK |
| 10000 | 3 | 16QAM | 16QAM |
| 10001 | 3 | 16QAM | 64QAM |
| 10010 | 3 | 64QAM | QPSK |
| 10011 | 3 | 64QAM | 16QAM |
| 10100 | 3 | 64QAM | 64QAM |
| 10101 | 4 | QPSK | QPSK |
| 10110 | 4 | QPSK | 16QAM |
| 10111 | 4 | QPSK | 64QAM |
| 11000 | 4 | 16QAM | QPSK |
| 11001 | 4 | 16QAM | 16QAM |
| 11010 | 4 | 16QAM | 64QAM |
| 11011 | 4 | 64QAM | QPSK |
| 11100 | 4 | 64QAM | 16QAM |
| 11101 | 4 | 64 QAM | 64QAM |
| 11110 | First codeword is DTX | | |
| 11111 | Second codeword DTX | | |

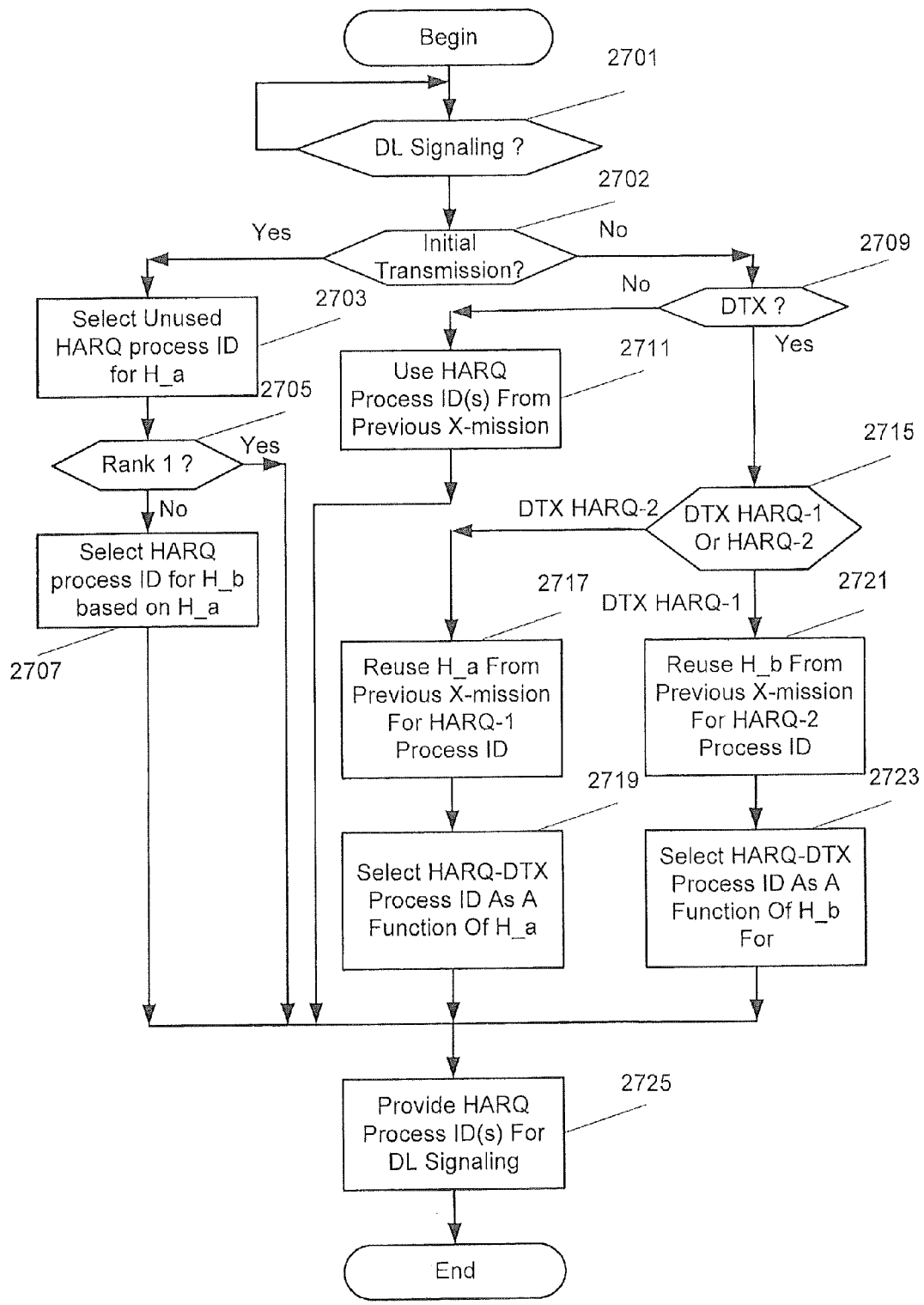

RETRANSMISSION METHODS INCLUDING DISCONTINUOUS TRANSMISSION AND RELATED DEVICES

CROSS-REFERENCE TO RELATED APPLICATIONS

This application is a continuation-in-part under 35 U.S.C. 111(a) of PCT Application No. PCT/SE2013/050488, filed May 3, 2013, which in turn claims the benefit of under 35 U.S.C. §119(e) of U.S. Provisional Patent Application Ser. No. 61/682,547, filed Aug. 13, 2012, U.S. Provisional Application No. 61/694,519, filed Aug. 29, 2012, and U.S. Provisional Application No. 61/702,373, filed Sep. 18, 2012, the disclosures of each of which are incorporated by reference herein in their entireties.

This application is a continuation-in-part under 35 U.S.C. 111(a) of PCT Application No. PCT/SE2013/050486, filed May 3, 2013, which in turn claims the benefit of under 35 U.S.C. §119(e) of U.S. Provisional Patent Application Ser. No. 61/682,547, filed Aug. 13, 2012, U.S. Provisional Application No. 61/694,519, filed Aug. 29, 2012, and U.S. Provisional Application No. 61/702,373, filed Sep. 18, 2012, the disclosures of each of which are incorporated by reference herein in their entireties.

This application is a continuation-in-part under 35 U.S.C. 111(a) of PCT Application No. PCT/SE2013/050487, filed May 3, 2013, which in turn claims the benefit of under 35 U.S.C. §119(e) of U.S. Provisional Patent Application Ser. No. 61/682,547, filed Aug. 13, 2012, U.S. Provisional Application No. 61/694,519, filed Aug. 29, 2012, and U.S. Provisional Application No. 61/702,373, filed Sep. 18, 2012, the disclosures of each of which are incorporated by reference herein in their entireties.

TECHNICAL FIELD

The present disclosure is directed to wireless communications and, more particularly, to multiple-input-multiple-output (MIMO) wireless communications and related network nodes and wireless terminals.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Moreover, a cell area for a base station may be divided into a plurality of sectors surrounding the base station. For example, a base station may service three 120 degree sectors surrounding the base station, and the base station may provide a respective directional transceiver and sector antenna array for each sector. Stated in other words, a base station may include three directional sector antenna arrays servicing respective 120 degree base station sectors surrounding the base station.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance may be improved if both the transmitter and the receiver for a base station sector are equipped with multiple antennas (e.g., an sector antenna array) to provide a multiple-input multiple-output (MIMO) communication channel(s) for the base station sector. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink from a base station transmitting from a sector antenna array over a MIMO channel to a wireless terminal in the sector, for example, spatial multiplexing (or SM) may allow the simultaneous transmission of multiple symbol streams over the same frequency from the base station sector antenna array for the sector. Stated in other words, multiple symbol streams may be transmitted from the base station sector antenna array for the sector to the wireless terminal over the same downlink time/frequency resource element (TFRE) to provide an increased data rate. In a downlink from the same base station sector transmitting from the same sector antenna array to the same wireless terminal, transmit diversity (e.g., using space-time codes) may allow the simultaneous transmission of the same symbol stream over the same frequency from different antennas of the base station sector antenna array. Stated in other words, the same symbol stream may be transmitted from different antennas of the base station sector antenna array to the wireless terminal over the same time/frequency resource element (TFRE) to provide increased reliability of reception at the wireless terminal due to transmit diversity gain.

Four layer MIMO transmission schemes are proposed for High-Speed-Downlink-Packet-Access (HSDPA) within Third Generation Partnership Project (3GPP) standardization. Accordingly, up to 4 channel encoded transport data blocks (sometimes referred to as transport data block codewords) may be transmitted using a same TFRE when using 4-branch MIMO transmission. Because ACK/NACK signaling and/or channel encoding for each transport data block to be transmitted during a same TFRE may require wireless terminal feedback (e.g., as ACK/NACK and/or CQI or channel quality information), feedback to define ACK/NACK and/or channel encoding for 4 transport data blocks may be required when using 4-branch MIMO transmission. Feedback signaling when using 4-branch MIMO transmission may thus be undesirably high, for example, because different MIMO layers may be received at a wireless terminal during a same TFRE with different qualities, signal strengths, error rates, etc.

SUMMARY

It may therefore be an object to address at least some of the above mentioned disadvantages and/or to improve performance in a wireless communication system. Some embodiments discussed herein, for example, may provide improved HARQ retransmission gain(s) without significantly increasing delay(s).

According to some embodiments, a method of operating a node of a radio access network may include transmitting first and second data blocks from the radio access network over respective first and second multiple-input-multiple-output (MIMO) layers of a MIMO wireless channel to a wireless terminal during a first transmission time interval (TTI).

Responsive to receiving a negative acknowledgment (NACK) message for the second data block, downlink signaling for a second TTI may be transmitted from the radio access network to the wireless terminal with the downlink signaling including a discontinuous transmission (DTX) indicator for the first MIMO layer and a retransmission data indicator for the second MIMO layer. Responsive to receiving the negative acknowledgment (NACK) message for the second data block, the second data block may be retransmitted from the radio access network over the second MIMO layer to the wireless terminal during a second TTI.

By using a discontinuous transmission indicator, communication and/or processing resources may be conserved at the radio access network and/or at the wireless terminal while supporting retransmission of non-acknowledged data. The radio access network, for example, may retransmit the previously non-acknowledged data of a first MIMO stream(s)/layer(s) without devoting significant resources to transmission/processing of another MIMO stream(s)/layer(s) subject to discontinuous transmission.

Transmitting the downlink signaling may include transmitting the downlink signaling responsive to receiving an acknowledgment (ACK) message for the first data block and responsive to receiving the negative acknowledgment (NACK) message for the second data block, and retransmitting the second data block may include retransmitting the second data block responsive to receiving the acknowledgment (ACK) message for the first data block and responsive to receiving the negative acknowledgment (NACK) message for the second data block.

Retransmitting the second data block during the second TTI may include retransmitting the second data block without transmitting data over the first MIMO layer during the second TTI.

Before transmitting the first and second data blocks during the first transmission time interval, first and second HARQ process identifications may be selected for the first and second MIMO layers, and before transmitting the downlink signaling for the second TTI, a HARQ-DTX process identification may be generated for the first MIMO layer as a function of the second HARQ process identification for the second MIMO layer.

Transmitting the downlink signaling may include transmitting the downlink signaling responsive to receiving first and second negative acknowledgment (NACK) messages for the first and second data blocks, and retransmitting the second data block may include retransmitting the second data block responsive to receiving the first and second negative acknowledgment (NACK) messages for the first and second data blocks. In response to receiving two NACK messages, the radio access network may thus use discontinuous transmission over one of the MIMO streams/layers (e.g., not transmitting one of the NACKed data block or blocks) to reduce inter-layer interference relative to the other data block(s) that is retransmitted over the other MIMO stream(s)/layer(s). Accordingly, a likelihood of the retransmitted data block(s) being successfully received/decoded at the wireless terminal may be improved during the retransmission.

Retransmitting the second data block during the second TTI may include retransmitting the second data block without transmitting data over the first MIMO layer during the second TTI.

Responsive to receiving an acknowledgment (ACK) message for the retransmission of the second data block during the second TTI, downlink signaling may be transmitted from the radio access network to the wireless terminal for a third TTI wherein the downlink signaling for the third TTI includes a discontinuous transmission (DTX) indicator for the second MIMO layer and a retransmission data indicator for the first MIMO layer. Responsive to receiving the acknowledgment (ACK) message for the retransmission of the second data block during the second TTI, the first data block may be retransmitted from the radio access network over the first MIMO layer to the wireless terminal during the third TTI.

Before transmitting the first and second data blocks during the first transmission time interval, first and second HARQ process identifications may be selected for the first and second MIMO layers, and before transmitting the downlink signaling for the second TTI, generating a HARQ-DTX process identification may be generated for the first MIMO layer as a function of the second HARQ process identification for the second MIMO layer.

Transmitting the first and second data blocks may include transmitting the first and second data blocks in accordance with a first MIMO rank. Transmitting the downlink signaling may include transmitting the downlink signaling responsive to receiving the negative acknowledgment (NACK) message for the second data block and responsive to receiving a preference for a second MIMO rank less than the first rank from the wireless terminal. Moreover, retransmitting the second data block may include retransmitting the second data block during the second TTI in accordance with the first MIMO rank responsive to receiving the negative acknowledgment (NACK) message for the second data block and responsive to receiving the preference for the second MIMO rank less than the first MIMO rank. By maintaining the same rank for a retransmission even though the wireless terminal has requested a lower rank, a mapping of MIMO layers and soft buffers may be maintained to support combination of symbols/bits of previous transmissions and retransmissions of the second data block.

Moreover, transmitting the downlink signaling may include transmitting the downlink signaling responsive to receiving a negative acknowledgment (NACK) for the first data block, responsive to receiving the negative acknowledgment (NACK) message for the second data block, and responsive to receiving the preference for the second MIMO rank less than the first rank.

Responsive to receiving an acknowledgment (ACK) message for the retransmission of the second data block during the second TTI, downlink signaling may be transmitted from the radio access network to the wireless terminal for a third TTI with the downlink signaling for the third TTI including a retransmission data indicator for the first MIMO layer and a discontinuous transmission (DTX) indicator for the second MIMO layer. Responsive to receiving the acknowledgment (ACK) message for the retransmission of the second data block during the second TTI, the first data block may be retransmitted from the radio access network over the second MIMO layer to the wireless terminal during the third TTI in accordance with the first MIMO rank.

Before transmitting the first and second data blocks during the first transmission time interval, first and second HARQ process identifications may be selected for the first and second MIMO layers, and before transmitting the downlink signaling for the second TTI, a HARQ-DTX process identification may be generated for the first MIMO layer as a function of the second HARQ process identification for the second MIMO layer.

Retransmitting the second data block during the second TTI may include retransmitting the second data block without transmitting data over the first MIMO layer during the second TTI.

First and second HARQ process identifications may be selected for first and second MIMO layers. Responsive to selecting the first and second HARQ process identifications, downlink signaling may be transmitted from the radio access network to the wireless terminal for the first transmission time interval (TTI). Responsive to receiving the negative acknowledgment (NACK) message for the second data block, a HARQ discontinuous transmission (DTX) process identification may be generated for the first MIMO layer as a function of the second HARQ process identification for the second MIMO layer. Transmitting the downlink signaling for the second TTI may include transmitting the downlink signaling for the second TTI responsive to generating the HARQ-DTX process identification and responsive to receiving the NACK message for the second data block. Retransmitting the second data block may include retransmitting the second data block responsive to generating the HARQ-DTX process identification and responsive to receiving the NACK message for the second data block.

According to some other embodiments, a node of a radio access network may include a transceiver configured to communicate with a wireless terminal over a multiple-input-multiple-output (MIMO) wireless channel, and a processor coupled to the transceiver, the processor may be configured to transmit first and second data blocks through the transceiver over respective first and second MIMO layers of the MIMO wireless channel to a wireless terminal during a first transmission time interval (TTI). The processor may be configured to transmit downlink signaling for a second TTI through the transceiver to the wireless terminal responsive to receiving a negative acknowledgment (NACK) message for the second data block, with the downlink signaling including a discontinuous transmission (DTX) indicator for the first MIMO layer and a retransmission data indicator for the second MIMO layer. The processor may be configured to retransmit the second data block through the transceiver over the second MIMO layer to the wireless terminal during a second TTI responsive to receiving the negative acknowledgment (NACK) message for the second data block.

The processor may be configured to transmit the downlink signaling responsive to receiving an acknowledgment (ACK) message for the first data block and responsive to receiving the negative acknowledgment (NACK) message for the second data block, and the processor may be configured to retransmit the second data block responsive to receiving the acknowledgment (ACK) message for the first data block and responsive to receiving the negative acknowledgment (NACK) message for the second data block.

The processor may be configured to transmit the downlink signaling responsive to receiving first and second negative acknowledgment (NACK) messages for the first and second data blocks, and the processor may be configured to retransmit the second data block responsive to receiving the first and second negative acknowledgment (NACK) messages for the first and second data blocks.

The processor may be configured to transmit the first and second data blocks in accordance with a first MIMO rank. The processor may be configured to transmit the downlink signaling responsive to receiving the negative acknowledgment (NACK) message for the second data block and responsive to receiving a preference for a second MIMO rank less than the first rank from the wireless terminal. The processor is configured to retransmit the second data block by retransmitting the second data block during the second TTI in accordance with the first MIMO rank responsive to receiving the negative acknowledgment (NACK) message for the second data block and responsive to receiving the preference for the second MIMO rank less than the first MIMO rank.

The processor may also be configured to select first and second HARQ process identifications for first and second MIMO layers, to transmit downlink signaling from the radio access network to the wireless terminal for the first transmission time interval (TTI) responsive to selecting the first and second HARQ process identifications, and to generate a HARQ discontinuous transmission (DTX) process identification for the first MIMO layer as a function of the second HARQ process identification for the second MIMO layer responsive to receiving the negative acknowledgment (NACK) message for the second data block. In addition, the processor may be configured to transmit the downlink signaling for the second TTI responsive to generating the HARQ-DTX process identification and responsive to receiving the NACK message for the second data block, and to retransmit the second data block responsive to generating the HARQ-DTX process identification and responsive to receiving the NACK message for the second data block.

The processor may be configured to retransmit the second data block without transmitting data over the first MIMO layer during the second TTI.

BRIEF DESCRIPTION OF THE DRAWINGS

The accompanying drawings, which are included to provide a further understanding of the disclosure and are incorporated in and constitute a part of this application, illustrate certain non-limiting embodiment(s). In the drawings:

FIGS. 7A and 7B are tables illustrating combinations of sharing HARQ processes between multiple MIMO data streams for rank/layer 3 and 4 MIMO transmissions;

FIGS. 8A and 8B are flow charts illustrating operations of base stations and wireless terminals according to some embodiments;

FIGS. 10, 11, 12, and 13 are tables illustrating MIMO rank selection according to some embodiments;

FIG. 14 is a table illustrating allocations of two HARQ processes to MIMO data layers/streams for rank 1, 2, 3, and 4 MIMO transmission/reception according to some other embodiments;

FIGS. 15, 16, 17, and 18 are tables illustrating MIMO rank selection according to some embodiments;

FIGS. 20A, 20B, and 20C are tables illustrating retransmission for different ranks according to embodiments of FIG. 21;

FIGS. 22 and 23 are tables illustrating modulation and rank bit patterns according to some embodiments;

FIGS. 25, 26, and 27 illustrate operations of a base station processor according to some embodiments.

DETAILED DESCRIPTION

Figure 1:
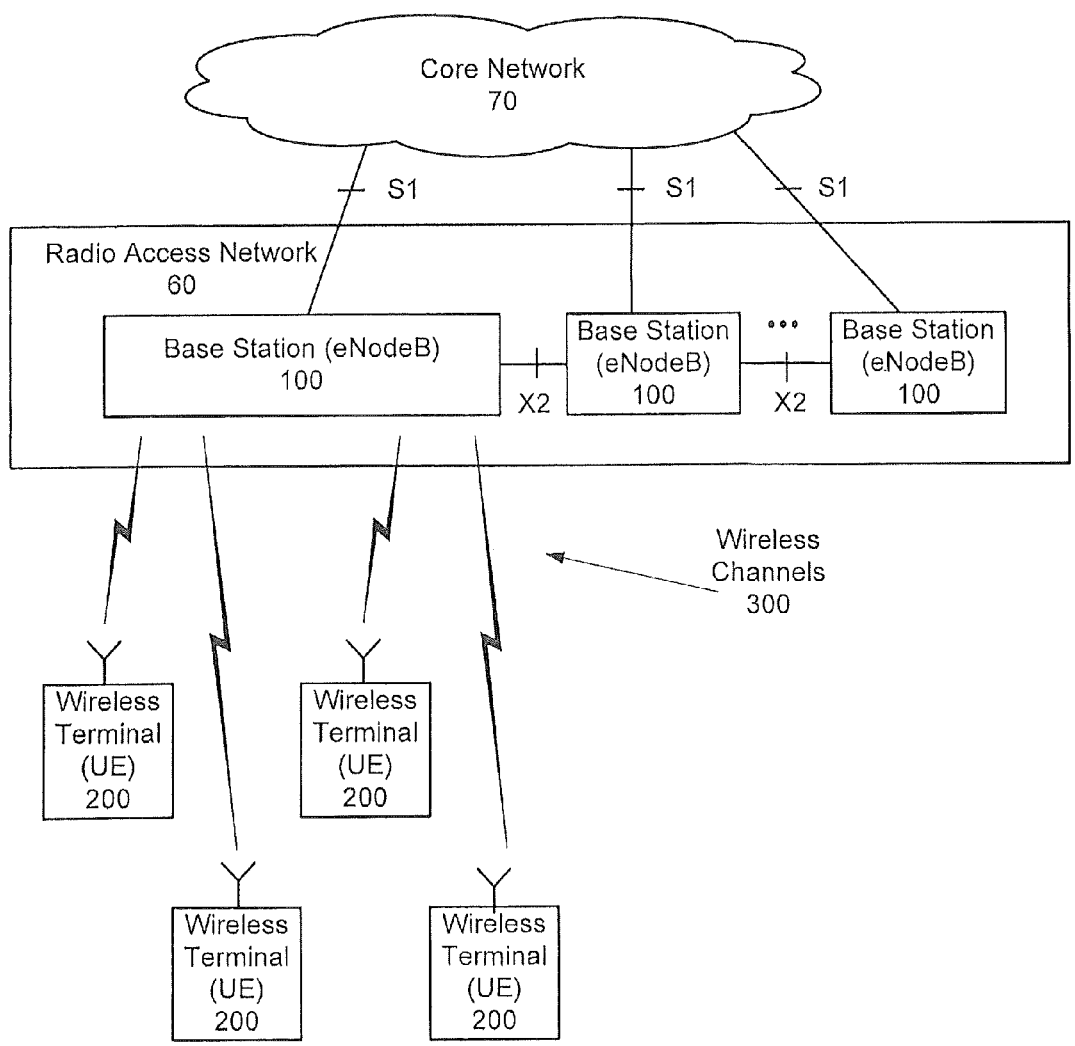
FIG. 1 is a block diagram of a communication system that is configured according to some embodiments.

Inventive concepts will now be described more fully hereinafter with reference to the accompanying drawings, in which examples of embodiments are shown. These inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For purposes of illustration and explanation only, these and other embodiments are described herein in the context of operating in a RAN that communicates over radio communication channels with wireless terminals (also referred to as UEs). It will be understood, however, that present inventive concepts are not limited to such embodiments and may be embodied generally in any type of communication network. As used herein, a wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of inventive concepts, this should not be seen as limiting the scope of inventive concepts to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of inventive concepts may also be applied, for example, in the uplink.

FIG. 1 is a block diagram of a communication system that is configured to operate according to some embodiments of present inventive concepts. An example RAN 60 is shown that may be a Long Term Evolution (LTE) RAN. Radio base stations (e.g., eNodeBs) 100 may be connected directly to one or more core networks 70, and/or radio base stations 100 may be coupled to core networks 70 through one or more radio network controllers (RNC). In some embodiments, functionality of a radio network controller(s) may be performed by radio base stations 100. Radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface and with the core network(s) 70 through S1 interfaces, as is well known to one who is skilled in the art.

Figure 2:
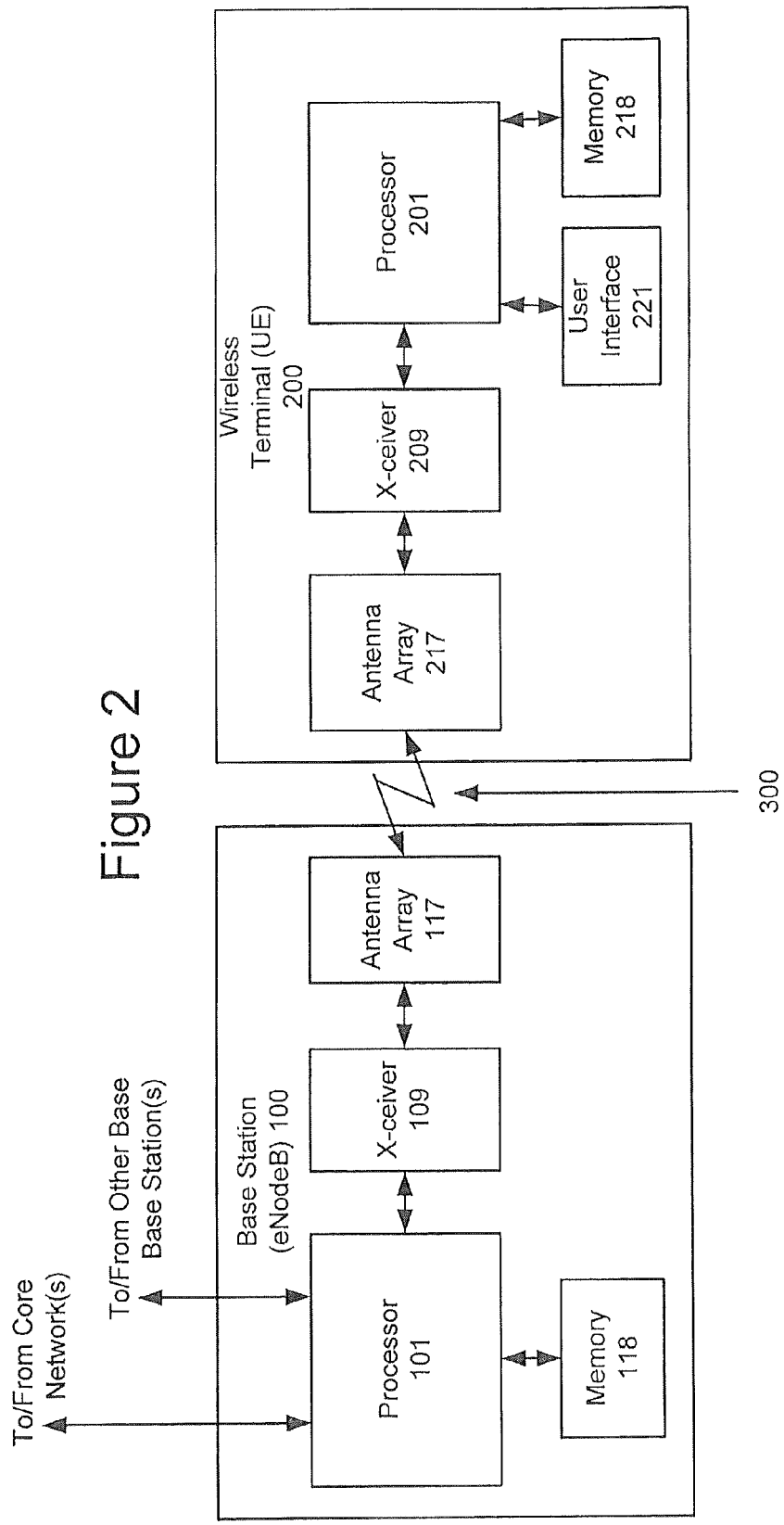
FIG. 2 is a block diagram illustrating a base station and a wireless terminal according to some embodiments of FIG. 1.

FIG. 2 is a block diagram of a base station 100 and a wireless terminal 200 of FIG. 1 in communication over wireless channel 300 according to some embodiments of present inventive concepts. As shown, base station 100 may include transceiver 109 coupled between processor 101 and antenna array 117 (including multiple antennas), and memory 118 coupled to processor 101. Moreover, wireless terminal 200 may include transceiver 209 coupled between antenna array 217 and processor 201, and user interface 221 and memory 218 may be coupled to processor 201. Accordingly, base station processor 101 may transmit communications through transceiver 109 and antenna array 117 for reception at wireless terminal processor 201 through antenna array 217 and transceiver 209. In the other direction, wireless terminal processor 201 may transmit communications through transceiver 209 and antenna array 217 for reception at base station processor 101 through antenna array 117 and transceiver 109. To support up to 4-branch MIMO (allowing parallel transmission of 4 layers/streams of data using a same TFRE), each of antenna arrays 117 and 217 may include four (or more) antenna elements. Wireless terminal 200 of FIG. 2, for example, may be a cellular radiotelephone, a smart phone, a laptop/netbook/tablet/handheld computer, or any other device providing wireless communications. User interface 211, for example, may include a visual display such as an liquid crystal display, a touch sensitive visual display, a keypad, a speaker, a microphone, etc.

For MIMO downlink transmissions from RAN 60 to wireless terminal 200, a codebook of precoding vectors (known at both RAN 60 and wireless terminal 200) is used to precode (e.g., to apply precoding weights to) the different data layers (data streams) that are transmitted in parallel from a sector antenna array(s) to the wireless terminal 200 during a same TFRE, and to decode the data layers (data streams) received in parallel during the same TFRE at wireless terminal 200. The same codebook of precoding vectors may be stored in wireless terminal memory 218 and in base station memory 118. Moreover, wireless terminal 200 may estimate characteristics of each downlink channel to generate channel quality information (CQI), and CQI feedback from wireless terminal 200 may be transmitted to base station 100. This CQI feedback may then be used by the base station processor 101 to select: transmission rank (i.e., a number of data layers/streams to be transmitted during a subsequent TFRE); transport data block length(s); channel code rate(s) to be used to channel encode different transport data blocks; modulation order(s); symbol to layer mapping schemes; and/or precoding vectors for respective downlink transmissions to the wireless terminal 200.

By way of example, base station antenna array 117 may include 4 antennas and wireless terminal antenna array 217 may include four antennas so that wireless terminal 200 may receive up to four downlink data layers (data streams) from base station antenna array 117 during MIMO communications. In this example, the precoding codebook may include rank 1 precoding vectors (used when transmitting one downlink data stream from a base station sector antenna array 117 to wireless terminal 200), rank 2 precoding vectors (used when transmitting two downlink data streams from a base station sector antenna array 117 to wireless terminal 200), rank 3 precoding vectors (used when transmitting three downlink data streams from a base station sector antenna array 117 to wireless terminal 200), and rank 4 precoding vectors (used when transmitting four downlink data streams from a base station sector antenna array 117 to wireless terminal 200). Precoding vectors may also be referred to, for example, as precoding codebook entries, precoding codewords, and/or precoding matrices.

An issue for four layer MIMO transmission schemes for HSDPA is what number of HARQ (Hybrid Automatic Repeat Request) codewords/processes should be supported. To reduce uplink and/or downlink signaling, two HARQ codewords/processes may be used in four layer MIMO transmission schemes for feedback relating to one, two, three, and four layer downlink transmissions. Use of two HARQ codewords/processes may be relatively easier to implement without significantly reducing performance (relative to use of four HARQ codewords/processes).

A Hybrid Automatic Repeat Request (HARQ) process(es) may be used in a wireless system to overcome transmission errors that cannot be corrected using a forward error correction code (also referred to as a channel code) alone. In some embodiments of a HARQ process, the HARQ process is mapped to one or more MIMO transmission layers, and the transmitting device (e.g., base station 100) attaches an error detection/correction code (e.g., a cyclic redundancy check or CRC code) to each transport data block (also referred to as a data block, data packet, packet, etc.) of a TTI/TFRE to provide error detection/correction. At the receiving device (e.g., at wireless terminal 200), the contents of each received transport data block may be validated using the respective error detection/correction code attached thereto. If the transport data block fails the error detection/correction validation, the receiving device may send a HARQ codeword including a negative acknowledgement NACK message (also referred to as a non-acknowledgement message) for the HARQ process back to the transmitting device to request a retransmission of the failed transport data block or blocks mapped to the HARQ process. A failed data block may be retransmitted until it is either decoded or until a maximum number of allowed retransmissions (e.g., four to six retransmissions) have occurred. If the transport data block passes the error detection/correction validation, a HARQ codeword including an acknowledgement ACK message is sent back to the transmitting device to acknowledge reception and correct decoding of the transport data block. A HARQ process may thus be mapped to one or more MIMO transmission layers, and for each TTI/TFRE, the HARQ process may generate a HARQ ACK/NACK feedback message that is transmitted in a HARQ codeword of the feedback channel (e.g., HS-PDCCH).

As discussed in greater detail below, a wireless terminal 200 implementing HARQ functionality may include a soft buffer for each transport data block received during a TFRE so that originally transmitted and retransmitted transport data blocks may be combined before decoding to thereby improve system throughput. Depending on the way the originally transmitted and retransmitted transport data blocks are combined, HARQ systems/processes may be classified as chase combining or CC (retransmitting the same transport data block without additional information) or Incremental Redundancy or IR (transmitting the same transport data block with additional parity bits).

A single soft buffer may be used for layer/rank one MIMO transmission/reception (with one transport data block received during a TFRE), two soft buffers may be used for layer/rank two MIMO transmission/reception (with two transport data blocks received during a TFRE), three soft buffers may be used for layer/rank three MIMO transmission/reception (with three transport data blocks received during a TFRE), and four soft buffers may be used for layer/rank four MIMO transmission/reception (with four transport data blocks received during a TFRE). Each soft buffer stores a demodulator output for a transport data block before decoding to be used after a retransmission if the transport data block is not successfully decoded. For Release 7 MIMO supporting up to two rank/layer transmissions (with up to two transport data blocks transmitted to a UE during a TFRE), a HARQ process is provided for each soft buffer and thus for each transport data block. When two HARQ processes are mapped to three or four layer/rank MIMO transmission/reception, however, a mechanism to map UE receiver soft buffers to HARQ processes may be needed.

According to some embodiments discussed herein, methods may be provided to map functionalities between base station 100 transmission layers, wireless terminal 200 receiver layers (including respective soft buffers), and HARQ processes for situations when the number of supported HARQ processes is less than a number of MIMO transmission layers/ranks supported by the system (e.g., when rank/layer 3 and/or 4 MIMO transmissions are supported but only two HARQ processes are supported). With two HARQ processes, both HARQ ACK/NACK messages may be included in a HARQ codeword of the feedback channel (e.g., HS-DPCCH).

Figure 3A:
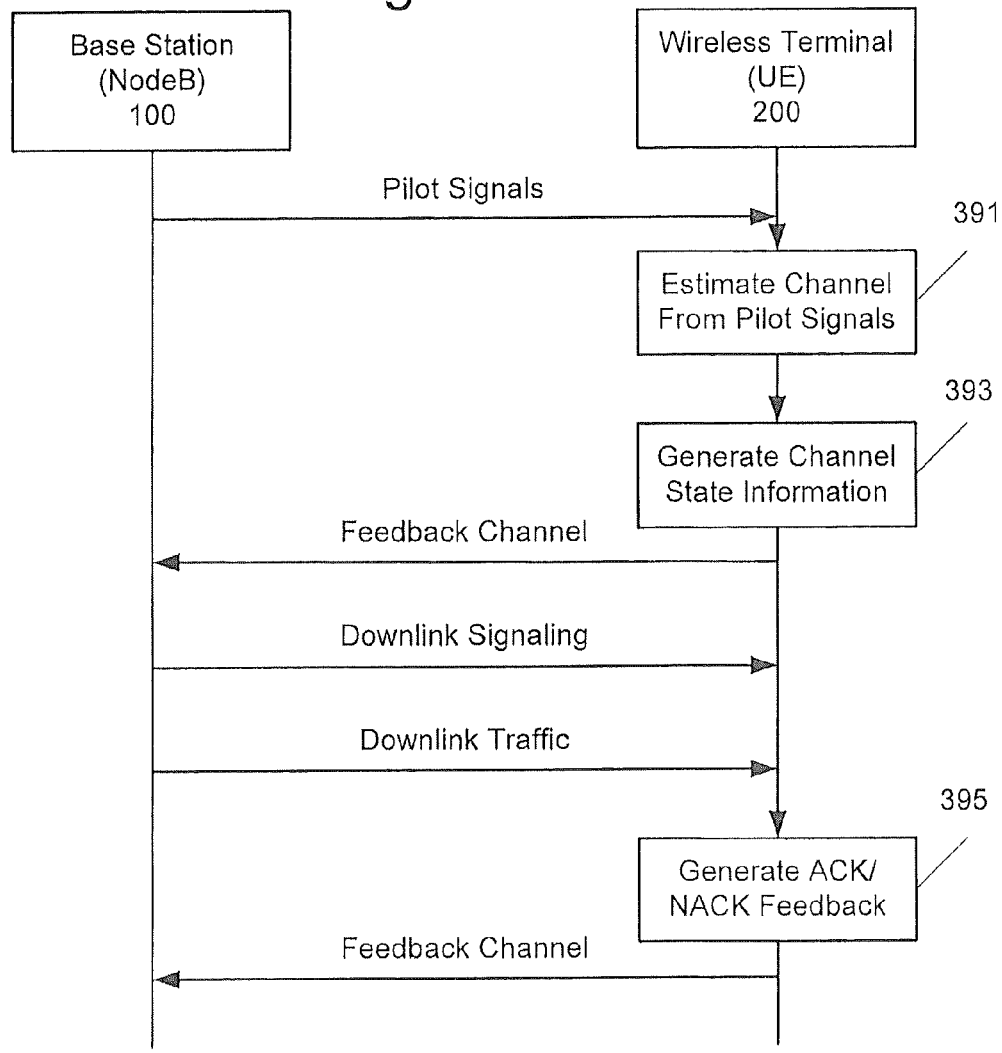
FIG. 3A is a message sequence chart for a MIMO communication system.
Figure 3B:
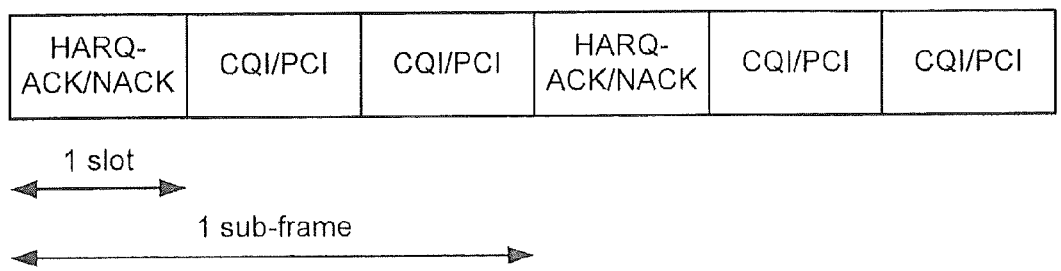
FIG. 3B is illustrates a feedback channel report format of FIG. 3A.

FIG. 3A illustrates a message sequence between base station 100 and wireless terminal 200 in a MIMO communications system. As shown in FIG. 3A, base station 100 transmits pilot signals over the downlink channel(s), and wireless terminal 200 estimates the downlink channel(s) at block 391 (for transmissions from base station 100 to wireless terminal 200) based on the pilot signals. Wireless terminal 200 generates (e.g., computes) channel state information at block 393 for the downlink channel(s), and wireless terminal 200 reports the channel state information to base station 100 over a feedback channel. An example of a format for a feedback channel report for two reporting intervals is illustrated in FIG. 3B, and FIG. 3B shows that the feedback channel report may include a HARQ element/message/codeword (including acknowledge/ACK and/or negative-acknowledge/NACK information) and/or CQI/PCI (channel quality information and/or precoding control indicator) information.

More particularly, wireless terminal 200 may transmit CQI/PCI information (over the feedback channel) including a rank indicator requesting/recommending a MIMO transmission rank for subsequent downlink transmissions from base station 100 to wireless terminal 200. Base station processor 101 may select the requested/recommended MIMO rank or a different MIMO rank, and base station 100 may identify the selected MIMO rank in downlink signaling transmitted to wireless terminal 200, for example, using a downlink signaling channel HS-SCCH (High-Speed Shared Control Channel). Base station 100 may then transmit one or more transport data blocks using respective MIMO streams over the downlink channel in a subsequent TFRE in accordance with the selected MIMO rank as downlink traffic, for example, using a downlink traffic channel HS-PDSCH (High-Speed Physical Downlink Shared Channel). Based on success/failure decoding each received transport data block, wireless terminal 200 may generate respective HARQ ACK/NACK messages that are transmitted to base station 100 over the feedback channel.

Figure 4:
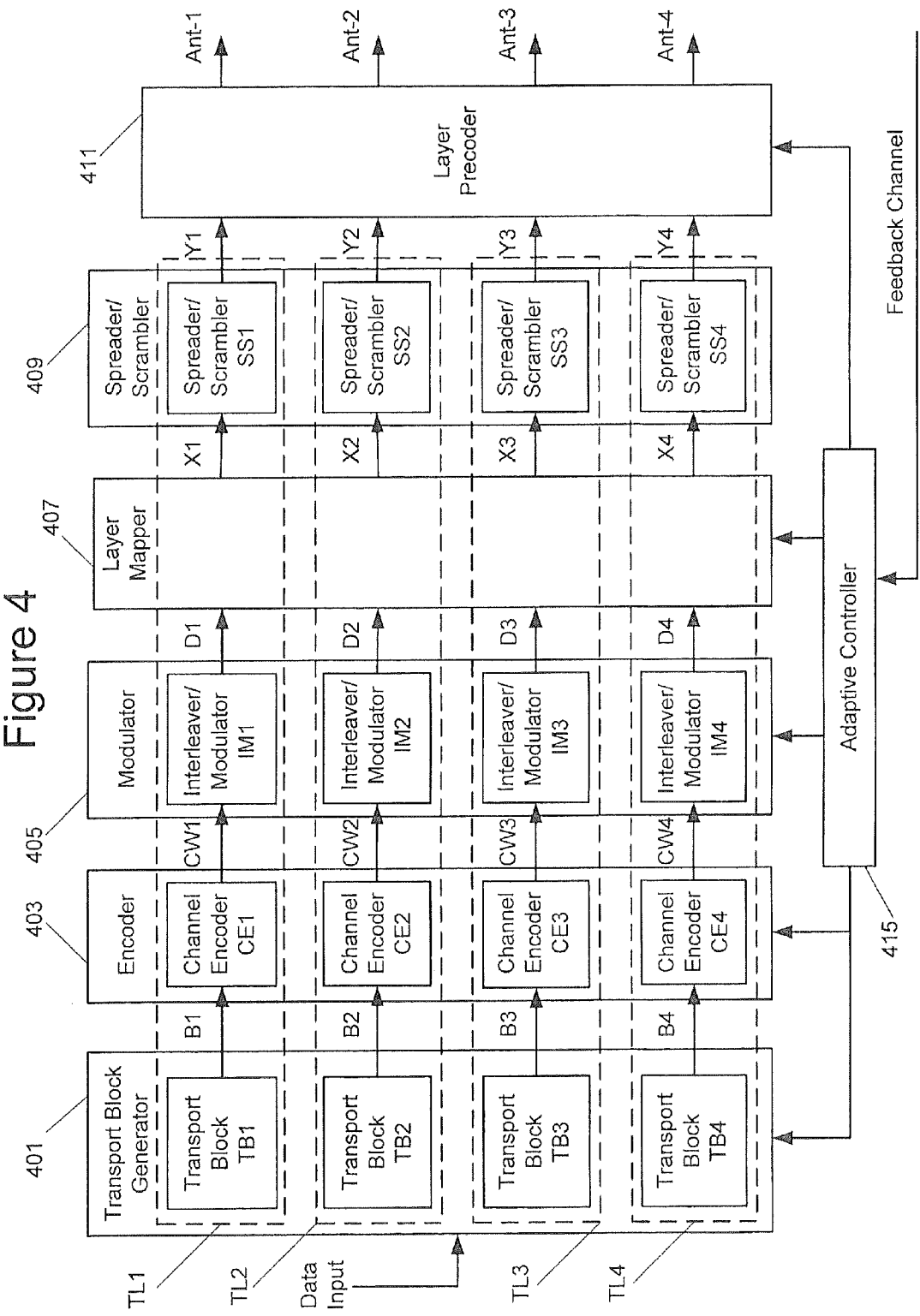
FIG. 4 is a block diagram illustrating elements/functionalities of base station processors according to some embodiments of FIG. 2.

FIG. 4 is block diagram illustrating elements/functionalities of base station processor 101 of FIG. 2 supporting two HARQ codeword MIMO with 4 channel encoders and up to four rank MIMO downlink transmission according to some embodiments. According to embodiments of FIG. 4, four channel encoders CE1, CE2, CE3, and CE4 may be provided for four streams of transport data blocks B1, B2, B3, and B4, with symbols of one data input stream for wireless terminal 200 being mapped to as many as four different data streams. As shown, processor 101 may include transport data block generator 401, channel encoder 403, modulator 405, layer mapper 407, spreader/scrambler 409, and layer precoder 411. In embodiments of FIG. 4, channel encoder 403 may include channel encoders CE1, CE2, CE3, and CE4 for the four streams of transport data blocks B1, B2, B3, and B4, modulator 405 may include interleavers/modulators IM1, IM2, IM3, and IM4, and layer mapper 407 may be configured to map resulting symbols of the four streams to as many as four different MIMO layers (streams) X1, X2, X3, and X4 as discussed in greater detail below. Moreover, adaptive controller 415 may be configured to control transport data block generator 401, channel encoder 403, modulator 405, layer mapper 407, and/or layer precoder 411 responsive to channel quality information (CQI) received as feedback from wireless terminal 200. Accordingly, symbols generated responsive to codewords respectively generated by channel encoders CE1, CE2, CE3, and CE4 using different channel coding (determined by adaptive controller 415 responsive to wireless terminal 200 feedback) may be interleaved and distributed (mapped) to 4 different MIMO layers. More particularly, symbols generated responsive to two data codewords CW (where a data codeword CW is a transport data block with additional channel coding and/or CRC bits) may be interleaved and then split between two different MIMO layers. According to some embodiments discussed herein, layer mapper 407 may perform a one-to-one mapping.

Base station processor 101, for example, may receive input data (e.g., from core network 70, from another base station, etc.) for transmission to wireless terminal 200, and transport data block generator 401 (including transport data block data generators TB1, TB2, TB3, and TB4) may provide a single stream of data blocks (for rank 1 transmissions) or separate the input data into a plurality of different streams of data blocks (for rank 2, rank 3, and rank 4 transmission). More particularly, for rank 1 transmissions (providing only 1 MIMO layer/stream), all input data may be processed through transport data block generator TB1 to provide a single stream of transport data blocks B1 (including individual transport data blocks B1-1, B1-2, B1-3, etc.) without using transport data block generators TB2, TB3, or TB4 and without generating other streams of transport data blocks B2, B3, or B4. For rank 2 transmissions (providing 2 MIMO layers/streams), transport data block generator TB1 may generate a stream of transport data blocks B1 (including individual transport data blocks B1-1, B1-2, B1-3, etc.), and transport data block generator TB3 may generate a stream of transport data blocks B3 (including individual transport data blocks B3-1, B3-2, B3-3, etc.) without using transport data block generators TB2 or TB4 and without generating other streams of transport data blocks B2 or B4. For rank 3 transmissions (providing 3 MIMO layers/streams), transport data block generator TB1 may generate a stream of transport data blocks B1 (including individual transport data blocks B1-1, B1-2, B1-3, etc.), transport data block generator TB2 may generate a stream of transport data blocks B2 (including individual transport data blocks B2-1, B2-2, B2-3, etc.), and transport data block generator TB3 may generate a stream of transport data blocks B3 (including individual transport data blocks B3-1, B3-2, B3-3, etc.), without using transport data block generator TB4 and without generating another stream of transport data blocks B4. For rank 4 transmissions (providing 4 MIMO layers/streams), transport data block generator TB1 may generate a stream of transport data blocks B1 (including individual transport data blocks B1-1, B1-2, B1-3, etc.), transport data block generator TB2 may generate a stream of transport data blocks B2 (including individual transport data blocks B2-1, B2-2, B2-3, etc.), transport data block generator TB3 may generate a stream of transport data blocks B3 (including individual transport data blocks B3-1, B3-2, B3-3, etc.), and transport data block generator TB4 may generate a stream of transport data blocks B4 (including individual transport data blocks B4-1, B4-2, B4-3, etc.).

Channel encoder 403 (including channel encoders CE1, CE2, CE3, and CE4) may encode the stream/streams of data blocks B1, B2, B3, and/or B4 generated by transport data block generator 401 to provide respective streams of data codewords CW1 (including individual data codewords cw1-1, cw1-2, cw1-3, etc.), CW2 (including individual data codewords cw2-1, cw2-2, cw2-3, etc.), CW3 (including individual data codewords cw3-1, cw3-2, cw3-3, etc.), and/or CW4 (including individual data codewords cw4-1, cw4-2, cw4-3, etc.), for example, using turbo coding, convolutional coding, etc. Moreover, coding characteristics (e.g., coding rates) applied by channel encoders CE1, CE2, CE3, and CE4 may be separately determined by adaptive controller 415 responsive to wireless terminal 200 feedback (e.g., CQI regarding the downlink channel). For rank 1 transmissions, channel encoder 403 may generate a single stream of data codewords CW1 responsive to the stream of data blocks B1 using only channel encoder CE1. For rank 2 transmissions, channel encoder 403 may generate two streams of data codewords CW1 and CW3 responsive to respective streams of data blocks B1 and B3 using channel encoder CE1 and channel encoder CE3. For rank 3 transmissions, channel encoder 403 may generate three streams of data codewords CW1, CW2, and CW3 responsive to respective streams of data blocks B1, B2, and B3 using channel encoder CE1, channel encoder CE2, and channel encoder CE3. For rank 4 transmissions, channel encoder 403 may generate four streams of data codewords CW1, CW2, CW3, and CW4 responsive to respective streams of data blocks B1, B2, B3, and B4 using channel encoder CE1, channel encoder CE2, channel encoder CE3, and channel encoder CW4. According to some embodiments, channel encoders CE1, CE2, CE3, and/or CE4 may apply different coding characteristics (e.g., different coding rates) during rank 2, rank 3, and/or rank 4 transmissions to generate respective (differently coded) data codewords cw1-1, cw2-1, cw3-1, and/or cw4-1 including data to be transmitted during a same TFRE.

Modulator 405 (including interleaver/modulators IM1, IM2, IM3, and IM4) may interleave and modulate the stream/streams of data codewords CW1, CW2, CW3, and/or CW4 generated by channel encoder 403 to provide respective streams of unmapped symbol blocks D1 (including unmapped symbol blocks d1-1, d1-2, d1-3, etc.), D2 (including unmapped symbol blocks d2-1, d2-2, d2-3, etc.), D3 (including unmapped symbol blocks d3-1, d3-2, d3-3, etc.), and/or D4 (including unmapped symbol blocks d4-1, d4-2, d4-3, etc.). For rank 1 transmissions (providing only 1 MIMO layer/stream), modulator 405 may generate a single stream of unmapped symbol blocks D1 responsive to the stream of data codewords CW1 using only interleaver/modulator IM1. For rank 2 transmissions, modulator 405 may generate two streams of unmapped symbol blocks D1 and D3 responsive to respective streams of data codewords CW1 and CW3 using interleaver/modulators IM1 and IM3. For rank 3 transmissions, modulator 405 may generate three streams of unmapped symbol blocks D1, D2, and D3 responsive to respective streams of data codewords CW1, CW2, and CW3 using interleaver/modulators IM1, IM2, and IM3. For rank 4 transmissions, modulator 405 may generate four streams of unmapped symbol blocks D1, D2, D3, and D4 responsive to respective streams of data codewords CW1, CW2, CW3, and CW4 using interleaver/modulators IM1, IM2, IM3, and IM4. Modulator 405 may apply modulation orders responsive to input from adaptive controller 415 determined based on CQI feedback from wireless terminal 200.

In addition, each interleaver/modulator IM1, IM2, IM3, and/or IM4 may interleave data of two or more codewords of a stream so that two or more consecutive unmapped symbol blocks of a respective stream include symbols representing data of the two or more consecutive codewords. For example, data of consecutive data codewords cw1-1 and cw1-2 of codeword stream CW1 may be interleaved and modulated to provide consecutive unmapped symbol blocks d1-1 and d1-2 of stream D1. Similarly, data of consecutive data codewords cw2-1 and cw2-2 of codeword stream CW2 may be interleaved and modulated to provide consecutive unmapped symbol blocks d2-1 and d2-2 of stream D2; data of consecutive data codewords cw3-1 and cw3-2 of codeword stream CW3 may be interleaved and modulated to provide consecutive unmapped symbol blocks d3-1 and d3-2 of stream D3; and/or data of consecutive data codewords cw4-1 and cw4-2 of codeword stream Cw4 may be interleaved and modulated to provide consecutive unmapped symbol blocks d4-1 and d4-2 of stream D4.

Symbols of streams of unmapped symbol blocks D1, D2, D3, and D4 may be mapped to respective streams of mapped symbol blocks X1, X2, X3, and X4 (for respective MIMO transmission layers), for example, using a one-to-one mapping. While one-to-one mapping is discussed by way of example, other mappings may be used provided that the mapping function of layer mapper 407 is known to both base station 100 and wireless terminal 200.

Spreader/scrambler 409 may include four spreader/scramblers SS1, SS2, SS3, and SS4, and for each mapped symbol stream provided by layer mapper 407, spreader/scrambler 409 may generate a respective stream of spread symbol blocks Y1, Y2, Y3, and Y4 (e.g., using a Walsh code). Layer precoder 411 may apply a MIMO precoding vector (e.g., by applying precoding weights) of the appropriate rank (based on wireless terminal feedback as interpreted by adaptive controller 415) to the streams of spread symbol blocks for transmission through transceiver 109 and antennas Ant-1, Ant-2, Ant-3, and Ant-4 of antenna array 117. According to some embodiments, with rank one transmissions, only first layer of elements (e.g., TB1, CE1, IM1, and/or SS1) of FIG. 4 may be used; with rank two transmissions, two layers of elements (e.g., TB1, TB3, CE1, CE3, IM1, IM3, SS1, and/or SS3) of FIG. 4 may be used; with rank three transmissions, three layers of elements (e.g., TB1, TB2, TB3, CE1, CE2, CE3, IM1, IM2, IM3, SS1, SS2, and/or SS3) of FIG. 4 may be used; and with rank four transmissions, four layers of elements (e.g., TB1, TB2, TB3, TB4, CE1, CE2, CE3, CE4, IM1, IM2, IM3, and IM4, SS1, SS2, SS3, and/or SS4) of FIG. 4 may be used. According to some other embodiments, with rank one transmissions, only a first layer of elements (e.g., TB1, CE1, IM1, and/or SS1) of FIG. 4 may be used; with rank two transmissions, two layers of elements (e.g., TB1, TB2, CE1, CE2, IM1, IM2, SS1, and/or SS2) of FIG. 4 may be used; with rank three transmissions, three layers of elements (e.g., TB1, TB2, TB3, CE1, CE2, CE3, IM1, IM2, IM3, SS1, SS2, and/or SS3) of FIG. 4 may be used; and with rank four transmissions, four layers of elements (e.g., TB1, TB2, TB3, TB4, CE1, CE2, CE3, CE4, IM1, IM2, IM3, and IM4, SS1, SS2, SS3, and/or SS4) of FIG. 4 may be used.

In embodiments of FIG. 4, base station processor 101 may support two HARQ process/codeword MIMO with 4 channel encoders CE1-CE4. Using feedback from wireless terminal 200 (indicated by "feedback channel"), adaptive controller 415 chooses transport block length, modulation order, and coding rate (used by transport block generator 401, encoder 403, and/or modulator 405). Adaptive controller 415 also generates precoding weight information used by layer precoder 411. Even though encoder 403 includes four channel encoders CE1-CE4, wireless terminal 200 may only provide feedback information for a maximum of two encoded transport block codewords. Stated in other words, wireless terminal 200 may provide one HARQ process/codeword for rank one transmissions (with one transport data blocks per TFRE using one downlink data streams), wireless terminal 200 may provide two HARQ processes/codewords for rank two transmissions (with two transport data blocks per TFRE using two downlink data streams), wireless terminal 200 may provide two HARQ processes/codewords for rank three transmissions (with three transport data blocks per TFRE using three downlink data streams), and wireless terminal 200 may provide two HARQ processes/codewords for rank four transmissions (with four transport data blocks per TFRE using four downlink data streams).

For rank three and rank four transmissions, a number of data streams generated by transport block generator 401, encoder 403, modulator 405, and spreader scrambler 409 is greater than a number of HARQ processes/codewords supported by base station 100 and/or wireless terminal 200. According to embodiments discussed herein, a HARQ process/codeword may be mapped to more than one data stream for rank 3 and rank 4 transmissions. For rank one transmissions, one HARQ process/codeword may be mapped directly to a first data stream (e.g., transmitted using a first transmission layer including TB1, CE1, IM1, and/or SS1 and received using a first reception layer including DM1, SB1, and/or CD1). For rank two transmission, a first HARQ process/codeword may be mapped directly to a first data stream (e.g., transmitted using a first transmission layer including TB1, CE1, IM1, and/or SS1 and received using a first reception layer including DM1, SB1, and/or CD1), and a second HARQ process/codeword may be mapped directly to a second data stream (e.g., transmitted using a third transmission layer including TB3, CE3, IM3, and/or SS3 and received using a third reception layer including DM3, SB3, and/or CD3). For rank three transmission, a first HARQ process/codeword may be mapped to a first data stream (e.g., transmitted using a first transmission layer including TB1, CE1, IM1, and/or SS1 and received using a first reception layer including DM1, SB1, and/or CD1) and to a second data stream (e.g., transmitted using a second transmission layer including TB2, CE2, IM2, and/or SS2 and received using a second reception layer including DM2, SB2, and/or CD2), and a second HARQ process/codeword may be mapped to a third data stream (e.g., transmitted using a third transmission layer including TB3, CE3, IM3, and/or SS3 and received using a third reception layer including DM3, SB3, and/or CD3). For rank four transmission, a first HARQ process/codeword may be mapped to a first data stream (e.g., transmitted using a first transmission layer including TB1, CE1, IM1, and/or SS1 and received using a first reception layer including DM1, SB1, and/or CD1) and to a second data stream (e.g., transmitted using a second transmission layer including TB2, CE2, IM2, and/or SS2 and received using a second reception layer including DM2, SB2, and/or CD 2), and a second HARQ process/codeword may be mapped to a third data stream (e.g., transmitted using a third transmission layer including TB3, CE3, IM3, and/or SS3 and received using a third reception layer including DM3, SB3, and/or CD3) and to a fourth data stream (e.g., transmitted using a fourth transmission layer including TB4, CE4, IM4, and/or SS4 and received using a fourth reception layer including DM4, SB4, and/or CD4).

According to some other embodiments, For rank one transmissions, one HARQ process/codeword may be mapped directly to a first data stream (e.g., transmitted using a first transmission layer including TB1, CE1, IM1, and/or SS1 and received using a first reception layer including DM1, SB1, and/or CD1). For rank two transmission, a first HARQ process/codeword may be mapped directly to a first data stream (e.g., transmitted using a first transmission layer including TB1, CE1, IM1, and/or SS1 and received using a first reception layer including DM1, SB1, and/or CD1), and a second HARQ process/codeword may be mapped directly to a second data stream (e.g., transmitted using a third transmission layer including TB2, CE2, IM2, and/or SS2 and received using a third reception layer including DM2, SB2, and/or CD2). For rank three transmission, a first HARQ process/codeword may be mapped to a first data stream (e.g., transmitted using a first transmission layer including TB1, CE1, IM1, and/or SS1 and received using a first reception layer including DM1, SB1, and/or CD1), and a second HARQ process/codeword may be mapped to a second data stream (e.g., transmitted using a second transmission layer including TB2, CE2, IM2, and/or SS2 and received using a second reception layer including DM2, SB2, and/or CD2) and to a third data stream (e.g., transmitted using a third transmission layer including TB3, CE3, IM3, and/or SS3 and received using a third reception layer including DM3, SB3, and/or CD3). For rank four transmission, a first HARQ process/codeword may be mapped to a first data stream (e.g., transmitted using a first transmission layer including TB1, CE1, IM1, and/or SS1 and received using a first reception layer including DM1, SB1, and/or CD1) and to a fourth data stream (e.g., transmitted using a fourth transmission layer including TB4, CE4, IM4, and/or SS4 and received using a fourth reception layer including DM4, SB4, and/or CD4), and a second HARQ process/codeword may be mapped to a second data stream (e.g., transmitted using a second transmission layer including TB2, CE2, IM2, and/or SS2 and received using a second reception layer including DM2, SB2, and/or CD2) and to a third data stream (e.g., transmitted using a third transmission layer including TB3, CE3, IM3, and/or SS3 and received using a third reception layer including DM3, SB3, and/or CD3).

Based on the rank chosen by adaptive controller 415, transport data blocks may be passed to encoder 403, and encoder outputs may be interleaved and modulated using modulator 405. Outputs of modulator 405 may be mapped to space time layers using layer mapper 407, and as discussed above, layer mapper 407 may provide a one-to-one layer mapping. The symbol stream(s) generated by layer mapper 407 may be spread and scrambled using spreader/scrambler 409, and layer precoder 411 may precode outputs of spreader/scrambler 409, with precoder outputs being passed through transceiver 109 and antenna array 117 (including Antennas Ant-1, Ant-2, Ant-3, and Ant-4).

Figure 5:
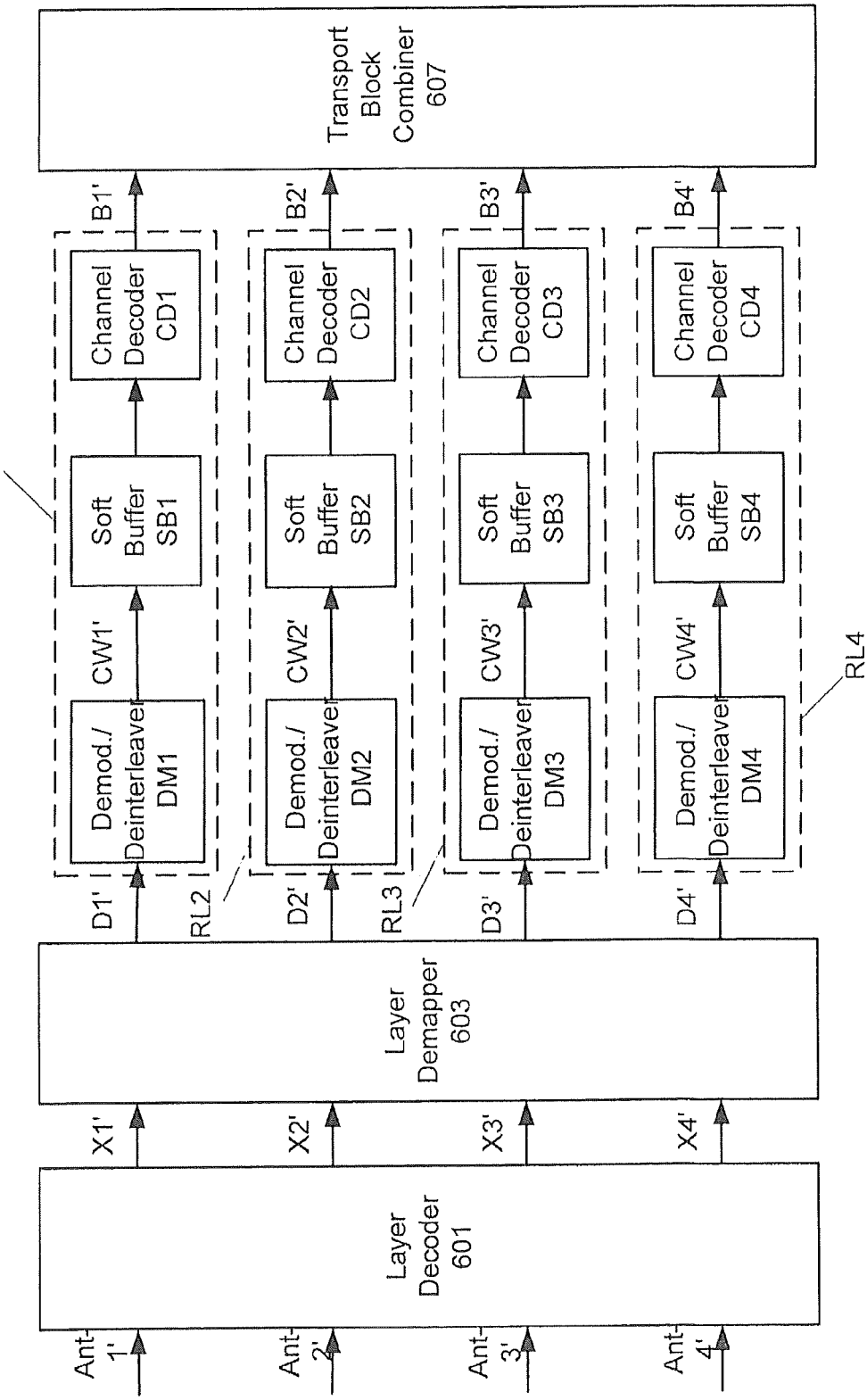
FIG. 5 is a block diagram illustrating elements/functionalities of wireless terminal processors according to some embodiments of FIG. 2.

At wireless terminal 200, operations of processor 201 may mirror operations of base station processor 101 when receiving the MIMO downlink communications transmitted by the base station. More particularly, elements/functionalities of wireless terminal processor 201 are illustrated in FIG. 5 mirroring elements/functionalities of base station processor 101 discussed above with reference to FIG. 4.

Radio signals may be received through MIMO antenna elements of MIMO antenna array 217 and transceiver 209, and the radio signals may be decoded by layer decoder 601 using a MIMO decoding vector to generate a plurality of MIMO decoded symbol layers X1', X2', X3', and/or X4' depending on MIMO rank used for transmission/reception. Layer Decoder 601 may use a decoding vector corresponding to the precoding vector used by base station 100. Layer decoder 601 may generate a single decoded symbol layer X1' for rank 1 reception, layer decoder 601 may generate two decoded symbol layers X1' and X3' for rank 2 reception, layer decoder 601 may generate three decoded symbol layers X1', X2', and X3' for rank 3 reception, and layer decoder 601 may generate four decoded symbol layers X1', X2', X3', and X4' for rank 4 transmission. Layer decoder 601 may thus perform a converse of operations performed by layer precoder 411 and spreader/scrambler 409 of base station 100. Layer decoder 601 may perform functionalities of a MIMO detector (corresponding to a converse of layer precoder 411) and of dispreading/descrambling blocks for each data stream/layer (corresponding to a converse of spreader/scrambler 409). Layer demapper 603 may function as a converse of layer mapper 407 to demap decoded symbol layers X1', X2', X3', and/or X4' to respective unmapped symbol layers D1', D2', D3', and/or D4' according to the transmission rank.

For rank one reception, layer demapper 603 may demap symbols of decoded symbol layer X1' blocks x1'-j directly to symbols of unmapped symbol layer D1' blocks d1'-j, demodulator/deinterleaver DM-1 may demodulate/deinterleave unmapped symbol layer blocks d1'-j to provide data codewords cw1'-j of codeword stream CW1', and channel decoder CD1 may decode data codewords cw1'-j of codeword stream CW1' to provide transport blocks B1'-j of stream B1'. Transport block generator 607 may then pass transport blocks B1'-j of stream B1' as a data stream. During rank one reception, demodulators/deinterleavers DM2, DM3, and DM4 and channel decoders CD2, CD3, and CD4 may be unused.

For rank two reception, layer decoder 601 may generate decoded symbol layers X1' and X3'. Layer demapper 603 may demap symbols of decoded symbol layer X1' blocks x1'-j directly to symbols of unmapped symbol layer D1' blocks d1'-j, and layer demapper 603 may demap symbols of decoded symbol layer X3' blocks x3'-j directly to symbols of unmapped symbol layer D3' blocks d3'-j. Demodulator/deinterleaver DM-1 may demodulate/deinterleave unmapped symbol layer blocks d1'-j to provide data codewords cw1'-j of codeword stream CW1', and demodulator/deinterleaver DM-3 may demodulate/deinterleave unmapped symbol layer blocks d3'-j to provide data codewords cw3'-j of codeword stream CW3'. Channel decoder CD1 may decode data codewords cw1'-j of codeword stream CW1' to provide transport blocks B1'-j of stream B1', and channel decoder CD3 may decode data codewords cw3'-j of codeword stream CW3' to provide transport blocks B3'-j of stream B3'. Transport block generator 607 may then combine transport blocks B1'-j and B3'-j of streams B1' and B3' as a data stream. During rank two reception, demodulators/deinterleavers DM2 and DM4 and channel decoders CD2 and CD4 may be unused.

For rank three reception, layer decoder 601 may generate decoded symbol layers X1', X2', and X3'. Layer demapper 603 may demap symbols of decoded symbol layer X1' blocks x1'-j directly to symbols of unmapped symbol layer D1' blocks d1'-j, layer demapper 603 may demap symbols of decoded symbol layer X2' blocks x2'-j directly to symbols of unmapped symbol layer D2' blocks d2'-j, and layer demapper 603 may demap symbols of decoded symbol layer X3' blocks x3'-j directly to symbols of unmapped symbol layer D3' blocks d3'-j. Demodulator/deinterleaver DM-1 may demodulate/deinterleave unmapped symbol layer blocks d1'-j to provide data codewords cw1'-j of codeword stream CW1', demodulator/deinterleaver DM-2 may demodulate/deinterleave unmapped symbol layer blocks d2'-j to provide data codewords cw2'-j of codeword stream CW2', and demodulator/deinterleaver DM-3 may demodulate/deinterleave unmapped symbol layer blocks d3'-j to provide data codewords cw3'-j of codeword stream CW3'. Channel decoder CD1 may decode data codewords cw1'-j of codeword stream CW1' to provide transport blocks B1'-j of stream B1', channel decoder CD2 may decode data codewords cw2'-j of codeword stream CW2' to provide transport blocks B2'-j of stream B2', and channel decoder CD3 may decode data codewords cw3'-j of codeword stream CW3' to provide transport blocks B3'-j of stream B3'. Transport block generator 607 may then combine transport blocks B1'-j, B2'-j, and B3'-j of streams B1', B2', and B3' as a data stream. During rank three reception, demodulator/deinterleaver DM4 and channel decoder CD4 may be unused.

For rank four reception, layer decoder 601 may generate decoded symbol layers X1', X2', X3', X4'. Layer demapper 603 may demap symbols of decoded symbol layer X1' blocks x1'-j directly to symbols of unmapped symbol layer D1' blocks d1'-j, layer demapper 603 may demap symbols of decoded symbol layer X2' blocks x2'-j directly to symbols of unmapped symbol layer D2' blocks d2'-j, and layer demapper 603 may demap symbols of decoded symbol layer X3' blocks x3'-j directly to symbols of unmapped symbol layer D3' blocks d3'-j, and layer demapper 603 may demap symbols of decoded symbol layer X4' blocks x4'-j directly to symbols of unmapped symbol layer D4' blocks d4'-j. Demodulator/deinterleaver DM-1 may demodulate/deinterleave unmapped symbol layer blocks d1'-j to provide data codewords cw1'-j of codeword stream CW1', demodulator/deinterleaver DM-2 may demodulate/deinterleave unmapped symbol layer blocks d2'-j to provide data codewords cw2'-j of codeword stream CW2', demodulator/deinterleaver DM-3 may demodulate/deinterleave unmapped symbol layer blocks d3'-j to provide data codewords cw3'-j of codeword stream CW3', and demodulator/deinterleaver DM-4 may demodulate/deinterleave unmapped symbol layer blocks d4'-j to provide data codewords cw4'-j of codeword stream CW4'. Channel decoder CD1 may decode data codewords cw1'-j of codeword stream CW1' to provide transport blocks B1'-j of stream B1', channel decoder CD2 may decode data codewords cw2'-j of codeword stream CW2' to provide transport blocks B2'-j of stream B2', channel decoder CD3 may decode data codewords cw3'-j of codeword stream CW3' to provide transport blocks B3'-j of stream B3', and channel decoder CD4 may decode data codewords cw4'-j of codeword stream CW4' to provide transport blocks B4'-j of stream B4'. Transport block generator 607 may then combine transport blocks B1'-j, B2' j, B3' j, and B4'-j of streams B1', B2', B3', and B4' as a data stream.

As further shown in FIG. 5, a respective soft buffer SB1, SB2, SB3, and SB4 may be provided for each stream of received data, and each decoder CD1, CD2, CD3, and CD4 may be configured to determine whether each decoded transport data block passes or fails decoding. In greater detail, each undecoded transport data block generated by a demodulator/decoder DM may be saved in the respective soft buffer SB until a decoding result is determined by the channel decoder CD. If the transport data block passes decoding, an ACK (acknowledge message) may be generated and provided as feedback for the base station, and retransmission of the successfully decoded (passed) data block is not required. If the transport data block does not pass decoding, a NACK (negative acknowledge message) may be generated and provided as feedback for the base station, and the undecoded output of the demodulator/deinterleaver (also referred to as soft bits) may be saved in soft buffer SB. Responsive to the NACK, the base station may retransmit the failed transport data block, and wireless terminal 200 may use the retransmitted data block together with the previously undecoded output of the demodulator/deinterleaver (that is saved in the respective soft buffer) to decode the retransmitted data block on the second pass. By using the soft buffer to combine first and second versions of the demodulated data block, a likelihood of successful decoding may be increased after retransmission.

As shown in FIG. 5, layer decoder 601 (e.g., including a MIMO detector such as a minimum mean squared error or MMSE receiver), may reduce interference from the multipath channel and/or may reduce other antenna interference. After dispreading, demapping, demodulating, and/or deinterleaving, wireless terminal 200 may attempt to decode the coded bits of a transport data block using a respective channel decoder. If the decoding attempt fails, wireless terminal 200 buffers the received soft bits of the transport data block in the respective soft buffer, and requests retransmission of the transport data block by transmitting a NACK message (e.g., as a part of an HARQ-ACK codeword, also referred to as a HARQ codeword). Once the retransmission is received (and subjected to decoding, demapping, demodulating, and/or deinterleaving) by wireless terminal 200, wireless terminal may combine the buffered soft bits with the received soft bits from the retransmission and attempt to decode the combination using a respective channel decoder.

For soft combining to operate properly, the wireless terminal may need to know whether a received transmission is a new transmission of a transport data block or a retransmission of a previously transmitted transport data block. For this purpose, the downlink control signaling may include a data indicator (also referred to as an indicator, a new data indicator, a new/old data indicator, etc.) that is used by the wireless terminal to control whether the soft buffer should be cleared or whether soft combining of the soft buffer and the received soft bits should take place. For a given transmission/retransmission to wireless terminal 200, the data indicator may thus have one value to indicate an initial transmission of new data and another value to indicate a retransmission of previously transmitted data.

Whenever a current transmission is not a retransmission, a NodeB base station MAC-ehs element of base station processor 101 may increment a single bit data indicator. Accordingly, the single bit data indicator may be toggled each time a new transport data block is transmitted over a MIMO layer. The data indicator can thus be used by wireless terminal processor 201 to clear the soft buffer/buffers for each initial transmission because no soft combining should be done for new/initial transmissions. The indicator may also be used to detect error cases in the status signaling. If the data indicator is not toggled despite the fact that the previous data for the HARQ process in question was correctly decoded and acknowledged (using an ACK message), for example, an error in the uplink signaling has most likely occurred. Similarly, if the indicator is toggled but the previous data for the HARQ process was not correctly decoded, the wireless terminal may replace the data previously in the soft buffer for the HARQ process with the new received data.

For rank four transmissions, wireless terminal 200 may thus receive up to four transport data blocks in a same TFRE to support four streams of transport data blocks. After decoding four data blocks for a TFRE during a rank 4 transmission, each decoder CD1, CD2, CD3, and CD4 may generate a respective local ACK or NACK depending on whether the respective transport data block passed or failed decoding. In a rank 4 transmission, decoders CD1 and CD2 may be mapped to the first HARQ process so that the resulting HARQ ACK/NACK is an ACK only if both decoders CD1 and CD2 generate a local ACK and the resulting HARQ AKC/NACK message from the first HARQ process is a NACK if either decoder CD1 or CD2 generated a local NACK; and decoders CD3 and CD4 may be mapped to the second HARQ process so that the resulting HARQ ACK/NACK from the second HARQ process is an ACK only if both decoders CD3 and CD4 generate a local ACK and the resulting HARQ AKC/NACK message is a NACK if either decoder CD3 or CD4 generated a local NACK.

For rank three transmissions, wireless terminal 200 may thus receive up to three transport data blocks in a same TFRE. After decoding three data blocks for a TFRE during a rank 3 transmission, each decoder CD1, CD2, and CD3 may generate a respective local ACK or NACK depending on whether the respective transport data block passed or failed decoding. In a rank 3 transmission, decoders CD1 and CD2 may be mapped to the first HARQ process so that the resulting HARQ ACK/NACK is an ACK only if both decoders CD1 and CD2 generate a local ACK and the resulting HARQ AKC/NACK message from the first HARQ process is a NACK if either decoder CD1 or CD2 generated a local NACK; and decoder CD3 may be mapped to the second HARQ process so that the resulting HARQ ACK/NACK from the second HARQ process is an ACK if decoder CD3 generates a local ACK and the resulting HARQ AKC/NACK message is a NACK if decoder CD3 generates a local NACK.

For rank two transmissions, wireless terminal 200 may receive up to two transport data blocks in a same TFRE. After decoding two data blocks for a TFRE during a rank 2 transmission, each decoder CD1 and CD3 may generate a respective local ACK or NACK depending on whether the respective transport data block passed or failed decoding. In a rank two transmission, decoders CD1 may be mapped to the first HARQ process so that the resulting HARQ ACK/NACK is an ACK only if decoder CD1 generates a local ACK and the resulting HARQ AKC/NACK message from the first HARQ process is a NACK if decoder CD1 generates a local NACK; and decoder CD3 may be mapped to the second HARQ process so that the resulting HARQ ACK/NACK from the second HARQ process is an ACK if decoder CD3 generates a local ACK and the resulting HARQ AKC/NACK message is a NACK if decoder CD3 generates a local NACK.

For rank one transmissions, wireless terminal 200 may thus receive one transport data block in a TFRE. After decoding one data block for a TFRE during a rank 1 transmission, decoder CD1 may generate a respective ACK or NACK depending on whether the transport data block passed or failed decoding. In a rank one transmission, decoder CD1 may be mapped to the first HARQ process so that the resulting HARQ ACK/NACK is an ACK if decoder CD1 generates a local ACK and the resulting HARQ AKC/NACK message from the first HARQ process is a NACK if decoder CD1 generates a local NACK.

According to some other embodiments, first transmission/reception layers TL1/RL1 may be used during rank 1 transmission/reception, and HARQ process HARQ-1 may be mapped to a data block of the first transmission/reception layers TL1/RL1 during rank 1 transmission/reception. First and second transmission/reception layers TL1/RL1 and TL2/RL2 may be used during rank 2 transmission/reception, HARQ process HARQ-1 may be mapped to a data block of the first transmission/reception layers TL1/RL1 during rank 1 transmission/reception, and HARQ process HARQ-2 may be mapped to a data block of the second transmission/reception layers TL2/RL2 during rank 2 transmission/reception. First, second, and third transmission/reception layers TL1/RL1, TL2/RL2, and TL3/RL3 may be used during rank 3 transmission/reception, HARQ process HARQ-1 may be mapped to a data block of the first transmission/reception layers TL1/RL1 during rank 3 transmission/reception, and HARQ process HARQ-2 may be mapped to data blocks of the second and third transmission/reception layers TL2/RL2 and TL3/RL3 during rank 3 transmission/reception. First, second, third, and fourth transmission/reception layers TL1/RL1, TL2/RL2, TL3/RL3, and TL4/RL4 may be used during rank 4 transmission/reception, HARQ process HARQ-1 may be mapped to data blocks of the first and fourth transmission/reception layers TL1/RL1 and TL4/RL4 during rank 4 transmission/reception, and HARQ process HARQ-2 may be mapped to data blocks of the second and third transmission/reception layers TL2/RL2 and TL3/RL3 during rank 4 transmission/reception. A MIMO layer (supported by respective transmission/reception layers) may thus define a logical channel over which a data block (or a stream of data blocks) is transmitted.

Figure 6:
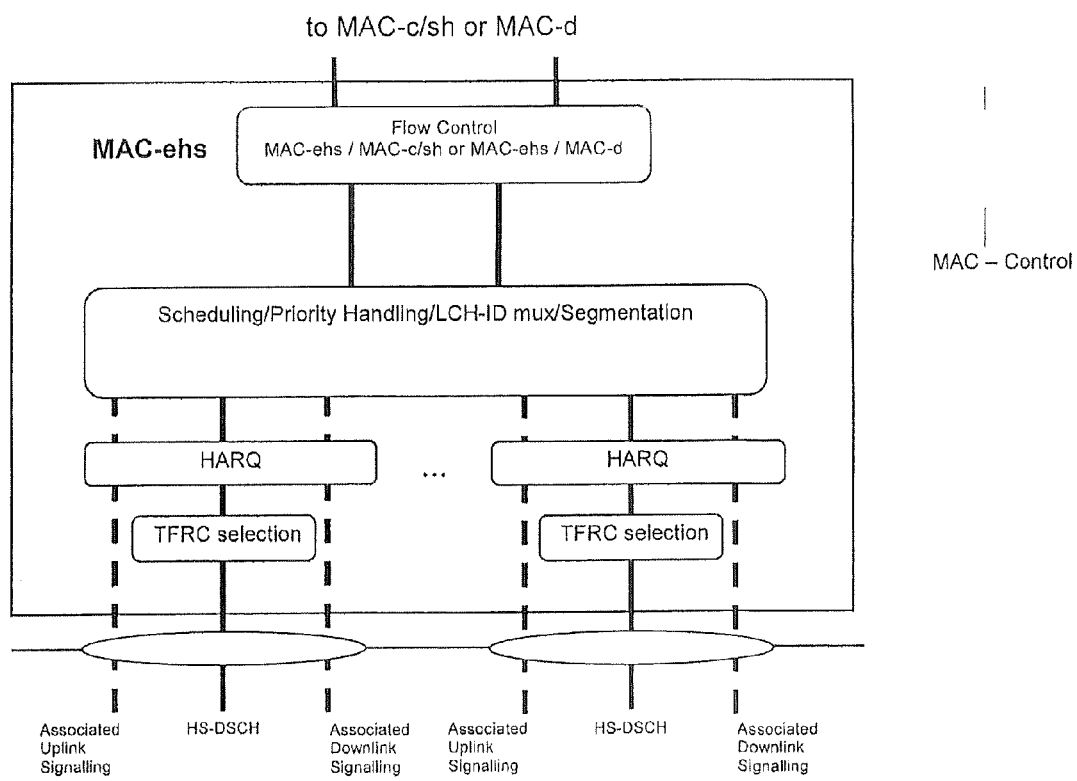
FIG. 6 illustrates schematically a medium access control (MAC) entity in a wireless terminal (UE)

According to embodiments discussed herein, a HARQ process in a MAC-ehs of wireless terminal processor 101 may provide MAC functionality illustrated in FIG. 6. FIG. 6 illustrates MAC (Media Access Control) functionality at wireless terminal 200. As shown in FIG. 6, one HARQ entity may handle HARQ functionality for one user per HS-DSCH (High Speed Downlink Shared Channel). One HARQ entity may be capable of supporting multiple instances (multiple HARQ processes) of stop and wait HARQ protocols. According to some embodiments, there shall be one HARQ entity per HS-DSCH, one HARQ process per TTI (Transmission Time Interval) for single stream (rank one) transmission, and two HARQ processes per TTI for two stream (rank two) transmission, three stream (rank three) transmission, and four stream (rank four) transmission.

Because only 2 HARQ processes are supported for MIMO transmission/reception using three downlink streams (rank three) and for MIMO transmission/reception using four downlink stream (rank four), the mapping of soft buffers may be provided according to the table of FIG. 7A for rank 3 and according to the table of FIG. 7B rank 4 downlink transmission/reception. Note that any one of the combinations of FIG. 7A may be used for rank 4 downlink transmission, and that any one of the combinations of FIG. 7B may be used for rank 3 down link transmissions. Whenever the data indicator for a shared HARQ process (i.e., a HARQ process shared by two or more streams/layers) indicates that new data has been initially transmitted over the downlink (e.g., the data indicator has been toggled), the soft buffers for both/all streams associated with the shared HARQ process should be cleared. Whenever the data indicator for a shared HARQ process (i.e., a HARQ process shared by two or more streams/layers) indicates that old data is being retransmitted, the soft buffers for both/all streams associated with the shared HARQ process should be combined with the retransmitted data of the respective data streams.

For rank one transmissions, a first HARQ process may be used for the single downlink data stream (e.g., for a downlink stream transmitted using TB1, CE1, IM1, and/or SS1 defining a first transmission layer and received using DM1, SB1, and/or CD1 defining a first reception layer). Accordingly, one data indicator flag may be transmitted by base station for one transport data block of the downlink data stream, and wireless terminal 200 may receive the one transport data block using DM1, SB1, and CD1. If the data indicator indicates that the transport data block is a new/initial transmission, wireless terminal 200 may clear soft buffer SB1 and attempt to decode using channel decoder CD1. If the data indicator indicates that the transport data block is a retransmission of a previously failed transmission, wireless terminal 200 may combine soft bits of the retransmission (generated by demodulator/deinterleaver DM1) with soft bits from soft buffer SB1 and attempt to decode the combination using channel decoder CD1. If channel decoder CD1 is able to successfully decode the transmission/retransmission, an ACK message is generated and transmitted to base station 100 (e.g., as an element of a HARQ-ACK codeword, also referred to as a HARQ codeword). If channel decoder CD1 is unable to decode the transmission/retransmission, a NACK message is generated and transmitted to base station 100 (e.g., as an element of a HARQ-ACK codeword, also referred to as a HARQ codeword). A single HARQ process (including a data indicator, a NACK message and/or an ACK message) may thus map to each transport data block transmitted over the rank/layer one downlink data stream.

For rank two transmissions, a first HARQ process (including a data indicator, a NACK message and/or an ACK message) may map to each transport data block transmitted over a first stream of the rank two transmission (e.g., for a downlink stream transmitted using TB1, CE1, IM1, and/or SS1 defining a first transmission layer and received using DM1, SB1, and/or CD1 defining a first reception layer), and a second HARQ process (including a data indicator, a NACK message and/or an ACK message) may map to each transport data block transmitted over a second stream of the rank two transmission (e.g., for a downlink stream transmitted using TB3, CE3, IM3, and/or SS3 defining a third transmission layer and received using DM3, SB3, and/or CD3 defining a third reception layer). Each of the first and second HARQ processes may thus operate for transport data blocks of respective streams of the rank two transmissions as discussed above with respect to rank/layer one transmissions. Stated in other words, a respective data indicator may be provided for each transport data block received during a same TFRE, soft buffers for the respective downlink data streams may be independently cleared or maintained for retransmission combining responsive to the respective data indicators, and respective ACK/NACK messages may be generated and transmitted to base station 100 for each transport data block received during a same TFRE.

For higher order transmission ranks/layers, however, a HARQ process may be shared by two or more downlink data streams to reduce uplink feedback signaling. For rank three downlink transmissions, a first HARQ process (including one data indicator and one ACK/NACK message per TFRE) may map to first and second streams of transport data blocks, and a second HARQ process (including one data indicator and one ACK/NACK message per TFRE) may map to a third stream of transport data blocks. For rank three downlink transmissions, for example, a first HARQ process may map to each transport data block transmitted over a first stream of the rank three transmission (e.g., for a downlink stream transmitted using TB1, CE1, IM1, and/or SS1 defining a first transmission layer and received using DM1, SB1, and/or CD1 defining a first reception layer) and to each transport data block transmitted over a second stream of the rank three transmission (e.g., for a downlink stream transmitted using TB2, CE2, IM2, and/or SS2 defining a second transmission layer and received using DM2, SB2, and/or CD2 defining a second reception layer); and a second HARQ process may map to each transport data block transmitted over a third stream of the rank three transmission (e.g., for a downlink stream transmitted using TB3, CE3, IM3, and/or SS3 defining a third transmission layer and received using DM3, SB3, and/or CD3 defining a third reception layer). During rank three transmissions, the first HARQ process may thus be shared by data blocks of the first and second streams that are transmitted using a same TFRE so that the first and second streams are bundled to a same HARQ process. Accordingly, one HARQ ACK/NACK message and one data indicator may be mapped to both data blocks of a same TFRE for the first and second streams during rank three transmission. In contrast, the second HARQ process, may be applied to only the third data stream, so that one HARQ ANK/NACK message and one data indicator may be mapped to one data block of each TFRE of the third stream.

Accordingly, first, second, and third transport data blocks may be transmitted during a same TFRE over respective the first, second, and third streams during a rank three transmission. A first data indicator may be transmitted by base station 100 for both of the first and second transport data blocks of the first and second downlink data streams. If the first data indicator indicates a new/initial transmission, wireless terminal 200 may clear soft buffers SB1 and SB2 and attempt to decode the first and second transport data blocks using channel decoders CD1 and CD2. If the first data indicator indicates a retransmission, wireless terminal 200 may combine soft bits of the first and second transport data blocks (generated by demodulators/deinterleavers DM1 and DM2) with soft bits from respective soft buffers SB1 and SB2 and attempt to decode the combinations using respective channel decoders CD1 and CD2. If both channel decoders CD1 and CD2 are able to successfully decode the transmissions/retransmissions, an ACK message is generated and transmitted to base station 100 (e.g., as an element of a shared HARQ-ACK codeword, also referred to as a HARQ codeword). If either of channel decoders CD1 or CD2 is unable to decode the transmissions/retransmissions, a NACK message is generated and transmitted to base station 100 (e.g., as an element of a shared HARQ-ACK codeword, also referred to as a HARQ codeword). The first HARQ process (including a single data indicator and a single ACK/NACK message) may thus be shared by two transport data blocks transmitted over different downlink data streams during a same TFRE. A second data indicator may be transmitted by base station 100 for the third transport data block of the third stream, and soft buffer SB3 may be cleared if the second data indicator indicates that the third transport data block is an initial transmission, or soft buffer SB3 may be maintained for combined decoding if the second data indicator indicates that the first transport data block is a retransmission. If channel decoder CD3 is able to successfully decode the transmission/retransmission, an ACK message is generated and transmitted to base station 100 (e.g., as an element of a HARQ-ACK codeword, also referred to as a HARQ codeword). If channel decoder CD3 is unable to decode the transmissions/retransmissions, a NACK message is generated and transmitted to base station 100 (e.g., as an element of a HARQ-ACK codeword, also referred to as a HARQ codeword).

For rank/layer four downlink transmissions according to some embodiments, the first HARQ process may be shared between a first stream (e.g., for a downlink stream transmitted using TB1, CE1, IM1, and/or SS1 defining a first transmission layer and received using DM1, SB1, and/or CD1 defining a first reception layer) and a second stream (e.g., for a downlink stream transmitted using TB2, CE2, IM2, and/or SS2 defining a second transmission layer and received using DM2, SB2, and/or CD2 defining a second reception layer), and the second HARQ process may be shared between a third stream (e.g., for a downlink stream transmitted using TB3, CE3, IM3, and/or SS3 defining a third transmission layer and received using DM3, SB3, and/or CD3 defining a third reception layer) and a fourth stream (e.g., for a downlink stream transmitted using TB4, CE4, IM4, and/or SS4 defining a fourth transmission layer and received using DM4, SB4, and/or CD4 defining a fourth reception layer). The sharing of a HARQ process between any two data streams may be the same as discussed above with respect the sharing of the first HARQ process between first and second data streams during rank three transmissions. Where a HARQ process is shared between two streams, the HARQ process provides one data indicator and one ACK/NACK message for each TFRE for all data streams sharing the HARQ process.

A HARQ process/identification (e.g., HARQ-1/H_a or HARQ-2/H_b) may thus be used to support downlink transmissions/retransmissions from base station 100 to wireless terminal 200, and two HARQ processes/identifications may support HARQ ACK/NACK/DTX signaling for 4-antenna MIMO systems supporting up to 4 layer/stream downlink transmissions (and/or higher antenna systems supporting higher rank/layer transmissions). For rank 1 transmissions, first HARQ process/identification HARQ-1/H_a maps to a first layer supported by transmission/reception layers TL1/RL1. For rank 2 transmissions, first HARQ process/identification HARQ-1/H_a maps to the first layer supported by transmission/reception layers TL1/RL1, and second HARQ process/identification HARQ-2/H_a maps to a second layer supported by transmission/reception layers TL2/RL2. For rank 3 transmissions, first HARQ process/identification HARQ-1/H_a maps to the first layer supported by transmission/reception layers TL1/RL1, and second HARQ process/identification HARQ-2/H_b maps to second and third layers supported by transmission/reception layers TL2/RL2 and TL3/RL3. For rank 4 transmissions, first HARQ process/identification HARQ-1/H_a maps to first and fourth layers supported by transmission/reception layers TL1/RL1 and TL4/RL4, and second HARQ process/identification HARQ-2/H_b maps to second and third layers supported by transmission/reception layers TL2/RL2 and TL3/RL3.

Because of the delay between base station 100 transmitting a first data block(s) to wireless terminal 200 during a first downlink TTI/TFRE and receiving a HARQ ACK/NACK response(s) for the first data block(s) from wireless terminal 200, second data block(s) may be transmitted to wireless terminal 200 during a second downlink TTI/TFRE before receiving the HARQ ACK/NACK response(s) for the first data block(s). Accordingly, HARQ process identifications may be used by base station 100 to distinguish between different HARQ ACK/NACK responses for different data blocks of different downlink TTIs/TFREs transmitted to the same wireless terminal 200. Stated in other words, HARQ process identifications may be used to match HARQ ACK/NACK responses with the appropriate data block(s) and TTI/TFRE. HARQ process identifications may also be used by wireless terminal 100 to match the data block/blocks with the appropriate soft bits from the respective soft buffer/buffers.

A same HARQ process identification may thus be used for the initial transmission and each retransmission of a data block/blocks to wireless terminal 200 until either the data block/blocks is/are successfully received/decoded by wireless terminal 200 (as indicated by an ACK) or until a maximum allowed number of retransmissions have occurred. Once the data block/blocks have been successfully received/decoded or a maximum number of retransmissions has occurred, the HARQ process identification for the data block/blocks may be destroyed, meaning that the HARQ process identification may then be reused for a new data block/blocks.

According to some embodiments, a HARQ process identification may be selected from one of eight values (e.g., 1, 2, 3, 3, 5, 6, 7, or 8). For rank 1, 2, and 3 downlink transmissions to wireless terminal 200, HARQ process identification H_a is mapped to a first HARQ process HARQ-1 for layer 1 transmission using transmission/reception layers TL1/RL1. For rank 4 downlink transmissions to wireless terminal, HARQ process identification H_a is mapped to the first HARQ process HARQ-1 for layer 1 and 4 transmissions using transmission/reception layers TL1/RL1 and TL4/RL4. For rank 2 downlink transmissions to wireless terminal 200, HARQ process identification H_b is mapped to a second HARQ process HARQ-2 for layer 2 transmission using transmission/reception layer TL2/RL2. For rank 3 and 4 downlink transmissions to wireless terminal, HARQ process identification H_b is mapped to the second HARQ process HARQ-2 for layer 2 and 3 transmissions using transmission/reception layers TL2/RL2 and TL3/RL3. Accordingly, HARQ process HARQ-1 and identification H_a are used for rank 1, 2, 3, and 4 transmissions, and HARQ process HARQ-2 and identification H_b are used for rank 2, 3, and 4 transmissions.

For an initial rank 1 transmission of a data block, a currently unused identification value (e.g., selected from 1-8) is assigned to H_a for HARQ process HARQ-1, and H_a is used to identify the instance of HARQ-1 that is applied to transmissions/retransmissions of the layer 1 data block and that is applied to HARQ ACK/NACK responses corresponding to the layer 1 data block.

For an initial rank 2, 3, or 4 transmission of data blocks using both HARQ processes HARQ-1 and HARQ-2 during a same TTI/TFRE, a currently unused identification value (e.g., selected from 1-8) is assigned to H_a for HARQ process HARQ-1, and another identification value is assigned to H_b for process HARQ-2 (e.g., as a function of H_a). Accordingly, H_a is used to identify the instance of HARQ-1 that is applied to transmissions/retransmissions of layer 1/4 data block/blocks (for layer 1 and/or 4 transmissions/retransmissions) and that is applied to HARQ ACK/NACK responses corresponding to the layer 1/4 data blocks, and H_b is used to identify the instance of HARQ-2 that is applied to transmissions/retransmissions of the layer 2/3 data block/blocks (for layer 2 and/or 3 transmissions/retransmissions) and that is applied to HARQ ACK/NACK responses corresponding to the layer 2/3 data block/blocks.

According to some embodiments, HARQ process identification H_b may be assigned as a function of HARQ process identification H_a. With eight different HARQ process identification values from one to eight, for example, identification H_b may be assigned according to the following formula:

$$H\_b = (H\_a + N/2) \bmod (N),$$

where N is the number of HARQ processes (e.g., two for HARQ-1 and HARQ-2) as configured by higher layers and/or by the radio network controller. With two HARQ processes and eight different HARQ process identification values, identification H_b may be selected as a function of H_a according to the following table:

| H_a | H_b |
|-----|-----|
| 1 | 5 |
| 2 | 6 |
| 3 | 7 |
| 4 | 8 |
| 5 | 1 |
| 6 | 2 |
| 7 | 3 |
| 8 | 4 |

Accordingly, only one of the HARQ process identifications (e.g., H_a) may need to be transmitted between base station 100 and wireless terminal 200, with the other HARQ process identification (e.g., H_b) being derived at the receiving device using H_a.

If the Node B (base station) schedules three transport blocks in any transmission (i.e., rank 3), for retransmissions, the second transport block and the third transport block are retransmitted with the same HARQ process identifier (that was shared by the second and third transport blocks for the initial transmission) as discussed above. If the Node B schedules four transport blocks in any transmission, for retransmissions, the primary transport block and the fourth transport block are re-transmitted with the same HARQ process identifier (that was shared by the primary and fourth transport blocks for the initial transmission), and the second and third transport blocks are re-transmitted with the same HARQ process identifier (that was shared by the second and third transport blocks for the initial transmission), as discussed above.

Figure 8A:
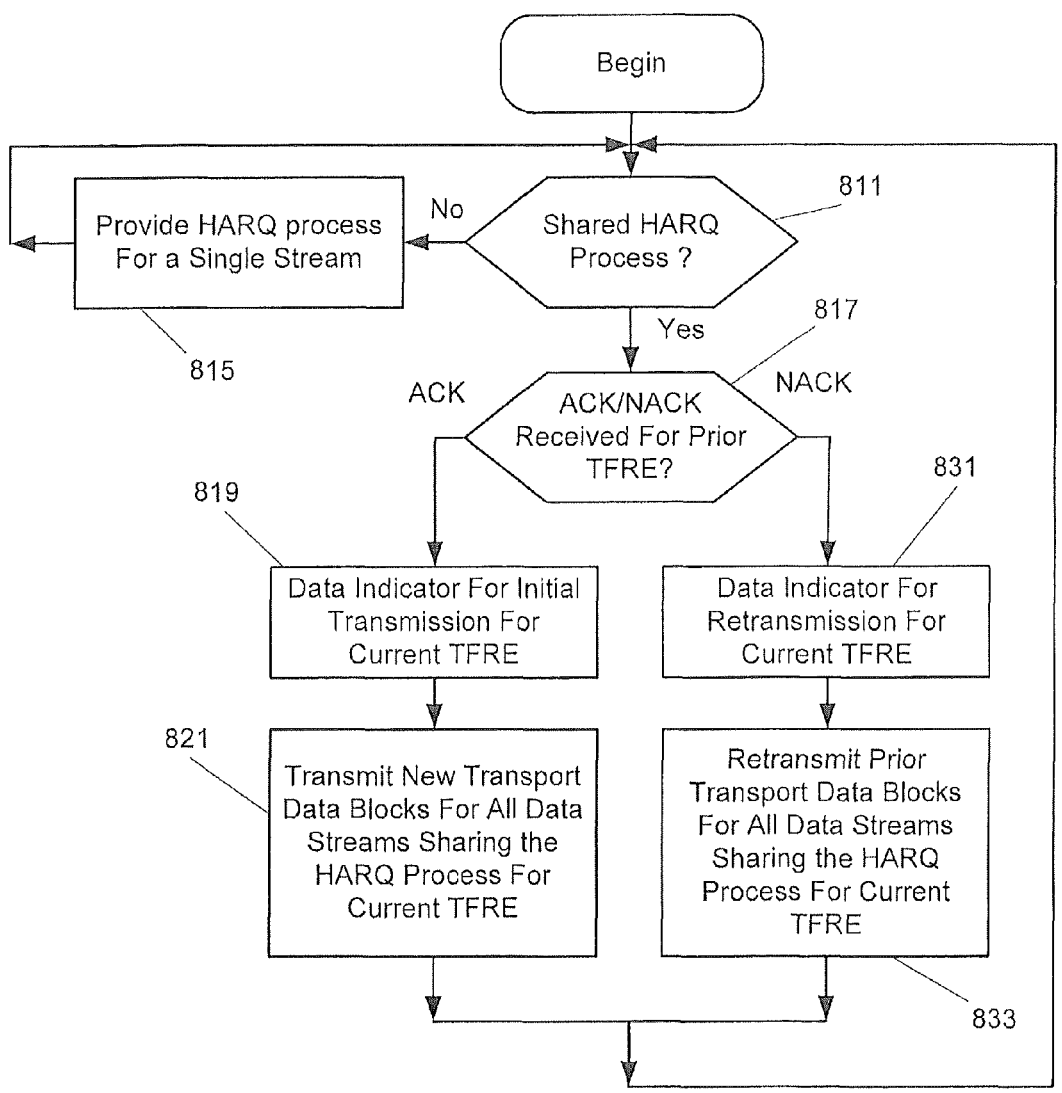

Operations of a HARQ process shared by multiple data streams will now be discussed in greater detail below with respect to the flow charts of FIGS. 8A and 8B. FIG. 8A illustrates operations of a base station transmitting multiple MIMO data streams using a shared HARQ process according to some embodiments, and FIG. 8B illustrates operations of a wireless terminal receiving multiple MIMO data streams using a shared HARQ process according to some embodiments. Operations of FIGS. 8A and 8B may be discussed concurrently because the base station and wireless terminal operations may be interleaved.

As shown in FIG. 8A, base station processor 101 may determine for an HARQ process if the HARQ process is being applied to a single MIMO data stream or if the HARQ process is being shared by multiple (e.g., two) MIMO data streams at block 811. If the HARQ process is being applied to only one MIMO data stream, the HARQ process may be applied individually to the single MIMO data stream at block 815 so that one ACK/NACK message (received from wireless terminal 200) from the prior TFRE is applied only to the single MIMO data stream for the current TFRE, and so that one data indicator is applied only to the single MIMO data stream for the current TFRE.

If the HARQ process is being shared by multiple MIMO data streams at block 811, base station processor 101, may determine whether an ACK message or a NACK message was received in response to transport data blocks transmitted over the multiple MIMO data streams in a/the preceding TFRE. As discussed above, one ACK or NACK message may be transmitted by wireless terminal 200 for a plurality data streams sharing a HARQ process.

If an ACK message was received for the prior TFRE transmission at block 817, base station processor 101 may generate and transmit a data indicator indicating an initial transmission of new data for all transport data blocks being transmitted during the current TFRE for the data streams sharing the HARQ process at block 819. At block 821, base station processor 101 may generate and transmit new transport data blocks for all data streams sharing the HARQ process.

If a NACK message was received for the prior TFRE transmission at block 817, base station processor 101 may generate and transmit a data indicator indicating a retransmission of the prior data for all transport data blocks being transmitted during the current TFRE for the data streams sharing the HARQ process at block 831. At block 833, base station processor 101 may retransmit the previously transmitted transport data blocks for all data streams sharing the HARQ process. A single NACK message may thus result in retransmission of transport data blocks for all data streams sharing the HARQ process.

As shown in FIG. 8B, responsive to receiving data for a TFRE at block 849, wireless terminal processor 201 may determine for a HARQ process if the HARQ process is being applied to a single MIMO data stream or if the HARQ process is being shared by multiple (e.g., two) MIMO data streams at block 851. If the HARQ process is being applied to only one MIMO data stream, the HARQ process may be applied individually to the single MIMO data stream at block 853 so that one ACK/NACK message is generated for only the single MIMO data stream, and so that a data indicator is applied only to the single MIMO data stream for the current TFRE. As discussed above with respect to a four antenna system, for example, a first HARQ process (HARQ-1) may be applied individually to a first MIMO data stream (e.g., using TB1, CE1, IM1, DM1, SB1, and/or CD1) for rank 1, rank 2, and rank 3 transmission/reception, and a second HARQ process (HARQ-2) may be applied individually to a second MIMO data stream (e.g., using TB2, CE2, IM2, DM2, SB2, and/or CD2) for rank 2 transmission/reception.

If the HARQ process is being shared by multiple MIMO data streams at block 851, wireless terminal processor 201 may determine at block 855 whether a data indicator (transmitted by base station 100) indicates that the transport data blocks are initial transmissions of new data or retransmissions of old data transmitted in a previous TFRE.

As discussed above with respect to a four antenna system, for example, a first HARQ process (HARQ-1) may be shared by a first MIMO data stream (e.g., using TB1, CE1, IM1, DM1, SB1, and/or CD1) and a fourth MIMO data stream (e.g., using TB4, CE4, IM4, DM4, SB4, and/or CD4) for rank 4 transmission/reception, and a second HARQ process (HARQ-2) may be shared by a second MIMO data stream (e.g., using TB2, CE2, IM2, DM2, SB2, and/or CD2) and a third MIMO data stream (e.g., using TB3, CE3, IM3, DM3, SB3, and/or CD3) for rank 3 and rank 4 transmission/reception.

If the transport data blocks of the shared HARQ process are initial transmissions of new data, all soft buffers of the data streams sharing the HAQ process are cleared at block 861 (responsive to the one data indicator), and each of the transport data blocks of the data streams sharing the HARQ process are separately demodulated at block 863 to generate soft bits for the respective transport data blocks. The soft bits for the respective transport data blocks are then decoded at bock 865 to generate the original transport data blocks. If all of the current transport data blocks (of the current TFRE) of the MIMO data streams sharing the HARQ process are successfully decoded at block 867, one ACK message may be generated and transmitted to base station 100 at block 869 for all of the transport data blocks sharing the HARQ process. If one of the current transport data blocks (of the current TFRE) of the MIMO data streams sharing the HARQ process fails decoding at block 867, one NACK message may be generated and transmitted to base station 100 at block 871 for all of the transport data blocks sharing the HARQ process.

If the transport data blocks of the shared HARQ process are retransmissions at block 855, all soft buffers of the data streams sharing the HAQ process are maintained at block 881 (responsive to the one data indicator indicating retransmission), and each of the transport data blocks of the data streams sharing the HARQ process are separately demodulated at block 883 to generate soft bits for the respective transport data blocks. The soft bits for the respective transport data blocks are then combined with the corresponding soft bits from respective soft buffers at block 885, and the combinations of old/new soft bits are separately decoded at bock 887 to generate the original transport data blocks. If all of the current transport data blocks (of the current TFRE) of the MIMO data streams sharing the HARQ process are successfully decoded at block 887 and 867, one ACK message may be generated and transmitted to base station 100 at block 869 for all of the transport data blocks sharing the HARQ process. If one of the current transport data blocks (of the current TFRE) of the MIMO data streams sharing the HARQ process fails decoding at block 867, one NACK message may be generated and transmitted to base station 100 at block 871 for all of the transport data blocks sharing the HARQ process.

In a multiple HARQ codeword MIMO system supporting up to four MIMO data streams with HARQ codeword dimensioning, for example, two HARQ codewords may be mapped to three MIMO data streams/layers for rank 3 transmissions and to four MIMO data streams/layers for rank 4 transmissions. For rank three downlink transmissions, for example, a first HARQ process (HARQ-1) may map to each transport data block transmitted over a first stream of the rank three transmission (e.g., for a downlink stream transmitted using TB1, CE1, IM1, and/or SS1 defining a first transmission layer TL1 and received using DM1, SB1, and/or CD1 defining a first reception layer RL1) and to each transport data block transmitted over a second stream of the rank three transmission (e.g., for a downlink stream transmitted using TB2, CE2, IM2, and/or SS2 defining a second transmission layer TL2 and received using DM2, SB2, and/or CD2 defining a second reception layer RL2); and a second HARQ process (HARQ-2) may map to each transport data block transmitted over a third stream of the rank three transmission (e.g., for a downlink stream transmitted using TB3, CE3, IM3, and/or SS3 defining a third transmission layer TL3 and received using DM3, SB3, and/or CD3 defining a third reception layer RL3). For rank four downlink transmissions, the first HARQ process (HARQ-1) may map to each transport data block transmitted over a first stream of the rank four transmission (e.g., for a downlink stream transmitted using TB1, CE1, IM1, and/or SS1 defining a first transmission layer TL1 and received using DM1, SB1, and/or CD1 defining a first reception layer RL4) and to each transport data block transmitted over a second stream of the rank four transmission (e.g., for a downlink stream transmitted using TB2, CE2, IM2, and/or SS2 defining a second transmission layer TL2 and received using DM2, SB2, and/or CD2 defining a second reception layer RL2); and the second HARQ process (HARQ-2) may map to each transport data block transmitted over a third stream of the rank four transmission (e.g., for a downlink stream transmitted using TB3, CE3, IM3, and/or SS3 defining a third transmission layer TL3 and received using DM3, SB3, and/or CD3 defining a third reception layer TL4) and over a fourth stream of the rank four transmission (e.g., for a downlink stream transmitted using TB4, CE4, IM4, and/or SS4 defining a fourth transmission layer TL4 and received using DM4, SB4, and/or CD4 defining a fourth reception layer RL4). This sharing of HARQ processes may be referred to as bundling and/or sharing.

As further discussed above, if either data block sharing a HARQ process is not successfully decoded at the respective channel decoder (e.g., if a data block fails at either of channel decoders CD1 or CD2 sharing the first HARQ process (HARQ-1) during a rank 3 or a rank 4 transmission, or if a data block fails at either of channel decoders CD3 or CD4 sharing the second HARQ process (HARQ-2) during a rank 4 transmission, a single NACK for the bundled/shared HARQ process may be transmitted to base station 100 and soft bits for both of the failed data blocks may be saved at respective soft buffers (corresponding to the respective channel decoders and/or HARQ processes) for subsequent combining with retransmissions of the failed data blocks. If the transmission rank requested by wireless terminal 200 changes between transmitting the initial data blocks and retransmitting the failed data blocks, however, the retransmission may be complicated if the updated rank does not support the shared HARQ process for the failed data blocks. More particularly, the soft buffers may be mapped to respective HARQ processes so that the soft bits saved in one or both of the respective soft buffers may be unavailable if the mapping of the bundled HARQ process according to the updated transmission rank does not include both soft buffers. Accordingly, base station 100 may be unable to retransmit the failed bundled data blocks using the updated rank thereby increasing delay in retransmitting the failed bundled data blocks.

In a rank 3 or a rank 4 transmission using one TFRE to transmit three or four data blocks, for example, a first data block may be transmitted using a first transmission layer TL1 (e.g., including TB1, CE1, IM1, and/or SS1) and received using a first reception layer RL1 (e.g., including DM1, SB1, and/or CD1), and a second data block may be transmitted using a second transmission layer TL2 (e.g., including TB2, CE2, IM2, and/or SS2) and received using a second reception layer RL2 (e.g., including DM2, SB2, and/or CD2). If either or both of the first or second data blocks fails decoding at respective channel decoder CD1 and/or CD2, wireless terminal 200 may transmit a single NACK message to base station 100 indicating failure of the bundled first and second data packets, and soft bits of the first and second data blocks (from respective demodulators/deinterleavers DM1 and DM2) may be saved at respective soft buffers SB1 and SB2 for subsequent combining with retransmissions of the first and second data blocks. If the transmission rank is reduced to rank 1 or rank 2, however, transmission/reception along the second transmission layer TL2 (e.g., including TB2, CE2, IM2, and/or SS2) and the second reception layer RL2 (e.g., including DM2, SB2, and/or CD2) may no longer be supported so that parallel retransmission of the first and second data packets using the first HARQ process HARQ-1 (including both soft buffers SB1 and SB2) may not be possible.

Similarly, in a rank 4 transmission using one TFRE, for example, a third data block may be transmitted using a third transmission layer TL3 (e.g., including TB3, CE3, IM3, and/or SS3) and received using a third reception layer RL3 (e.g., including DM3, SB3, and/or CD3), and a fourth data block may be transmitted using a fourth transmission layer TL4 (e.g., including TB4, CE4, IM4, and/or SS4) and received using a fourth reception layer RL4 (e.g., including DM4, SB4, and/or CD4). If either or both of the third and/or fourth data blocks fails decoding at respective channel decoder CD3 and/or CD4, wireless terminal 200 may transmit a single NACK message to base station 100 indicating failure of the bundled third and fourth data blocks, and soft bits of the third and fourth data blocks (from respective demodulators/deinterleavers DM3 and DM4) may be saved at respective soft buffers SB3 and SB4 for subsequent combining with retransmissions of the first and second data blocks. If the transmission rank is reduced to rank 1, rank 2, or rank 3, however, transmission/reception along the third and/or fourth transmission/reception layers may no longer be supported so that parallel retransmission of the third and fourth data packets using the second HARQ process HARQ-2 (including both soft buffers SB3 and SB4) may not be possible.

According to some embodiments, base station 100 may delay changing a downlink transmission rank for wireless terminal 200 until either ACKs have been received for all data blocks previously transmitted to wireless terminal 200 or a maximum number of retransmissions have occurred. Accordingly, mappings of HARQ processes to transmission/reception layers (including respective soft buffers) may be maintained as needed for retransmissions of any failed data blocks that were initially transmitted using a shared/bundled HARQ process. Because downlink channel conditions may vary at a relatively low rate over two to three consecutive transmission time intervals, however, a relatively low transmission quality of the downlink channel which resulted in the initial channel decoder failure may remain relatively low so that a higher number of retransmissions may be needed to achieve successful decoding and CRC validation of the failed data block(s). The increased number of retransmissions, however, may increase delay transferring the data block(s) to higher processing layers, and/or an increased residual block error rate may occur.

According to some embodiments, base station processor 101 may use mapping tables of FIGS. 10-13 to retransmit failed data packets (e.g., associated with a bundled HARQ process) when wireless terminal 200 reports/requests a downlink transmission rank that is different than the downlink transmission rank used to initially transmit the now failed data packets. Some embodiments are discussed in greater detail below with respect to the tables of FIGS. 9-13 for systems including 4 transmit and 4 receive MIMO antennas supporting one, two, three, and four MIMO transmission ranks. While embodiments relating to 4 transmit and 4 receive MIMO antennas are discussed by way of example, embodiments may be applied to systems including fewer and/or more MIMO transmit and receive antennas.

According to some embodiments, base station processor 101 may operate according to a retransmission algorithm such that if a NACK is generated for a bundled HARQ ACK/NACK message for a plurality of data blocks (e.g., for first and second data blocks of a same TFRE transmitted/received using first and second transmission/reception layers including channel decoders CD1 and CD2 during rank 3 and/or rank 4 transmissions, and/or transmitted/received using third and fourth transmission/reception layers including channel decoders CD3 and CD 4 during rank 4 transmissions), the bundled data blocks may be retransmitted using a rank selected to maintain a HARQ process mapping for the bundled HARQ NACK message. For example, a base station processor 101 may maintain a rank that is at least as high as that used for the original transmission even if wireless terminal 200 has requested/recommended a lower rank. According to some embodiments, base station processor 101 may maintain a same transmission rank for retransmission of bundled data packets even if wireless terminal 200 has requested/recommended a lower downlink transmission rank to thereby maintain a mapping of the HARQ process (for which the bundled NACK message was received) to the respective transmission and reception layers for both the initial transmission and subsequent retransmission(s).

Figure 9:
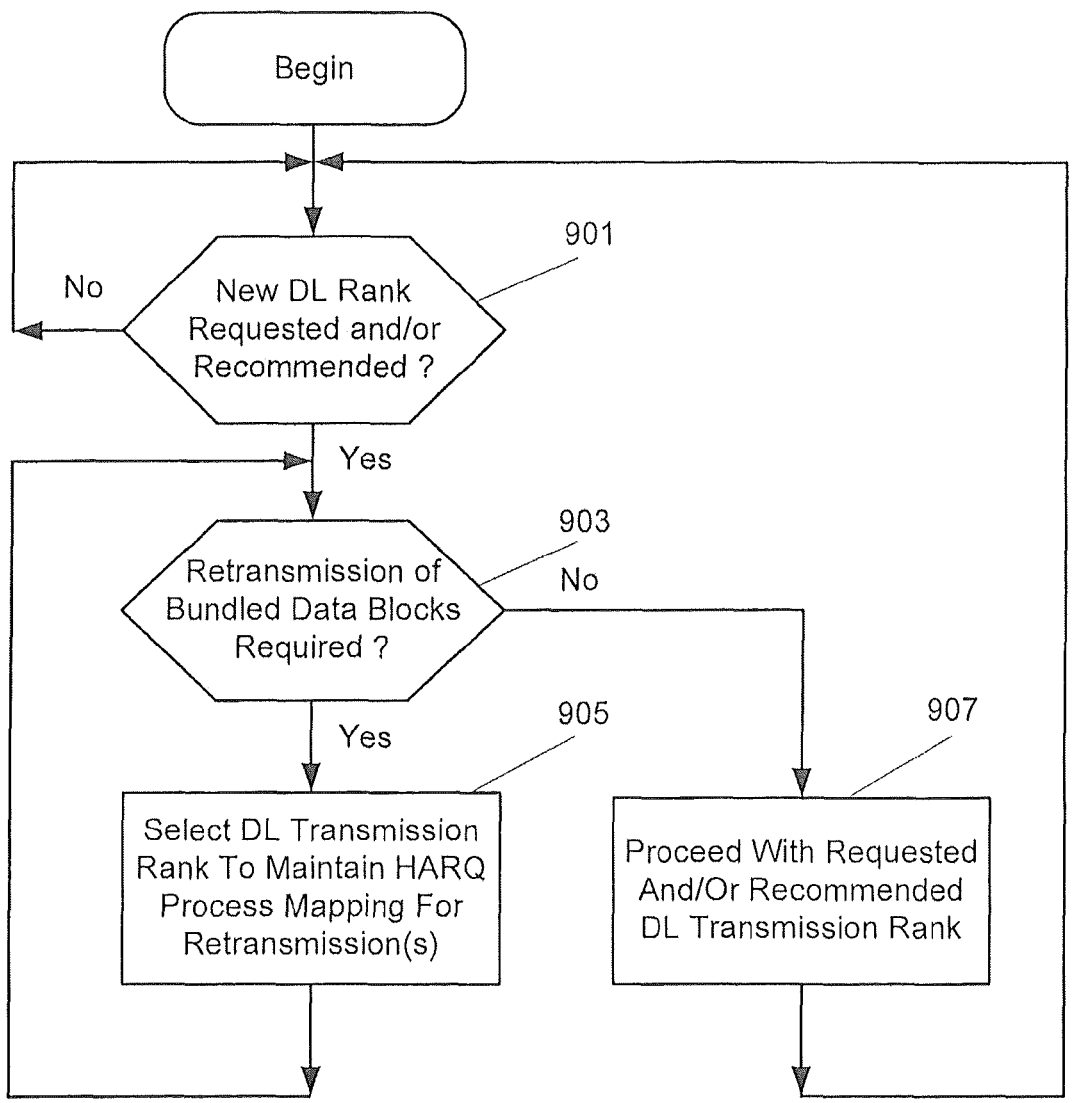
FIG. 9 is a flow chart illustrating base station operations according to some embodiments.

As shown in FIG. 9, base station processor 101 may select a downlink (DL) transmission rank for subsequent downlink transmissions to wireless terminal 200 responsive to downlink transmission rank requests and/or recommendations received from wireless terminal 200 over a feedback channel, but base station processor 101 may select a different DL transmission rank if retransmission of any bundled data blocks is required responsive to a HARQ NACK message received for a bundled HARQ process. When a request/recommendation for a new DL transmission rank is received from wireless terminal 200 at block 901, base station processor 101 may determine at block 903 if retransmission of any bundled data blocks to wireless terminal 200 is required. More particularly, two data blocks may be transmitted using a same TFRE over transmission/reception layers sharing a HARQ process, and if either or both data block(s) fail decoding at wireless terminal 200, a shared/bundled HARQ NACK message from wireless terminal 200 may request retransmission of the two data blocks.

If no retransmission is required at block 903 (e.g., if all previously transmitted data blocks using shared/bundled HARQ processes have either been acknowledged with ACKs or retransmitted a maximum number of allowed times), base station processor 101 may proceed with the requested and/or recommended DL transmission rank at block 907. If retransmission of previously transmitted data blocks using a shared/bundled HARQ process(es) is required at block 903, however, base station processor 101 may select a DL transmission rank at block 905 to maintain HARQ process mapping for any such retransmissions. DL transmission rank selection of block 905 will be discussed in greater detail below with respect to the mapping tables of FIGS. 10-13. Once all previously failed bundled data blocks have either been successfully transmitted (as indicated by a HARQ ACK message) or retransmitted a maximum allowed number of times at block 903, base station processor 101 may then proceed with the requested and/or recommended DL transmission rank at block 907.

The mapping tables of FIGS. 10-13 illustrate base station processor 101 operations to select transmission rank according to embodiments including four transmission/reception layers with two HARQ processes identified as HARQ-1 and HARQ-2. By way of example, first transmission and reception layers TL1 and RL1 may be implemented using TB1, CE1, IM1, SS1, DM1, SB1, and/or CD1 of FIGS. 4 and 5; second transmission and reception layers TL2 and RL2 may be implemented using TB2, CE2, IM2, SS2, DM2, SB2, and/or CD2 of FIGS. 4 and 5; third transmission and reception layers TL3 and RL3 may be implemented using TB3, CE3, IM3, SS3, DM3, SB3, and/or CD3 of FIGS. 4 and 5; and fourth transmission and reception layers TL4 and RL4 may be implemented using TB4, CE4, IM4, SS4, DM4, SB4, and/or CD4 of FIGS. 4 and 5. Moreover, first HARQ process HARQ-1 may map only (without bundling/sharing) to first transmission and reception layers TL1 and RL1 for rank 1 and rank 2 transmissions, and first HARQ process HARQ-1 may map (with bundling/sharing) to both first and second transmission/reception layers TL1, RL1, TL2, and RL2 for rank 3 and rank 4 downlink transmissions. Second HARQ process HARQ-2 may map only (without bundling/sharing) to third transmission and reception layers TL3 and RL3 for rank 2 and rank 3 downlink transmissions, and second HARQ process HARQ-2 may map (with bundling/sharing) to both third and fourth transmission/reception layers TL3, RL3, TL4, and RL4 for rank 4 transmissions. For rank 1 downlink transmissions, second HARQ process HARQ-2 may be unused.

In each of the tables of FIGS. 10-13, the "Initial Transmission" heading identifies the status of the most recent HARQ-ACK/NACK message (received from wireless terminal 200) corresponding to the most recent downlink transmission for the respective HARQ process (i.e., HARQ-1 and/or HARQ-2). More particularly, P (pass) represents a HARQ ACK message received for the respective HARQ process representing successful decoding of all of the data block or blocks associated with the HARQ process, F (fail) represents a HARQ NACK message received for the respective HARQ process representing unsuccessful decoding of any one data block or blocks associate with the HARQ process, and "--" represents non-use of the HARQ process (e.g., HARQ-2 may be unused for rank 1 downlink transmissions). The "UE reported rank" heading identifies a requested/recommended downlink transmission rank (also referred to as a rank) reported by wireless terminal 200, and the "Scheduled Rank" heading identified a downlink transmission rank actually scheduled by base station processor 101. The "Retransmission" HARQ-1 column identifies whether a new transmission of a new transport data block or blocks (NT) is allowed for the respective HARQ process, whether a retransmission of a previously transmitted data block or blocks (OT) is to be performed for the respective HARQ process, or whether no transmission ("--") is to be performed for the respective HARQ process.

The table of FIG. 10 illustrates base station processor 101 rank schedulings when an initial rank 1 downlink transmission is performed using the first HARQ process HARQ-1 mapped to first transmission/reception layers TL1 and RL1. Accordingly, the initial transmission includes only a single data block transmitted/received using transmission/reception layers TL1 and RL1, and the resulting ACK/NACK message for the HARQ-1 process maps to only the single data block (i.e., an ACK message is generated if the single data block passes decoding at CD1, or a NACK message is generated if the single data block fails decoding at CD1). In each case where the single data block passes P (i.e., rows 1, 3, 5, and 7 of FIG. 10) decoding (so that an ACK message is received), base station processor 101 may schedule the rank recommended/requested by wireless terminal 200, and new data NT may be transmitted in accordance with the UE reported rank.

With scheduled rank 4, new first and second data blocks may be transmitted over respective transmission/reception layers TL1/RL1 and TL2/RL2 bundled with HARQ-1 using a same TFRE, and new third and fourth data blocks may be transmitted over respective transmission/reception layers TL3/RL3 and TL4/RL4 bundled with HARQ-2 using the same TFRE as shown in row 1 of FIG. 10. With scheduled rank 3, new first and second data blocks may be transmitted over respective transmission/reception layers TL1/RL1 and TL2/RL2 bundled with HARQ-1 using a same TFRE, and a new third data block may be transmitted over respective transmission/reception layers TL3/RL3 using HARQ-2 without bundling using the same TFRE as shown in row 3 of FIG. 10. With scheduled rank 2, a new first data block may be transmitted over transmission/reception layers TL1/RL1 using HARQ-1 without bundling using a TFRE, and a second data block may be transmitted over transmission/reception layers TL3/RL3 using HARQ-2 without bundling using the TFRE as shown in row 5 of FIG. 10. With scheduled rank 1, a new first data block may be transmitted over transmission/reception layers TL1/RL1 using HARQ-1 without bundling using the TFRE, and HARQ-2 may remain unused during the TFRE as shown in row 7 of FIG. 10.

In cases where the single data block fails F (rows 2, 4, 6, and 8 of FIG. 10) decoding (so that a NACK message is received), base station processor 101 may consider the reported rank, but base station processor 101 may schedule the downlink transmission rank to maintain a HARQ process mapping to support the retransmission of the failed data block. As shown at rows 2, 4, and 6 of FIG. 10, if wireless terminal 200 reports a higher rank (i.e., a reported rank of 2, 3, or 4 with an initial rank of 1), base station processor 101 may allow scheduling of a rank 2 transmission to maintain a mapping of HARQ-1 only (without bundling/sharing) to transmission/reception layers TL1 and RL1 for the retransmission of the initially failed data block (OT) using a TFRE while allowing transmission of a new data block (NT) using a mapping of HARQ-2 only (without bundling/sharing) to transmission/reception layers TL3 and RL3 using the TFRE. In an alternative to scheduling rank 2 at rows 2, 4, and 6 of FIG. 10, base station processor 101 may schedule rank 1 to retransmit the failed data block maintaining a mapping of HARQ-1 only to transmission/reception layers TL1 and RL1 without transmitting a new data block using HARQ-2. If the reported rank is the same as the initial rank as shown in row 8 of FIG. 10, the scheduled rank may remain unchanged so that the mapping of HARQ-1 to transmission/reception layers TL1/RL1 is unchanged and so that the failed data block may be retransmitted using the same HARQ-1 mapping.

The table of FIG. 11 illustrates base station processor 101 rank schedulings when an initial rank 2 downlink transmission is performed using the first HARQ process HARQ-1 mapped to first transmission/reception layers TL1 and RL1 (without bundling/sharing) and using the second HARQ process HARQ-2 mapped to third transmission/reception layers TL3 and RL3 (without bundling/sharing). Accordingly, the initial transmission includes a first data block transmitted/received using transmission/reception layers TL1 and RL1 and a second data block transmitted/received using transmission/reception layers TL3 and RL3. The resulting ACK/NACK message for the HARQ-1 process maps to only the first data block (i.e., an ACK message is generated if the first data block passes decoding at CD1, or a NACK message is generated if the single data block fails decoding at CD1), and the resulting ACK/NACK message for the HARQ-2 process maps to only the second data block (i.e., an ACK message is generated if the second data block passes decoding at CD3, or a NACK message is generated if the second data block fails decoding at CD3).

In each case where both of the first and second data blocks pass P (i.e., rows 1, 5, 9, and 13) decoding (so that two ACK messages are received), base station processor 101 may schedule the rank recommended/requested by wireless terminal 200, and new data NT may be transmitted in accordance with the UE reported rank. With scheduled rank 4, new first and second data blocks may be transmitted over respective transmission/reception layers TL1/RL1 and TL2/RL2 bundled with HARQ-1 using a same TFRE, and new third and fourth data blocks may be transmitted over respective transmission/reception layers TL3/RL3 and TL4/RL4 bundled with HARQ-2 using the same TFRE as shown in row 1 of FIG. 11. With scheduled rank 3, new first and second data blocks may be transmitted over respective transmission/reception layers TL1/RL1 and TL2/RL2 bundled with HARQ-1 using a same TFRE, and a new third data block may be transmitted over respective transmission/reception layers TL3/RL3 using HARQ-2 without bundling using the same TFRE as shown in row 5 of FIG. 11. With scheduled rank 2, a new first data block may be transmitted over transmission/reception layers TL1/RL1 using HARQ-1 without bundling using a TFRE, and a second data block may be transmitted over transmission/reception layers TL3/RL3 using HARQ-2 without bundling using the TFRE as shown in row 9 of FIG. 11. With scheduled rank 1, a new first data block may be transmitted over transmission/reception layers TL1/RL1 using HARQ-1 without bundling using the TFRE, and HARQ-2 may remain unused during the TFRE as shown in row 13 of FIG. 11.

In each case where wireless terminal 200 reports a recommended/requested rank 2 that is the same as the initial rank (as in rows 9, 10, 11, and 12 of FIG. 11), base station processor 101 may maintain the same scheduled rank (i.e., rank 2) regardless of the pass/fail status of the initially transmitted data blocks. The same rank 2 HARQ process mappings for HARQ-1 and HARQ-2 are maintained for the next transmission/retransmission regardless of the status P/F of the initial rank 2 transmission. Accordingly, retransmissions of one or both of the first and second data blocks (OT) may be supported using the same HARQ mappings, and/or new data blocks may be transmitted for either or both HARQ processes for which initial decoding passed.

When wireless terminal 200 reports a higher rank (i.e., rank 3 or rank 4) and the first data block (mapped to HARQ-1 without bundling/sharing) of the initial transmission fails F decoding resulting in a HARQ-1 NACK message (as in rows 3, 4, 7, and 8 of FIG. 11), base station processor 101 may select rank 2 to maintain the same downlink transmission rank. The same rank 2 HARQ process mappings for HARQ-1 and HARQ-2 are thus maintained for the retransmission of the first data block that failed and for the possible retransmission of the second data block using HARQ-2 if it failed or the transmission of a new data block using HARQ-2 if the initial second data block passed. According to one alternative of row 7 of FIG. 11, base station processor 101 may schedule a lower rank 1 transmission if the second data block of HARQ-2 passed to support retransmission of the first data block of HARQ-1 without transmitting a new data block using HARQ-2.

When wireless terminal 200 reports a higher rank (i.e., rank 3 or rank 4), when the first data block (mapped to HARQ-1 without bundling/sharing) of the initial transmission passes P decoding, and when the second data block (mapped to HARQ-2 without bundling/sharing) of the initial transmission fails F decoding resulting in a HARQ-2 NACK message (as in rows 2 and 6 of FIG. 11), base station processor 101 may select rank 3 (at rows 2 and 6 of FIG. 11) to maintain the same HARQ-2 mapping to transmission/reception layers TL3/RL3 (without sharing/bundling) while allowing HARQ-1 to be mapped to transmission/reception layers TL1/RL1 and TL2/RL2 to allow transmission of two new data blocks NT using the HARQ-1 process. Stated in other words, a higher rank may be allowed even though the second data block failed because the mapping of HARQ-2 to transmission/reception layers TL3/RL3 (without sharing/bundling) is the same for both rank 2 and rank 3 transmissions. While the mapping of HARQ-1 is different for rank 2 and rank 3 transmissions, a same mapping of HARQ-1 is not required because the initial HARQ-1 data block passed. Accordingly, a higher data rate rank 3 transmission (allowing retransmission of the one HARQ-2 data packed that failed and 2 new HARQ-1 data packets) may be allowed while supporting the HARQ-2 retransmission.

At row 14 of FIG. 11, if the first data block (of HARQ-1) of the initial transmission passes (P), if the second data block (HARQ-2) of the initial transmission fails (F), and wireless terminal 200 reports rank 1, base station processor may schedule an alternative rank one transmission retransmitting the second data block of the initial transmission using HARQ-2 (without bundling/sharing) over transmission/reception layers TL3/RL3. In an alternative at row 14 of FIG. 11, rank 2 may be scheduled to support transmission of a new data block over transmission/reception layers TL1/RL1 using HARQ-1 and retransmission of the second data block over transmission/reception layers TL3/RL3 using HARQ-2.

At row 15 of FIG. 11, if the first data block (of HARQ-1) of the initial transmission fails (F), if the second data block (HARQ-2) of the initial transmission passes (P), and wireless terminal 200 reports rank 1, base station processor 101 may schedule a conventional rank one transmission retransmitting the first data block of the initial transmission using HARQ-1 (without bundling/sharing) over transmission/reception layers TL1/RL1. At row 16 of FIG. 11, if both of the first data block (HARQ-1) and the second data block (HARQ-2) of the initial transmission fail (F) and wireless terminal 200 reports rank 1, base station processor 101 may force a rank 2 transmission to maintain the mappings of HARQ-1 to transmission/reception layers TL1/RL1 and HARQ-2 to transmission/reception layers TL3/RL3 for retransmissions of both of the failed data blocks.

The table of FIG. 12 illustrates base station processor 101 rank schedulings when an initial rank 3 downlink transmission is performed using the first HARQ process HARQ-1 mapped to first and second transmission/reception layers TL1/RL1 and TL2/RL2 (with bundling/sharing) and using the second HARQ process HARQ-2 mapped to third transmission/reception layers TL3/RL3 (without bundling/sharing). Accordingly, the initial transmission includes a first data block transmitted/received using transmission/reception layers TL1/RL1, and second data block transmitted/received using transmission/reception layers TL2/RL2, and a third data block transmitted/received using transmission/reception layers TL3/RL3. The resulting ACK/NACK message for the HARQ-1 process thus maps to the first and second data blocks (i.e., an ACK message is generated if both the first and second data blocks pass decoding at CD1 and CD2, or a NACK message is generated if either or both of the first and second data block fail decoding at CD1 /CD2), and the resulting ACK/NACK message for the HARQ-2 process maps to only the third data block (i.e., an ACK message is generated if the third data block passes decoding at CD3, or a NACK message is generated if the third data block fails decoding at CD3).

If each of the first, second, and third data blocks pass decoding so that both HARQ-1 and HARQ-2 pass P (i.e., so two ACK messages are received), base station processor 101 may schedule the rank recommended/requested by wireless terminal 200 (as in rows 1, 5, 9, and 13 of FIG. 12), and new data NT may be transmitted in accordance with the UE reported rank. With scheduled rank 4, new first and second data blocks may be transmitted over respective transmission/reception layers TL1/RL1 and TL2/RL2 bundled with HARQ-1 using a same TFRE, and new third and fourth data blocks may be transmitted over respective transmission/reception layers TL3/RL3 and TL4/RL4 bundled with HARQ-2 using the same TFRE as shown in row 5 of FIG. 12. With scheduled rank 3, new first and second data blocks may be transmitted over respective transmission/reception layers TL1/RL1 and TL2/RL2 bundled with HARQ-1 using a same TFRE, and a new third data block may be transmitted over respective transmission/reception layers TL3/RL3 using HARQ-2 without bundling using the same TFRE as shown in row 1 of FIG. 12. With scheduled rank 2, a new first data block may be transmitted over transmission/reception layers TL1/RL1 using HARQ-1 without bundling using a TFRE, and a second data block may be transmitted over transmission/reception layers TL3/RL3 using HARQ-2 without bundling using the TFRE as shown in row 9 of FIG. 12. With scheduled rank 1, a new first data block may be transmitted over transmission/reception layers TL1/RL1 using HARQ-1 without bundling using the TFRE, and HARQ-2 may remain unused during the TFRE as shown in row 13 of FIG. 12.

In each case where wireless terminal 200 reports a recommended/requested rank 3 that is the same as the initial rank (as in rows 1, 2, 3, and 4 of FIG. 13), base station processor 101 may maintain the same scheduled rank (i.e., rank 3). The same rank 2 HARQ process mappings for HARQ-1 and HARQ-2 are maintained for the next transmission/retransmission regardless of the status P/F of the initial rank 3 transmission. Accordingly, retransmissions of the first and second data blocks (OT) of HARQ-1 and/or retransmission of the third data block (OT) of HARQ-2 may be supported using the same HARQ mappings, and/or new data blocks may be transmitted for either or both HARQ processes for which initial decoding passed.

When wireless terminal 200 reports a higher rank (i.e., rank 4) and the third data block (mapped to HARQ-2 without bundling/sharing) of the initial transmission fails F decoding resulting in a HARQ-2 NACK message (as in rows 6 and 8 of FIG. 12), base station processor 101 may maintain rank 3 to maintain the same rank 3 HARQ process mappings for HARQ-1 and HARQ-2. Accordingly, any needed retransmissions may be supported.

When wireless terminal 200 reports a higher rank (i.e., rank 4) and the third data block (mapped to HARQ-2 without bundling/sharing) of the initial transmission passes decoding resulting in a HARQ-2 ACK message (as in rows 5 and 7 of FIG. 12), base station processor 101 may schedule rank 4 so that HARQ-1 is mapped to transmission/reception layers TL1/RL1 and TL2/RL2 and so that HARQ-2 is mapped to transmission/reception layers TL3/RL3 and TL4/RL4. Here the HARQ-1 mapping is unchanged between rank 3 and rank 4 to support retransmission of first and second data blocks mapped to HARQ-1 if needed as shown at row 7 of FIG. 12.

When wireless terminal 200 reports rank 2 and the first and second data blocks (mapped to HARQ-1 with sharing/bundling) pass decoding resulting in a HARQ-1 ACK message (as in rows 9 and 10 of FIG. 12), base station processor 101 may schedule rank 2 so that HARQ-1 is mapped to transmission/reception layers TL1/RL1 (without sharing/bundling) and so that HARQ-2 is mapped to transmission/reception layers TL3/RL3 (without sharing/bundling). Accordingly, a mapping of HARQ-2 to transmission/reception layers TL3/RL3 is the same for rank 2 and rank 3 downlink transmissions. Because both of the first and second data blocks of the initial HARQ-1 transmission passed decoding, retransmission using the HARQ-1 process is not required and remapping of the HARQ-1 process can occur without affecting any HARQ-1 retransmissions.

When wireless terminal 200 reports rank 2 and either or both of the first and second data blocks (mapped to HARQ-1 with sharing/bundling) fail decoding (F) resulting in a HARQ-1 NACK message (as in rows 11 and 12 of FIG. 12), base station processor 101 may continue scheduling rank 3 (as in rows 11 and 12 of FIG. 12) so that mappings of HARQ-1 and HARQ-2 remain unchanged (i.e., HARQ-1 maps to transmission/reception layers TL1/RL1 and TL2/RL2 and HARQ-2 maps to transmission/reception layer TL3/RL3). Accordingly, retransmissions of first and second data blocks of HARQ-1 may be supported, and retransmission of third data block of HARQ-2 may be supported if needed (at row 12 of FIG. 12).

At row 14 of FIG. 12, if the first and second data blocks (mapped to HARQ-1) of the initial transmission pass (P), if the third data block (mapped to HARQ-2) of the initial transmission fails (F), and wireless terminal 200 reports rank 1, base station processor 101 may schedule an alternative rank one transmission retransmitting the third data block of the initial transmission using HARQ-2 (without bundling/sharing) over transmission/reception layers TL3/RL3. In another alternative at row 14, base station processor may schedule a conventional rank 2 transmission so that a new data block may be transmitted using transmission/reception layers TL1/RL1 and HARQ-1 and so that the third data block may be may be retransmitted.

At rows 15 and 16 of FIG. 12, if either or both of the first data blocks (mapped to HARQ-1) of the initial transmission fails (F), and wireless terminal 200 reports rank 1, base station processor 101 may continue scheduling rank 3 to support retransmission of the first and second data blocks that are mapped to HARQ-1.

The table of FIG. 13 illustrates base station processor 101 rank schedulings when an initial rank 4 downlink transmission is performed using the first HARQ process HARQ-1 mapped to first and second transmission/reception layers TL1/RL1 and TL2/RL2 (with bundling/sharing) and using the second HARQ process HARQ-2 mapped to third and fourth transmission/reception layers TL3/RL3 and TL4/RL4 (with bundling/sharing). Accordingly, the initial transmission includes a first data block transmitted/received using transmission/reception layers TL1/RL1, and second data block transmitted/received using transmission/reception layers TL2/RL2, a third data block transmitted/received using transmission/reception layers TL3/RL3, and a fourth data block transmitted using transmission/reception layers TL4/RL4. The resulting ACK/NACK message for the HARQ-1 process thus maps to the first and second data blocks (i.e., an ACK message is generated if both the first and second data blocks pass decoding at CD1 and CD2, or a NACK message is generated if either or both of the first and second data block fail decoding at CD1/CD2), and the resulting ACK/NACK message for the HARQ-2 process maps to the third and fourth data blocks (i.e., an ACK message is generated if both the third and fourth data blocks pass decoding at CD3 and CD4, or a NACK message is generated if either or both of the third and fourth data blocks fail decoding at CD3/CD4).

In each case where all of the first, second, third and fourth data blocks pass decoding so that both HARQ-1 and HARQ-2 pass P (i.e., so two ACK messages are received), base station processor 101 may schedule the rank recommended/requested by wireless terminal 200 (as in rows 1, 5, 9, and 13 of FIG. 13), and new data NT may be transmitted in accordance with the UE reported rank. With scheduled rank 4, new first and second data blocks may be transmitted over respective transmission/reception layers TL1/RL1 and TL2/RL2 bundled with HARQ-1 using a same TFRE, and new third and fourth data blocks may be transmitted over respective transmission/reception layers TL3/RL3 and TL4/RL4 bundled with HARQ-2 using the same TFRE as shown in row 1 of FIG. 13. With scheduled rank 3, new first and second data blocks may be transmitted over respective transmission/reception layers TL1/RL1 and TL2/RL2 bundled with HARQ-1 using a same TFRE, and a new third data block may be transmitted over respective transmission/reception layers TL3/RL3 using HARQ-2 without bundling using the same TFRE as shown in row 5 of FIG. 13. With scheduled rank 2, a new first data block may be transmitted over transmission/reception layers TL1/RL1 using HARQ-1 without bundling using a TFRE, and a second data block may be transmitted over transmission/reception layers TL3/RL3 using HARQ-2 without bundling using the TFRE as shown in row 9 of FIG. 13. With scheduled rank 1, a new first data block may be transmitted over transmission/reception layers TL1/RL1 using HARQ-1 without bundling using the TFRE, and HARQ-2 may remain unused during the TFRE as shown in row 13 of FIG. 13.

In each case where wireless terminal 200 reports a recommended/requested rank 4 that is the same as the initial rank (as in rows 1, 2, 3, and 4 of FIG. 13), base station processor 101 may maintain the same scheduled rank (i.e., rank 4). The same rank 4 HARQ process mappings for HARQ-1 and HARQ-2 are maintained for the next transmission/retransmission regardless of the status P/F of the initial rank 4 transmission. Accordingly, retransmissions of the first and second data blocks (OT) of HARQ-1 and/or retransmission of the third and fourth data blocks (OT) of HARQ-2 may be supported using the same HARQ mappings, and/or new data blocks may be transmitted for either or both HARQ processes for which initial decoding passed.

When wireless terminal 200 reports a lower rank (e.g., rank 3, rank 2, or rank 1) and either or both of the third or fourth data blocks (mapped to HARQ-2 with sharing/bundling) fail decoding F resulting in a HARQ-2 NACK message (as in rows 6, 8, 10, 12, 14, or 16 of FIG. 13), base station processor 101 may continue scheduling rank 4 so that HARQ-2 is mapped to the third and fourth transmission/reception layers TL3/RL3 and TL4/RL4 to support retransmission of the third and fourth data blocks. By continuing rank 4, HARQ-1 may continue to be mapped to transmission/reception layers TL1/RL1 and TL2/RL2 to support retransmission of the first and second data blocks (mapped to HARQ-1 with sharing/bundling) if needed (e.g., at rows 8, 12, or 16 of FIG. 13), or two new data blocks may be transmitted using HARQ-1 (e.g., at rows 6, 10, or 14 of FIG. 13).

When wireless terminal 200 reports rank 3 and the third and fourth data blocks (mapped to HARQ-2 with sharing/bundling) pass decoding P resulting in a HARQ-2 ACK message (as in rows 5 and 7 of FIG. 13), base station processor 101 may scheduling rank 3 so that HARQ-1 is mapped to the first and second transmission/reception layers TL1/RL1 and TL2/RL2 (with bundling/sharing) to support retransmission of the first and second data blocks if needed, and so that HARQ-2 is mapped to the third transmission/reception layer TL3/RL3 (without bundling/sharing).

When wireless terminal 200 reports rank 2 and either or both of the first and second data blocks (mapped to HARQ-1 with sharing/bundling) fail decoding resulting in a HARQ-1 NACK message and both of the third and fourth data blocks (mapped to HARQ-2) pass decoding resulting in a HARQ-2 ACK (as in row 11 of FIG. 13), base station processor 101 may schedule rank 3 so that HARQ-1 is mapped to transmission/reception layers TL1/RL1 and TL2/RL2 (with sharing/bundling) and so that HARQ-2 is mapped to transmission/reception layers TL3/RL3 (without sharing/bundling). Accordingly, a mapping of HARQ-1 to transmission/reception layers TL1/RL1 and TL2/RL2 is the same for rank 3 and rank 4 downlink transmissions to support retransmission of the first and second data blocks. Because both of the third and fourth data blocks of the initial HARQ-2 transmission passed decoding, retransmission using the HARQ-2 process is not required and remapping of the HARQ-2 process can occur without affecting any HARQ-2 retransmissions.

When wireless terminal 200 reports rank 1 and either or both of the first and second data blocks (mapped to HARQ-1 with sharing/bundling) fail decoding (F) resulting in a HARQ-1 NACK message and both of the third and fourth data blocks (mapped to HARQ-2 with sharing/bundling) pass decoding (P) resulting in a HARQ-2 ACK messages at in row 15 of FIG. 13, base station processor 101 may schedule rank 3 so that mappings of HARQ-1 remain unchanged (i.e., HARQ-1 maps to transmission/reception layers TL1/RL1 and TL2/RL2). Accordingly, retransmissions of first and second data blocks of HARQ-1 may be supported, and HARQ-2 may be mapped to transmission/reception layers TL1/RL1 (without bundling/sharing) for transmission of a new data block.

As set forth in the tables of FIGS. 10-13, P may represent an ACK for the respective HARQ process, and F may represent a NACK for the respective HARQ process. Moreover, NT (new transmission) represents a new transmission of a new data block(s), and OT (old transmission) represents a retransmission of a previously transmitted data block(s) for which the associate HARQ process generated a NACK.

According to embodiments discussed above, radio base station processor 101 may select a MIMO transmission rank for a subsequent downlink transmission responsive to a rank reported (e.g., requested/recommended) by wireless terminal 200, but base station processor 101 may deviate from the reported rank if a NACK has been received for one or more HARQ processes used for a preceding downlink transmission. More particularly, wireless terminal 200 may deviate from the reported rank to select a MIMO transmission rank that maintains a HARQ process mapping from the preceding downlink transmission if the HARQ process generated a NACK for the preceding downlink transmission. When two HARQ processes are used in a 4 antenna system supporting up to 4 downlink data streams (i.e., up to rank 4), for example, if an initial downlink transmission has rank 2 or higher and both HARQ processes generate NACKs, base station processor 101 may maintain the same rank for the next transmission (even if a lower or a higher rank was reported) to support retransmission of all data blocks of both HARQ processes (see, rows 4, 8, 12, and 16 of FIG. 11; rows 4, 8, 12, and 16 of FIG. 12; and rows 4, 8, 12, and 16 of FIG. 13). If all HARQ processes used in an initial downlink transmission generate ACKs, base station processor 101 may change the rank for the next transmission to any rank reported by wireless terminal 200 (see, rows 1, 3, 5, 7 of FIG. 10; rows 1, 5, 9, and 13 of FIG.

11; rows 1, 5, 9, and 13 of FIG. 12; and rows 1, 5, 9, and 13 of FIG. 13). If a bundled/shared HARQ process used in an initial downlink transmission generates a NACK, base station processor 101 may require a rank of three or higher for the next transmission.

According to some embodiments, a first transmission/reception layer (corresponding to a stream of data codewords CW1) may be supported using TB1, CE1, IM1, and/or SS1 at base station 100 and using DM1, SB1, and/or CD1 at wireless terminal 200; a second transmission/reception layer (corresponding to a stream of data codewords CW2) may be supported using TB2, CE2, IM2, and/or SS2 at base station 100 and using DM2, SB2, and/or CD2 at wireless terminal 200; a third transmission/reception layer (corresponding to a stream of data codewords CW3) may be supported using TB3, CE3, IM3, and/or SS3 at base station 100 and using DM3, SB3, and/or CD3 at wireless terminal 200; and a fourth transmission/reception layer (corresponding to a stream of data codewords CW4) may be supported using TB4, CE4, IM4, and/or SS4 at base station 100 and using DM4, SB4, and/or CD4 at wireless terminal 200. As shown in FIG. 14 for rank 1 transmission/reception, a single stream of data codewords CW1 may be transmitted/received using the first transmission/reception layer (e.g., including TB1, CE1, IM1, and/or SS1 at base station 100 and including DM1, SB1, and/or CD1 at wireless terminal 200) without using the second, third, and fourth transmission/reception layers, and a first HARQ process/codeword (HARQ-1) may be mapped directly to the single stream of data codewords CW1. As shown in FIG. 14 for rank 2 transmission/reception, a first stream of data codewords CW1 may be transmitted/received using the first transmission/reception layer (e.g., including TB1, CE1, IM1, and/or SS1 at base station 100 and including DM1, SB1, and/or CD1 at wireless terminal 200), and a second stream of data codewords CW2 may be transmitted/received using the second transmission/reception layer (e.g., including TB2, CE2, IM2, and/or SS2 at base station 100 and including DM2, SB2, and/or CD2 at wireless terminal 200), without using the third and fourth transmission/reception layers. For rank 2 transmission/reception, the first HARQ process/codeword (HARQ-1) may be mapped directly to the first stream of data codewords CW1, and a second HARQ process/codeword (HARQ-2) may be mapped directly to the second stream of data codewords CW2. For rank 1 and 2 transmission/reception of FIG. 14, each stream of codewords may be mapped directly to a respective HARQ process/codeword without bundling as discussed above.

As shown in FIG. 14 for rank 3 transmission/reception, a first stream of data codewords CW1 may be transmitted/received using the first transmission/reception layer (e.g., including TB1, CE1, IM1, and/or SS1 at base station 100 and including DM1, SB1, and/or CD1 at wireless terminal 200), a second stream of data codewords CW2 may be transmitted/received using the second transmission/reception layer (e.g., including TB2, CE2, IM2, and/or SS2 at base station 100 and including DM2, SB2, and/or CD2 at wireless terminal 200), and a third stream of data codewords CW3 may be transmitted/received using the third transmission/reception layer (e.g., including TB3, CE3, IM3, and/or SS3 at base station 100 and including DM3, SB3, and/or CD3 at wireless terminal 200), without using the fourth transmission/reception layer. For rank three transmission/reception, the first HARQ process/codeword (HARQ-1) may be mapped directly to the first stream of data codewords CW1, while the second HARQ process/codeword (HARQ-2) may be mapped to both of the second and third streams of data codewords CW2 and CW3. For rank 3 transmission/reception, the first stream of codewords may be mapped directly to the first HARQ process/codeword without bundling, while the second and third streams of codewords may be bundled with the second HARQ process.

As shown in FIG. 14 for rank 4 transmission/reception, a first stream of data codewords CW1 may be transmitted/received using the first transmission/reception layer (e.g., including TB1, CE1, IM1, and/or SS1 at base station 100 and including DM1, SB1, and/or CD1 at wireless terminal 200), a second stream of data codewords CW2 may be transmitted/received using the second transmission/reception layer (e.g., including TB2, CE2, IM2, and/or SS2 at base station 100 and including DM2, SB2, and/or CD2 at wireless terminal 200), a third stream of data codewords CW3 may be transmitted/received using the third transmission/reception layer (e.g., including TB3, CE3, IM3, and/or SS3 at base station 100 and including DM3, SB3, and/or CD3 at wireless terminal 200), and a fourth stream of data codewords Cw4 may be transmitted/received using the fourth transmission/reception layer (e.g., including TB4, CE4, IM4, and/or SS4 at base station 100 and including DM4, SB4, and/or CD4 at wireless terminal 200). Moreover, the first HARQ process/codeword (HARQ-1) may be mapped to both of the first and fourth streams of data codewords CW1 and CW4, and the second HARQ process/codeword (HARQ-2) may be mapped to both of the second and third streams of data codewords CW2 and CW3. For rank 4 transmission/reception, the first and second streams of codewords may be bundled with first HARQ process/codeword, while the second and third streams of codewords may be bundled with the second HARQ process.

According to embodiments of FIG. 14, the first transmission/reception layer TL1/RL1 (transmitted using TB1, CE1, IM1, and/or SS1 at base station 100 and received using DM1, SB1, and/or CD1 at wireless terminal 200) may support transmission/reception of data codewords CW1, and the first transmission layer may be mapped to the first HARQ process (HARQ-1) for transmission according to ranks 1, 2, 3, and 4. The second transmission/reception layer TL1/RL1 (transmitted using TB2, CE2, IM2, and/or SS2 at base station 100 and received using DM2, SB2, and/or CD2 at wireless terminal 200) may support transmission/reception of data codewords CW2, and the second transmission layer may be mapped to the second HARQ process (HARQ-2) for transmission according to ranks 2, 3, and 4. The third transmission/reception layer TL3/RL3 (transmitted using TB2, CE3, IM3, and/or SS3 at base station 100 and received using DM3, SB3, and/or CD3 at wireless terminal 200) may support transmission/reception of data codewords CW3, and the third transmission layer may be mapped to the second HARQ process (HARQ-2) for transmission according to ranks 3 and 4. The fourth transmission/reception layer TL4/RL4 (transmitted using TB4, CE4, IM4, and/or SS4 at base station 100 and received using DM4, SB4, and/or CD4 at wireless terminal 200) may support transmission/reception of data codewords CW4, and the fourth transmission layer may be mapped to the second HARQ process (HARQ-2) for transmission according to rank 4. Accordingly, each transmission/reception layer (when used) is mapped to a same HARQ process regardless of the transmission/reception rank being use. Accordingly, each wireless terminal decoder and soft buffer may be mapped to a same HARQ processes for any rank using the decoder and soft buffer.

According to embodiments of FIG. 14: a mapping of layer 1 to the first HARQ process HARQ-1 remains the same for ranks 1, 2, 3, and 4; a mapping of layer 2 to the second HARQ process HARQ-2 remains the same for ranks 2, 3, and 4; and a mapping of layer 3 to the second HARQ process HARQ-2 remains the same for ranks 3 and 4. Accordingly, if the rank changes between ranks 3 and 4, the bundled mapping of layers 2 and 3 to the second HARQ process HARQ-2 stays the same, thereby supporting retransmissions over layers 2 and 3 while changing to either rank 3 or rank 4 with HARQ 2 bundled to the $2^{nd}$ and $3^{rd}$ layers. Similarly, if the rank changes between ranks 1 and 2, between ranks 2 and 3, or between ranks 1 and 3, the direct mapping of layer 1 to the first HARQ process HARQ-1 stays the same, thereby supporting retransmissions over layer 1 while changing to rank 1, rank 2, or rank 3 with HARQ-1 bundled to the first layer (without bundling). Partial retransmission (e.g., where previously transmitted data for one HARQ process is retransmitted and new data for the other HARQ process is initially transmitted during the same TTI) may thus be supported while changing rank as long as the layer or layers mapped to the HARQ process for the retransmission is unchanged.

Wireless terminal processor 201 and/or transceiver 209 may define a plurality of reception layers/streams as discussed above with respect to FIGS. 4 and/or 5: with a first layer RL1 being used for MIMO ranks 1, 2, 3, and 4; with a second layer RL2 being used for MIMO ranks 2, 3, and 4; with a third layer RL3 being used for MIMO ranks 3 and 4; and with a fourth MIMO layer RL4 being used for MIMO rank 4. Separate decoding (e.g., using decoder functionally illustrated by decoders CD1-4 of FIG. 5) may be performed for each MIMO layer received during a MIMO TTI. Wireless terminal processor 201, for example, may define, configure, and/or use one or more of reception layers RL1, RL2, RL3, and/or RL4 for a given TTI/TFRE responsive to rank and/or precoding vector information provided from base station 100 via downlink signaling as discussed above with respect to FIG. 3A. For example, a higher MIMO rank (defining a respective higher number of reception layers/streams) may be selected when the wireless terminal detects that the downlink channel has a higher SINR (e.g., when the wireless terminal is relatively close to the base station), and a lower MIMO rank (defining a respective lower number of reception layers/streams) may be selected when the wireless terminal detects that the downlink channel has a lower SINR (e.g., when the wireless terminal is relatively distant from the base station).

While separate transport block generator, encoder, modulator, layer mapper, spreader/scrambler, and layer precoder blocks are illustrated in FIG. 4 by way of example, the blocks of FIG. 4 merely illustrate functionalities/operations of base station processor 101 and/or transceiver 109. Sub-blocks (e.g., transport blocks TB1-TB4 channel encoders CE1-CE4, interleavers/modulators IM1-IM4, and spreader scramblers SS1-SS4) of FIG. 4 further illustrate functionalities/operations of transport block generator, encoder block, modulator block, and spreader/scrambler block supporting transmission layers TL1-TL4. Processor 101, however, may provide/define/configure functionality/operations of only one transmission layer TL1 during rank 1 transmission; processor 101 may provide/define/configure functionality/operations of only two transmission layers TL1 and TL2 during rank 2 transmission; processor 101 may provide/define/configure functionality/operations of only 3 transmission layers TL1, TL2, and TL3 during rank 3 transmission; and functionality/operations of four transmission layers TL1, TL2, TL3, and TL4 may only be provided during rank 4 transmission. When multiple transmission layers are provided/defined/configured, for example, processor 101 may provide/define/configure functionality/operations of multiple transport block sub-blocks, multiple channel decoder sub-blocks, multiple interleaver/modulator sub-blocks, and/or multiple spreader/scrambler sub-blocks to allow parallel processing of data of different transmission layers before transmission during a TTI/TFRE, or processor 101 may provide/define/configure functionality/operations of a single transport block, a single channel encoder, a single interleaver/modulator, and/or a single spreader scrambler to allow serial processing of data of different transmission layers before transmission during a TTI/TFRE.

While separate layer decoder, layer demapper, demodulator/deinterleaver, soft buffer, channel decoder, and transport block combiner blocks/sub-blocks are illustrated in FIG. 5 by way of example, the blocks of FIG. 5 merely illustrate functionalities/operations of wireless terminal processor 201 and/or transceiver 209. For example, sub-blocks (e.g., demodulator/deinterleaver DM1-DM4, soft buffers SB1-SB4, and channel decoders CD1-CD4) of FIG. 5 illustrate functionalities/operations providing reception layers RL1-RL4. Processor 101, however, may provide/define/configure functionality/operations of only one reception layer RL1 during rank 1 reception; processor 101 may provide/define/configure functionality/operations of only two reception layers RL1 and RL2 during rank 2 transmission; processor 101 may provide/define/configure functionality/operations of only 3 reception layers RL1, RL2, and RL3 during rank 3 transmission; and functionality/operations of four reception layers RL1, RL2, RL3, and RL4 may only be provided during rank 4 transmission. When multiple reception layers are provided/defined/configured, for example, processor 101 may provide/define/configure functionality/operations of multiple demodulator/deinterleaver blocks, multiple soft buffer blocks, and/or multiple channel decoder blocks to allow parallel processing of data of different reception layers during a TTI/TFRE, or processor 101 may provide/define/configure functionality/operations of a single demodulator/deinterleaver block, a single soft buffer, and/or a single channel decoder to allow serial processing of data of different reception layers during a TTI/TFRE.

According to embodiments discussed above with respect to FIG. 14, base station processor 101 may use mapping tables of FIGS. 10-13 to retransmit failed data packets (e.g., associated with a bundled HARQ process) as an alternative to using mapping tables of FIGS. 15-18 as discussed above with respect to operations of FIG. 9 when wireless terminal 200 reports/requests a downlink transmission rank that is different than the downlink transmission rank used to initially transmit the now failed data packets. These embodiments will now be discussed in greater detail below with respect to the tables of FIGS. 15-18 for systems including 4 transmit and 4 receive MIMO antennas supporting one, two, three, and four MIMO transmission ranks. While embodiments relating to 4 transmit and 4 receive MIMO antennas are discussed by way of example, embodiments may be applied to systems including fewer and/or more MIMO transmit and receive antennas.

If retransmission of previously transmitted data blocks using a shared/bundled HARQ process(es) is required at block 903 of FIG. 9, base station processor 101 may select a DL transmission rank at block 905 to maintain a same HARQ process mapping for any such retransmissions as set forth in the tables of FIGS. 15-18. The headings, acronyms, and abbreviations of FIGS. 15-18 have the same meanings as those discussed above with respect to FIGS. 10-13.

The table of FIG. 15 illustrates base station processor 101 rank schedulings when an initial rank 1 downlink transmission is performed using the first HARQ process HARQ-1 mapped to first transmission/reception layers TL1/RL1. Accordingly, the initial transmission includes only a single data block transmitted/received using transmission/reception layers TL1/RL1, and the resulting ACK/NACK message for the HARQ-1 process maps to only the single data block (i.e., an ACK message is generated if the single data block passes decoding at CD1, or a NACK message is generated if the single data block fails decoding at CD1). In each case where the single data block passes P (i.e., rows 1, 3, 5, and 7 of FIG. 15) decoding (so that an ACK message is received), base station processor 101 may schedule the rank reported/requested by wireless terminal 200, and new data NT may be transmitted in accordance with the UE reported rank. With scheduled rank 4, new first and fourth data blocks may be transmitted over respective transmission/reception layers TL1/RL1 and TL4/RL4 bundled with HARQ-1 using a same TFRE, and new second and third data blocks may be transmitted over respective transmission/reception layers TL2/RL2 and TL3/RL3 bundled with HARQ-2 using the same TFRE as shown in row 1 of FIG. 15. With scheduled rank 3, a new first data block may be transmitted over respective transmission/reception layers TL1/RL1 using HARQ-1 using a TFRE without bundling, and new second and third data blocks may be transmitted over respective transmission/reception layers TL2/TL2 and TL3/RL3 bundled with HARQ-2 using the same TFRE as shown in row 3 of FIG. 15. With scheduled rank 2, a new first data block may be transmitted over transmission/reception layers TL1/RL1 using HARQ-1 without bundling using a TFRE, and a second data block may be transmitted over transmission/reception layers TL2/RL2 using HARQ-2 without bundling using the TFRE as shown in row 5 of FIG. 15. With scheduled rank 1, a new first data block may be transmitted over transmission/reception layers TL1/RL1 using HARQ-1 without bundling using the TFRE, and HARQ-2 may remain unused during the TFRE as shown in row 7 of FIG. 15.

In cases where the single data block fails F (rows 2, 4, 6, and 8 of FIG. 15) decoding (so that a NACK message is received), base station processor 101 may consider the reported rank, but base station processor 101 may schedule the downlink transmission using the reported rank or a different rank to maintain a HARQ process mapping to support the retransmission of the failed data block. As shown at rows 2, 4, and 6 of FIG. 15, for example, if wireless terminal 200 reports a rank higher than that of the initial transmission (i.e., a reported rank of 2, 3, or 4 with an initial rank of 1), base station processor 101 may allow scheduling of a higher rank transmission but not necessarily the rank reported/requested by wireless terminal 200. As shown at rows 4 and 6 of FIG. 15, if wireless terminal 200 reports/requests a rank of 3 or 2 after a failed rank 1 transmission/reception, base station processor 101 may schedule the reported/requested rank (i.e., rank 3 or 2) because the HARQ-1 is mapped to the first transmission/reception layer TL1/RL1 without bundling for rank 1, 2, and 3 transmission/reception according to embodiments of FIG. 14. As shown at row 2 of FIG. 15, if wireless terminal 200 reports/requests a rank of 4 after a failed rank 1 transmission/reception, base station processor 101 may schedule a rank 3 transmission (higher than the previous rank 1 transmission) because a rank 3 transmission maintains the mapping of the first transmission/reception layer TL1/RL1 to HARQ-1 without bundling to support retransmission (in contrast to a rank 4 transmission that would bundle HARQ-1). If the reported rank is the same as the initial rank as shown in row 8 of FIG. 15, the scheduled rank may remain unchanged so that the mapping of HARQ-1 to transmission/reception layers TL1/RL1 is unchanged and so that the failed data block may be retransmitted using the same HARQ-1 mapping. More generally, if the reported rank is unchanged relative to the initial rank as shown in rows 7 and 8 of FIG. 15, the reported rank may be scheduled whether the initial data block(s) was(were) successfully decoded or not.

FIG. 16 illustrates base station processor 101 rank schedulings when an initial rank 2 downlink transmission is performed using HARQ-1 mapped to first transmission/reception layers TL1/RL1 (without bundling/sharing) and using HARQ-2 mapped to second transmission/reception layers TL2/RL2 (without bundling/sharing). Accordingly, the initial transmission includes a first data block transmitted/received using transmission/reception layers TL1/RL1 and a second data block transmitted/received using transmission/reception layers TL2/RL2. The resulting ACK/NACK message for HARQ-1 maps to only the first data block (i.e., an ACK message is generated if the first data block passes decoding at CD1, or a NACK message is generated if the single data block fails decoding at CD1), and the resulting ACK/NACK message for the HARQ-2 process maps to only the second data block (i.e., an ACK message is generated if the second data block passes decoding at CD2, or a NACK message is generated if the second data block fails decoding at CD2).

In each case where both of the first and second data blocks pass P (i.e., rows 1, 5, 9, and 13) decoding (so that two ACK messages are received), base station processor 101 may schedule the rank recommended/requested by wireless terminal 200, and new data NT may be transmitted in accordance with the UE reported rank as discussed above with respect to rows 1, 3, 5, and 7 of FIG. 15. In each case where wireless terminal 200 reports/recommends rank 2 that is the same as the initial rank (as in rows 9, 10, 11, and 12 of FIG. 11), base station processor 101 may maintain the same scheduled rank (i.e., rank 2) regardless of the pass/fail status of the initially transmitted data blocks. The same rank 2 HARQ process mappings for HARQ-1 and HARQ-2 are maintained for the next transmission/retransmission regardless of the status P/F of the initial rank 2 transmission. Accordingly, retransmissions of one or both of the first and second data blocks (OT) may be supported using the same HARQ mappings, and/or new data blocks may be transmitted for either or both HARQ processes for which initial decoding passed.

When wireless terminal 200 reports a higher rank (i.e., rank 3 or rank 4) and the second data block (mapped to HARQ-2 without bundling/sharing) of the initial transmission fails F decoding resulting in a HARQ-2 NACK message (as in rows 2, 4, 6, and 8 of FIG. 16), base station processor 101 may select rank 2 to maintain the same downlink transmission rank. The same rank 2 HARQ process mappings for HARQ-1 and HARQ-2 are thus maintained for the retransmission of the second data block using HARQ-2 that failed and for the possible retransmission of the first data block using HARQ-1 if it failed or the transmission of a new data block using HARQ-1 if the initial first data block passed.

When wireless terminal 200 reports a higher rank (i.e., rank 3 or rank 4), when the second data block (mapped to HARQ-2 without bundling/sharing) of the initial transmission passes P decoding, and when the first data block (mapped to HARQ-1 without bundling/sharing) of the initial transmission fails F decoding resulting in a HARQ-1 NACK message (as in rows 3 and 7 of FIG. 16), base station processor 101 may select rank 3 (at rows 3 and 7 of FIG. 16) to maintain the same HARQ-1 mapping to transmission/reception layers TL1/RL1 (without sharing/bundling) while allowing HARQ-2 to be mapped to transmission/reception layers TL2/RL2 and TL3/RL3 to allow transmission of two new data blocks NT using the HARQ-2 process. Stated in other words, a higher rank may be allowed even though the first data block failed because the mapping of HARQ-1 to transmission/reception layers TL1/RL1 (without sharing/bundling) is the same for both rank 2 and rank 3 transmissions. While the mapping of HARQ-2 is different for rank 2 and rank 3 transmissions, a same mapping of HARQ-2 is not required because the initial HARQ-2 data block passed. Accordingly, a higher data rate rank 3 transmission (allowing retransmission of the one HARQ-1 data packet that failed and 2 new HARQ-2 data packets) may be allowed while supporting the HARQ-1 retransmission.

At row 14 of FIG. 16, if the first data block (of HARQ-1) of the initial transmission passes (P), if the second data block (of HARQ-2) of the initial transmission fails (F), and wireless terminal 200 reports rank 1, base station processor 101 may schedule a rank two transmission to support transmission of a new data block over transmission/reception layers TL1/RL1 using HARQ-1 and retransmission of the second data block over transmission/reception layers TL2/RL2 using HARQ-2. At row 15 of FIG. 16, if the first data block (of HARQ-1) of the initial transmission fails (F), if the second data block (HARQ-2) of the initial transmission passes (P), and wireless terminal 200 reports rank 1, base station processor 101 may schedule a rank one transmission retransmitting the first data block of the initial transmission using HARQ-1 (without bundling/sharing) over transmission/reception layers TL1/RL1. At row 16 of FIG. 16, if both of the first data block (HARQ-1) and the second data block (HARQ-2) of the initial transmission fail (F) and wireless terminal 200 reports rank 1, base station processor 101 may force a rank 2 transmission to maintain the mappings of HARQ-1 to transmission/reception layers TL1/RL1 and HARQ-2 to transmission/reception layers TL2/RL2 for retransmissions of both of the failed data blocks.

FIG. 17 illustrates base station processor 101 rank schedulings when an initial rank 3 downlink transmission is performed using HARQ-1 mapped to first transmission/reception layers TL1/RL1 (without bundling/sharing) and using HARQ-2 mapped to second and third transmission/reception layers TL2/TL2 and TL3/RL3 (with bundling/sharing). Accordingly, the initial transmission includes a first data block transmitted/received using transmission/reception layers TL1/RL1, a second data block transmitted/received using transmission/reception layers TL2/RL2, and a third data block transmitted/received using transmission/reception layers TL3/RL3. The resulting ACK/NACK message for HARQ-1 thus maps to the first data block (i.e., an ACK message is generated if the first data block passes decoding at CD1, or a NACK message is generated if the first data block fails decoding at CD1), and the resulting ACK/NACK message for the HARQ-2 process maps to the second and third data blocks (i.e., an ACK message is generated if both of the second and third data block pass decoding at CD2 and CD3, or a NACK message is generated if either of the second and/or third data blocks fail decoding at CD2 and/or CD3).

In cases where each of the first, second, and third data blocks pass decoding so that both HARQ-1 and HARQ-2 pass P (i.e., so two ACK messages are received), base station processor 101 may schedule the rank recommended/requested by wireless terminal 200 (as in rows 1, 5, 9, and 13 of FIG. 17), and new data NT may be transmitted in accordance with the UE reported rank as discussed above with respect to FIGS. 15 and 16. In each case where wireless terminal 200 reports a recommended/requested rank 3 that is the same as the initial rank (as in rows 5, 6, 7, and 8 of FIG. 13), base station processor 101 may maintain the same scheduled rank (i.e., rank 3). The same rank 3 HARQ process mappings for HARQ-1 and HARQ-2 are thus maintained for the next transmission/retransmission regardless of the status P/F of the initial rank 3 transmission. Accordingly, retransmission of the first data block (OT) of HARQ-1 and/or retransmission of the second and third data blocks (OT) of HARQ-2 may be supported using the same HARQ mappings, and/or new data blocks may be transmitted for either or both HARQ processes for which initial decoding passed.

When wireless terminal 200 reports a higher rank (i.e., rank 4) and the first data block (mapped to HARQ-1 without bundling/sharing) of the initial transmission fails F decoding resulting in a HARQ-1 NACK message (as in rows 3 and 4 of FIG. 17), base station processor 101 may maintain rank 3 to maintain the same rank 3 HARQ process mappings for HARQ-1 and HARQ-2. Accordingly, any needed retransmissions may be supported. When wireless terminal 200 reports a higher rank (i.e., rank 4) and the first data block (mapped to HARQ-1 without bundling/sharing) of the initial transmission passes decoding resulting in a HARQ-1 ACK message (as in rows 1 and 2 of FIG. 17), base station processor 101 may schedule rank 4 so that HARQ-1 is mapped to transmission/reception layers TL1/RL1 and TL4/RL4 and so that HARQ-2 is mapped to transmission/reception layers TL2/RL2 and TL3/RL3. Here the HARQ-2 mapping is unchanged between rank 3 and rank 4 to support retransmission of second and third data blocks mapped to HARQ-2 if needed as shown at row 2 of FIG. 17.

When wireless terminal 200 reports rank 2 and the second and third data blocks (mapped to HARQ-2 with sharing/bundling) pass decoding resulting in a HARQ-2 ACK message (as in rows 9 and 11 of FIG. 17), base station processor 101 may schedule rank 2 so that HARQ-1 is mapped to transmission/reception layers TL1/RL1 (without sharing/bundling) and so that HARQ-2 is mapped to transmission/reception layers TL2/RL2 (without sharing/bundling). Accordingly, a mapping of HARQ-1 to transmission/reception layers TL1/RL1 is the same for rank 2 and rank 3 downlink transmissions. Because both of the second and third data blocks of the initial HARQ-2 transmission passed decoding, retransmission using the HARQ-2 process is not required and remapping of the HARQ-2 process can occur without affecting any HARQ-2 retransmissions.

When wireless terminal 200 reports rank 2 and either or both of the second and third data blocks (mapped to HARQ-2 with sharing/bundling) fail decoding (F) resulting in a HARQ-2 NACK message (as in rows 10 and 12 of FIG. 17), base station processor 101 may continue scheduling rank 3 (as in rows 10 and 12 of FIG. 17) so that mappings of HARQ-1 and HARQ-2 remain unchanged (i.e., HARQ-1 maps to transmission/reception layers TL1/RL1 and HARQ-2 maps to transmission/reception layers TL2/RL2 and TL3/RL3). Accordingly, retransmissions of second and third data blocks of HARQ-2 may be supported, and retransmission of a first data block of HARQ-1 may be supported if needed (at row 12 of FIG. 17).

At rows 13 and 15 of FIG. 17, if the second and third data blocks (mapped to HARQ-2) of the initial transmission pass (P) and wireless terminal 200 reports rank 1, base station processor may schedule a rank 1 transmission supporting transmission of new data or retransmission of old data using the first transmission/reception layers RL1/TL1. At rows 14 and 16 of FIG. 17, if either of the second and/or third data blocks (mapped to HARQ-2) of the initial transmission fail (F) and wireless terminal 200 reports rank 1, base station processor 101 may schedule/maintain rank 3 transmission to support retransmission of the second and/or third data blocks using transmission/reception layers RL2/TL2 and RL3/TL3 mapped to HARQ-2.

The table of FIG. 18 illustrates base station processor 101 rank schedulings when an initial rank 4 downlink transmission is performed using HARQ-1 mapped to first and fourth transmission/reception layers TL1/RL1 and TL4/RL4 (with bundling/sharing) and using HARQ-2 mapped to second and third transmission/reception layers TL2/RL2 and TL3/RL3 (with bundling/sharing). Accordingly, the initial transmission includes a first data block transmitted/received using transmission/reception layers TL1/RL1, a second data block transmitted/received using transmission/reception layers TL2/RL2, a third data block transmitted/received using transmission/reception layers TL3/RL3, and a fourth data block transmitted using transmission/reception layers TL4/RL4. The resulting ACK/NACK message for HARQ-1 thus maps to the first and fourth data blocks (i.e., an ACK message is generated if both the first and fourth data blocks pass decoding at CD1 and CD4, or a NACK message is generated if either or both of the first and fourth data blocks fail decoding at CD1/CD4), and the resulting ACK/NACK message for HARQ-2 maps to the second and third data blocks (i.e., an ACK message is generated if both the second and third data blocks pass decoding at CD2 and CD3, or a NACK message is generated if either or both of the second and third data blocks fail decoding at CD2/CD3).

In each case where all of the first, second, third and fourth data blocks pass decoding so that both HARQ-1 and HARQ-2 pass P (i.e., so two ACK messages are received), base station processor 101 may schedule the rank reported/requested by wireless terminal 200 (as in rows 1, 5, 9, and 13 of FIG. 18), and new data NT may be transmitted in accordance with the UE reported rank as discussed above with respect to FIGS. 15, 16, and 17. In each case where wireless terminal 200 reports a recommended/requested rank 4 that is the same as the initial rank (as in rows 1, 2, 3, and 4 of FIG. 18), base station processor 101 may maintain the same scheduled rank (i.e., rank 4). The same rank 4 HARQ process mappings for HARQ-1 and HARQ-2 are thus maintained for the next transmission/retransmission regardless of the status P/F of the initial rank 4 transmission. Accordingly, retransmissions of the first and fourth data blocks (OT) of HARQ-1 and/or retransmission of the second and third data blocks (OT) of HARQ-2 may be supported using the same HARQ mappings, and/or new data blocks may be transmitted for either or both HARQ processes for which initial decoding passed.

When wireless terminal 200 reports a lower rank (e.g., rank 3, rank 2, or rank 1) and either or both of the first and fourth data blocks (mapped to HARQ-1 with sharing/bundling) fail decoding F resulting in a HARQ-1 NACK message (as in rows 7, 8, 11, 12, 15, or 16 of FIG. 18), base station processor 101 may continue scheduling rank 4 so that HARQ-1 is mapped to the first and fourth transmission/reception layers TL1/RL1 and TL4/RL4 to support retransmission of the first and fourth data blocks. By continuing rank 4, HARQ-2 may continue to be mapped to transmission/reception layers TL2/RL2 and TL3/RL3 to support retransmission of the second and third data blocks (mapped to HARQ-2 with sharing/bundling) if needed (e.g., at rows 8, 12, or 16 of FIG. 18), or two new data blocks may be transmitted using HARQ-2 (e.g., at rows 7, 11, or 15 of FIG. 18).

When wireless terminal 200 reports rank 3 and the first data block (mapped to HARQ-1 without sharing/bundling) passes decoding P resulting in a HARQ-1 ACK message (as in rows 5 and 6 of FIG. 18), base station processor 101 may scheduling rank 3 so that HARQ-1 is mapped to the first transmission/reception layers TL1/RL1 (without bundling/sharing), and so that HARQ-2 is mapped to the second and third transmission/reception layers RL2/TL2 and TL3/RL3 (with bundling/sharing) to support retransmission of the second and third data blocks if needed (e.g., at row 6 of FIG. 18).

When wireless terminal 200 reports rank 2 and any of the first, second, third, and/or fourth data blocks fail decoding resulting in a HARQ-1 NACK and/or a HARQ-2 NACK (as in rows 10, 11, and/or 12), base station processor 101 may schedule rank 4 so that HARQ-1 is mapped to transmission/reception layers RL1/TL1 and RL4/TL4 (with bundling/sharing) and HARQ-2 is mapped to transmission/reception layers RL2/TL2 and RL3/TL3 (with bundling/sharing). Accordingly, mappings of HARQ-1 to transmission/reception layers TL1/RL1 and TL4/RL4 and HARQ-2 to transmission/reception layers RL2/TL2 and RL3/TL3 are maintained to support retransmissions as needed.

When wireless terminal 200 reports rank 1 and any of the first, second, third, and/or fourth data blocks fail decoding (F) resulting in a HARQ-1 NACK and/or a HARQ-2 NACK message (as in rows 14, 15, and/or 16), base station processor 101 may schedule rank 4 so that HARQ-1 is mapped to transmission/reception layers RL1/TL1 and RL4/TL4 (with bundling/sharing) and HARQ-2 is mapped to transmission/reception layers RL2/TL2 and RL3/TL3 (with bundling/sharing). Accordingly, mappings of HARQ-1 to transmission/reception layers TL1/RL1 and TL4/RL4 and HARQ-2 to transmission/reception layers RL2/TL2 and RL3/TL3 are maintained to support retransmissions as needed.

According to embodiments discussed above with respect to FIGS. 14-18, when an initial transmission/reception has a rank greater than 1 (e.g., rank 2, 3, or 4) and both HARQ processes pass (i.e., both HARQ-1 and HARQ-2 generate ACK messages), base station processor 101 may select the rank reported/requested by wireless terminal 200 for a subsequent transmission to wireless terminal 100. When an initial transmission/reception has a rank greater than 1 (e.g., rank 2, 3, or 4) and both HARQ processes fail (i.e., HARQ-1 and HARQ-2 generate NACK messages), base station processor 101 may maintain the rank used for the initial transmission (regardless of the rank reported/requested by wireless terminal 200) to support retransmission of data blocks corresponding to HARQ-1 and HARQ-2.

If an initial transmission is a rank 2 transmission so that an initial data block transmitted/received over transmission/reception layers RL2/TL2 and mapped to HARQ-2 without bundling, and if HARQ-2 generates a NACK due to failure decoding the initial data block, base station processor 101 may restrict the next transmission to rank 2 (regardless of the rank reported/requested by wireless terminal 200) to support retransmission of the data block over transmission/reception layers RL2/TL2 as shown in rows 2, 4, 6, 8, 10, 12, 14, and 16 of FIG. 16 because no other rank (e.g., rank 1, 3, or 4) supports non-bundled use of transmission/reception layers RL2/TL2. Stated in other words, if a data block is mapped to a HARQ process without bundling and the data block fails decoding, the same rank may be maintained for retransmission (regardless of the rank reported/requested by wireless terminal) if no other rank supports non-bundled transmission/reception using the same transmission/reception layer.

Using mappings of FIGS. 15-18, bundled transport blocks sharing a same HARQ process that fail decoding during an initial transmission may thus be retransmitted using the same transmission/reception layers bundled to the same HARQ process.

Base station operations for shared HARQ processes have been discussed above with respect to FIGS. 8A and 9-18 where a base station 100 transmit buffer (e.g., included in base station processor 101 and/or memory 118) for wireless terminal 200 is not buffer limited (e.g., the transmit buffer includes sufficient data for wireless terminal 200 for a next transmission data block or blocks). Stated in other words, a base station transmit buffer for wireless terminal 200 is not buffer limited when it includes new data for one or more new transport data blocks (NT as shown in the tables of FIGS. 10-13 and 15-18) to be transmitted to wireless terminal 200. In the event that downlink transmission to wireless terminal 200 is buffer limited (e.g., sufficient new data is not available for new transport data blocks NT to be sent to wireless terminal 200) when a partial retransmission is called for responsive to receiving both a NACK and an ACK for a rank 2 or higher MIMO TTI, however, an additional mechanism(s) may be useful to efficiently handle the retransmission.

In a multicodeword MIMO system with two HARQ codewords supporting more than two MIMO layers/ranks, if one HARQ codeword is an ACK (or P for pass) and the other HARQ codeword is a NACK (or F for fail), embodiments discussed below may provide a mechanism to retransmit a failed transport data block or blocks corresponding to the NACK when downlink transmissions are buffer limited. More particularly, embodiments discussed below may address retransmission of a transport data block or blocks corresponding to the NACK when the base station processor 101 (e.g., a transmit buffer of the base station processor 101 for wireless terminal 200) is buffer limited (e.g., the transmit buffer does not have enough data to transmit a transport data block or blocks on the MIMO layer or layers corresponding to the ACK). This situation may occur, for example, at the end of a communication/session/call with/for wireless terminal 200 when a base station transmit buffer for wireless terminal 200 is empty or when downlink transmissions are not continuous, and a retransmission is needed responsive to a NACK. While embodiments are discussed for systems including 4 transmit and 4 receive antennas supporting up to 4 MIMO layers, embodiments may be applied in any multi-antenna system supporting rank 2 and/or higher MIMO transmission/reception.

According to some embodiments illustrated in FIGS. 19 and 20A-C, when a NACK and an ACK are received from wireless terminal 200 at base station 100 for a rank 2 or higher downlink MIMO TTI and the base station 100 is transmit buffer limited with respect to wireless terminal 200 (e.g., there is insufficient buffered data for a new transport data block or blocks for the MIMO layer or layers corresponding to the ACK), base station 200 may maintain the same rank for retransmission of the transport data block or blocks corresponding to the NACK during a second MIMO TTI. The transport data block or blocks corresponding to the NACK may thus be retransmitted during the second MIMO TTI over the same MIMO layer or layers used during the first MIMO TTI. Instead of retransmitting the transport data block or blocks corresponding to the ACK during the second MIMO TTI, however, base station 200 may transmit an indication of discontinuous transmission (DTX) over the downlink signaling channel (e.g., HS-SCCH) informing wireless terminal 200 that no data will be transmitted over the MIMO layers corresponding to the ACK.

Figure 19:
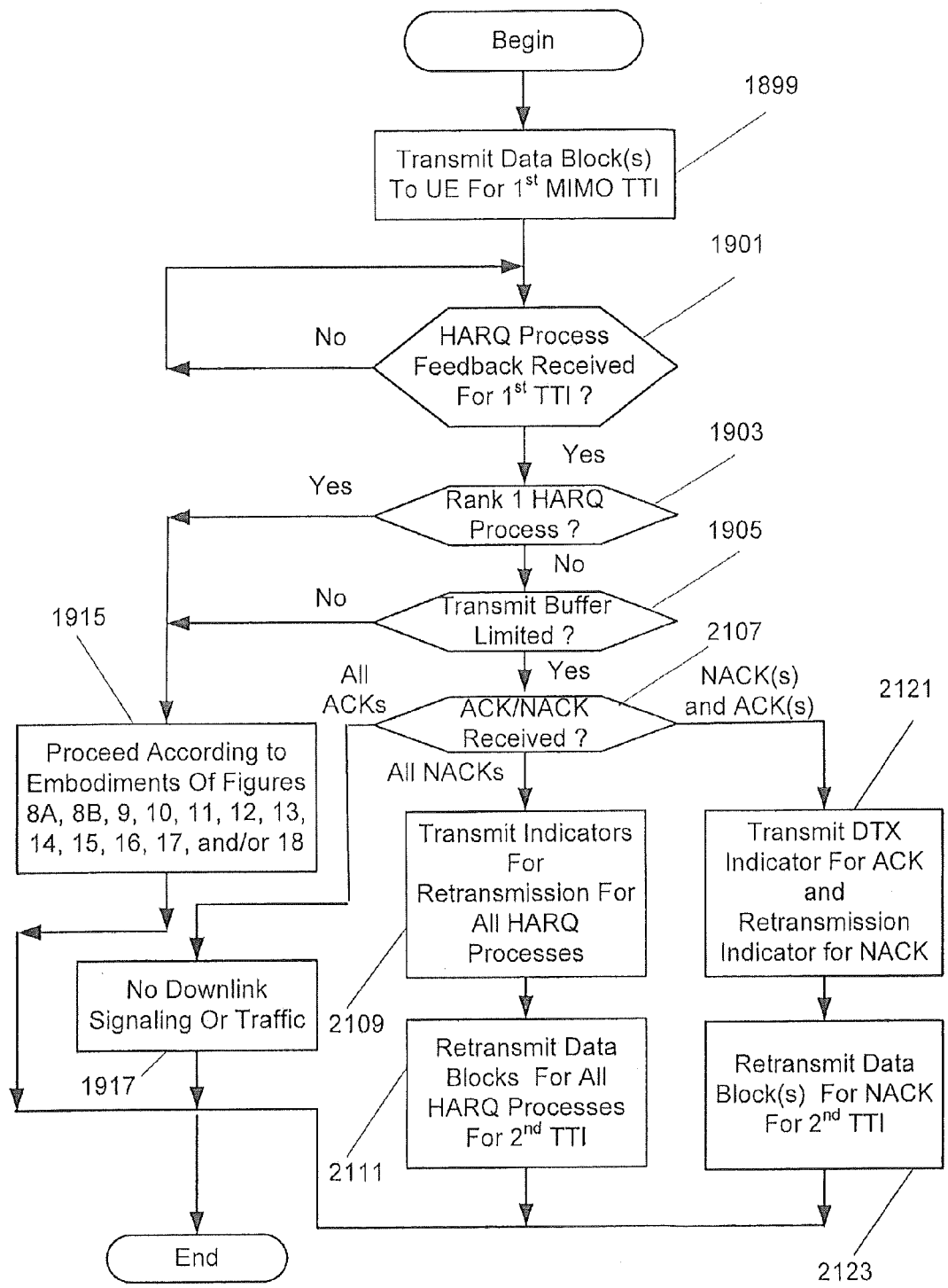
FIG. 19 is a flow chart illustrating operations for retransmissions according to some other embodiments.

FIG. 19 is a flow chart illustrating base station operations supporting retransmission in response to a NACK or NACKs indicating failure decoding at wireless terminal 200. As shown in the flow chart of FIG. 19 at block 1899, base station processor 101 may transmit one or more transport data blocks over respective MIMO layers (also referred to as MIMO streams) during a first MIMO transmission time interval (TTI), also referred to as a Time Frequency Resource Element or TFRE. While a 4 antenna system supporting up to four MIMO layers will be discussed by way of example, embodiments may be applied to any multi-antenna MIMO systems supporting rank 2 or higher MIMO transmission/reception (e.g., an 8 antenna system supporting up to eight MIMO layers/streams). For a rank 1 MIMO transmission of a 4 antenna system, base station processor 101 may transmit one transport data block over a first MIMO layer during the first MIMO TTI, and a first HARQ process (HARQ-1) may map to the first transport data block of the first MIMO layer. For a rank 2 MIMO transmission of a 4 antenna system, base station processor 101 may transmit first and second transport data blocks over respective first and second MIMO layers/streams during the first MIMO TTI, and first and second HARQ processes (HARQ-1 and HARQ-2) may map to the respective first and second transport data blocks of the respective first and second MIMO layers. For a rank 3 MIMO transmission of a 4 antenna system, base station processor 101 may transmit first, second, and third transport data blocks over respective first, second, and third MIMO layers during the first MIMO TTI, the first HARQ process may map to the first transport data block of the first MIMO layer, and the second HARQ process may map to the second and third transport data blocks of the respective second and third MIMO layers. For a rank 4 MIMO transmission of a 4 antenna system, base station processor 101 may transmit first, second, third, and fourth transport data blocks over respective first, second, third, and fourth MIMO layers during the first MIMO TTI, the first HARQ process may map to the first and fourth transport data blocks of the respective the first and fourth MIMO layers, and the second HARQ process may map to the second and third transport data blocks of the respective second and third MIMO layers.

As discussed above, wireless terminal 200 generates an ACK or a NACK for each HARQ process used during the first MIMO TTI. If all transport data blocks that map to a HARQ process for the first TTI are successfully decoded by wireless terminal 200, wireless terminal 200 transmits an ACK for that HARQ process. If any one of the transport data blocks that maps to a HARQ process for the first TTI is not successfully decoded by wireless terminal 200, wireless terminal 200 transmits a NACK for that HARQ process. At block 1901, base station processor 101 receives HARQ process feedback (i.e., ACKs/NACKs) from wireless terminal 200 for each HARQ process used during the $1^{st}$ TTI. If the $1^{st}$ MIMO TTI was a rank 1 TTI used to transmit one transport data block, an ACK is received for the first HARQ process if the transport data block was successfully decoded, or a NACK is received for the first HARQ process if the transport data block is not successfully decoded. The second HARQ process is not used for a rank 1 TTI. If the $1^{st}$ MIMO TTI was a rank 2 TTI used to transmit first and second transport data blocks, an ACK is received for the first HARQ process if the first transport data block was successfully decoded or a NACK is received for the first HARQ process if the first transport data block is not successfully decoded, and an ACK is received for the second HARQ process if the second transport data block was successfully decoded or a NACK is received for the second HARQ process if the second transport data block was not successfully decoded. If the $1^{st}$ MIMO TTI was a rank 3 TTI used to transmit first, second, and third transport data blocks, an ACK is received for the first HARQ process if the first transport data block was successfully decoded or a NACK is received for the first HARQ process if the first transport data block was not successfully decoded, and an ACK is received for the second HARQ process if the second and third transport data blocks were both successfully decoded or a NACK is received for the second HARQ process if either or both of the second and/or third transport data blocks was not successfully decoded. If the $1^{st}$ MIMO TTI was a rank 4 TTI used to transmit first, second, third, and fourth transport data blocks, an ACK is received for the first HARQ process if the first and fourth transport data blocks were successfully decoded or a NACK is received for the first HARQ process if either or both of the first and/or second transport data blocks was not successfully decoded, and an ACK is received for the second HARQ process if the second and third transport data blocks were successfully decoded or a NACK is received for the second HARQ process if either or both of the second and/or third transport data blocks was not successfully decoded.

At block 1903 and/or at block 1905, if the $1^{st}$ MIMO TTI was a rank 1 TTI and/or if base station 100 is not transmit buffer limited with respect to wireless terminal 200, base station processor 101 may proceed at block 1915 with operations according to embodiments of FIGS. 8A, 9, 10, 11, 12, 13, 14, 15, 16, 17, and/or 18 as discussed above. Otherwise, if the $1^{st}$ MIMO TTI was a rank 2 or higher TTI and the base station processor is transmit buffer limited at blocks 1903 and 1905, base station processor 101 may proceed to block 2107.

At block 2107, if ACKs are received for all HARQ processes used in the $1^{st}$ MIMO TTI, there is no need for retransmission and there is no data (or insufficient data) in the transmit buffer to schedule a new MIMO TTI for wireless terminal 200 (i.e., base station 100 was deemed to be transmit buffer limited with respect to wireless terminal 200 at block 1905). Accordingly, no downlink signaling or traffic is transmitted to wireless terminal 200 over downlink signaling or traffic channels (e.g., HS-SCCH or HS-DPSCH) at block 1917 until further data is received in the transmit buffer for wireless terminal 200.

At block 2107, if NACKs are received for all HARQ processes used in the $1^{st}$ MIMO TTI, base station processor 101 may generate and transmit data indicators indicating retransmission (for a second MIMO TTI) of all transport data blocks that were originally transmitted during the $1^{st}$ MIMO TTI at block 2109. Moreover, the data indicators indicating retransmission may be transmitted over a downlink signaling channel (e.g., HS-SCCH). At block 2111, base station processor 101 may retransmit all of the previously transmitted data blocks from the $1^{st}$ MIMO TTI during a $2^{nd}$ MIMO TTI over a downlink traffic channel (e.g., HS-DPSCH).

At block 2107, if a NACK is received for one HARQ process used in the $1^{st}$ MIMO TTI and an ACK is received for another HARQ process used in the $1^{st}$ MIMO TTI, base station processor 101 may generate and transmit a discontinuous transmission (DTX) indicator (indicating no transmission over MIMO layers corresponding to the ACK) and a data indicator indicating retransmission of the transport data block or blocks corresponding to the NACK for a $2^{nd}$ MIMO TTI at block 2121. The DTX indicator and the data indicator indicating retransmission may be transmitted over a downlink signaling channel (e.g., HS-SCCH). At block 2123, base station processor 101 may retransmit the transport data block or blocks corresponding to the NACK over the MIMO TTI layers corresponding to the NACK during the $2^{nd}$ MIMO TTI without retransmitting the transport data block or blocks corresponding to the ACK. More particularly, the transport data block or blocks corresponding to the NACK may be transmitted over a downlink traffic channel (e.g., HS-DPSCH) during the $2^{nd}$ MIMO TTI. By providing the DTX indicator prior to the retransmission, wireless terminal 200 knows to disregard the MIMO layer layers corresponding to the ACK during the $2^{nd}$ MIMO TTI.

FIG. 20A is a retransmission table when the original transmission ($1^{st}$ MIMO TTI) is a rank 4 transmission. As shown in rows 2, 3, 6, 7, 10, 11, 14, and 15 of the table of FIG. 20A, when the $1^{st}$ MIMO TTI is rank 4, base station processor 101 may transmit a discontinuous transmission DTX indicator for MIMO layers corresponding to the ACK at block 2121, and base station processor 101 may retransmit only those transport data blocks corresponding to a NACK from the $1^{st}$ MIMO TTI during the $2^{nd}$ MIMO TTI as indicated by OT at block 2123. Moreover, base station processor 101 may maintain the MIMO rank of the $1^{st}$ MIMO TTI (i.e., rank 4) during the $2^{nd}$ MIMO TTI regardless of the rank suggested/requested by wireless terminal 200. In an alternative, base station processor 101 may allow rank 3 (as shown in rows 2, 6, 10, and 14 of FIG. 22A) for the $2^{nd}$ MIMO TTI if the ACK corresponds to the first HARQ process (mapped to layers 1 and 4) because rank 3 is sufficient to support retransmission of the HARQ-2 data blocks using MIMO layers 2 and 3. At rows 3, 7, 11, and 15, first and fourth transport data blocks may be retransmitted over respective first and fourth MIMO layers at block 2123, and at rows 2, 6, 10, and 14, second and third transport data blocks may be retransmitted over respective second and third MIMO layers at block 2123. As shown in rows 4, 8, 12, and 16 of FIG. 20A, base station processor 101 may retransmit all transport data blocks from the $1^{st}$ MIMO TTI during the $2^{nd}$ MIMO TTI at block 2111 because only NACKs are received for the first MIMO TTI. For example, first, second, third, and fourth transport data blocks may be retransmitted over respective first, second, third, and fourth transport data blocks during the $2^{nd}$ MIMO TTI. As shown in rows 1, 5, 9, and 13 of FIG. 20A, there is no transmission/retransmission at block 1917 when all ACKs are received and base station 100 is buffer limited with respect to wireless terminal 200. When all ACKs are received and base station 100 is buffer limited with respect to wireless terminal 200, no downlink signaling or traffic is transmitted to wireless terminal 200 over downlink signaling and/or traffic channels (e.g., HS-SCCH and/or HS-DPSCH) until additional data is received in the transmit buffer for wireless terminal 200.

FIG. 20B is a retransmission table when the original transmission ($1^{st}$ MIMO TTI) is a rank 3 transmission. As shown in rows 2, 3, 6, 7, 10, 11, 14, and 15 of the table of FIG. 20B, when the $1^{st}$ MIMO TTI is rank 3, base station processor 101 may transmit a discontinuous transmission DTX indicator for MIMO layers corresponding to the ACK at block 2121, and base station processor 101 may retransmit only the transport data block or blocks corresponding to a NACK from the $1^{st}$ MIMO TTI during the $2^{nd}$ MIMO TTI as indicated by OT at block 2123. Moreover, base station processor 101 may maintain the MIMO rank of the $1^{st}$ MIMO TTI (i.e., rank 3) during the $2^{nd}$ MIMO TTI regardless of the rank suggested/requested by wireless terminal 200. In an alternative, base station processor 101 may allow a different rank (as shown, for example, in parentheses at rows 2, 6, 11, or 15) provided that the different rank supports transmission/reception using the MIMO layers corresponding to the NACK. At rows 3, 7, 11, and 15, the first transport data block may be retransmitted over the first MIMO layer at block 2123, and at rows 2, 6, 10, and 14, the second and third transport data blocks may be retransmitted over respective second and third MIMO layers at block 2123. As shown in rows 4, 8, 12, and 16 of FIG. 20B, base station processor 101 may retransmit all transport data blocks from the $1^{st}$ MIMO TTI during the $2^{nd}$ MIMO TTI at block 2111 because only NACKs are received for the first MIMO TTI. For example, first, second, and third transport data blocks may be retransmitted over respective first, second, and third MIMO layers during the $2^{nd}$ MIMO TTI. As shown in rows 1, 5, 9, and 13 of FIG. 22B, there is no transmission/retransmission at block 1917 when all ACKs are received and base station 100 is buffer limited with respect to wireless terminal 200. When all ACKs are received and base station 100 is buffer limited with respect to wireless terminal 200, no downlink signaling or traffic is transmitted to wireless terminal 200 over downlink signaling and/or traffic channels (e.g., HS-SCCH and/or HS-DPSCH) until additional data is received in the transmit buffer for wireless terminal 200.

FIG. 20C is a retransmission table when the original transmission (1$^{st}$ MIMO TTI) is a rank 2 transmission. As shown in rows 2, 3, 6, 7, 10, 11, 14, and 15 of the table of FIG. 20C, when the 1$^{st}$ MIMO TTI is rank 2, base station processor 101 may transmit a discontinuous transmission DTX indicator for a MIMO layer corresponding to the ACK at block 2121, and base station processor 101 may retransmit only the transport data block corresponding to the NACK from the 1$^{st}$ MIMO TTI during the 2$^{nd}$ MIMO TTI as indicated by OT at block 2123. Moreover, base station processor 101 may maintain the MIMO rank of the 1$^{st}$ MIMO TTI (i.e., rank 2) during the 2$^{nd}$ MIMO TTI regardless of the rank suggested/requested by wireless terminal 200. In an alternative, base station processor 101 may allow a different rank (as shown, for example, in parentheses at rows 3, 7, and 15) provided that the different rank supports transmission/reception using the MIMO layers corresponding to the NACK. At rows 3, 7, 11, and 15, the first transport data block may be retransmitted over the first MIMO layer at block 2123, and at rows 2, 6, 10, and 14, the second transport data block may be retransmitted over the second MIMO layer at block 2123. As shown in rows 4, 8, 12, and 16 of FIG. 20C, base station processor 101 may retransmit all transport data blocks from the 1$^{st}$ MIMO TTI during the 2$^{nd}$ MIMO TTI at block 2111 because only NACKs are received for the first MIMO TTI. For example, first and second transport data blocks may be retransmitted over respective first and second MIMO layers during the 2$^{nd}$ MIMO TTI. As shown in rows 1, 5, 9, and 13 of FIG. 20C, there is no transmission/retransmission at block 1917 when all ACKs are received and base station 100 is buffer limited with respect to wireless terminal 200. When all ACKs are received and base station 100 is buffer limited with respect to wireless terminal 200, no downlink signaling or traffic is transmitted to wireless terminal 200 over downlink signaling and/or traffic channels (e.g., HS-SCCH and/or HS-DPSCH) until additional data is received in the transmit buffer for wireless terminal 200.

According to embodiments discussed above with respect to FIGS. 19 and 20A-C, the discontinuous transmission DTX indicator may be transmitted over a downlink signaling channel such as the HS-SCCH. For example, the DTX indicator may be transmitted as a currently unused bit pattern of a 5 bit modulation/rank field of the HS-SCCH, and/or as an unused bit pattern of a 6 bit transport block size field of the HS-SCCH.

Figure 21A:
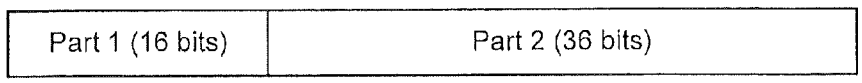
FIGS. 21A, 21B, 21C, and 21D are block diagrams illustrating downlink signaling structures according to some embodiments.

FIG. 21A is a block diagram illustrating a structure of an HS-SCCH slot for a four branch MIMO system (with 4 transmit and 4 receive antennas supporting up to 4 MIMO layers). Part 1 is used to carry information related to a channelization code set, precoding weight information, modulation scheme, and numbers of transport blocks preferred. Part 2 is used to carry information related to transport block size, HARQ process(es), and redundancy and constellation version. More particularly, FIG. 21A illustrates a Type 4 structure for HS-SCCH.

Figure 21B:

FIG. 21B is a block diagram illustrating HS-SCCH part 1 for four branch MIMO. For four branch MIMO, Part 1 of HS-SCCH includes 16 bits as shown in FIG. 21B regarding the following information: channelization code set CCS information (7 bits); modulation and rank information MR (5 bits); and precoding index PCI (4 bits). Rank information (RI) may be implicitly informed through the five bits of the modulation and rank information. An identity of wireless terminal 200 may also be signaled in Part 1 through a UE-specific mask applied to the Part 1 encoded sequence. Accordingly, only 16 bits may be needed to the complete information of Part 1.

Figure 21C:
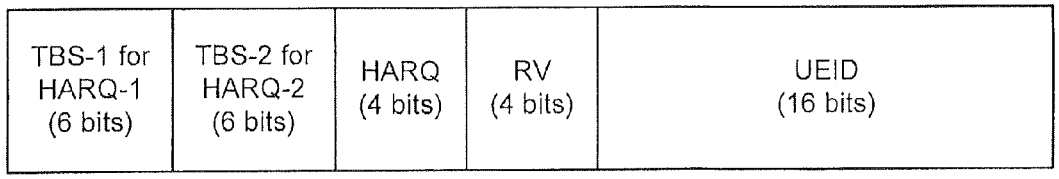

FIG. 21C is a block diagram illustrating HS-SCCH part 2 for four branch MIMO. For four branch MIMO, Part 2 of HS-SCCH may include 36 bits as shown in FIG. 21C regarding the following information: HARQ-1 Transport Block Size TBS-1 (6 bits); HARQ-2 Transport Block Size TBS-2 (6 bits); HARQ process (4 bits); Redundancy Version RV (4 bits) for the two streams/layers and/or HARQ processes; and wireless terminal identification UEID (16 bits). For a single stream/layer (rank 1) transmission using only one HARQ process, Part 2 of HS-SCCH may be reduced to 28 bits.

Figure 21D:
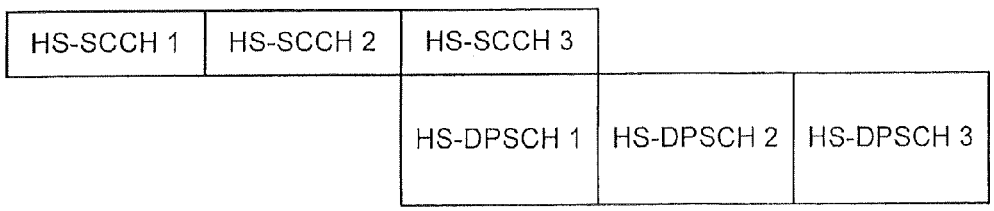

FIG. 21D is a block diagram illustrating a timing diagram for HS-PDSCH and HS-SCCH transmissions to wireless terminal 200. To allow wireless terminal 200 enough time to decode the part 1 portion of HS-SCCH (e.g., HS-SCCH 1) and then configure its receiver to receive the corresponding HS-DPSCH (e.g., HS-DPSCH 1), HS-SCCH 1 may be transmitted 2 slots in advance of the associated HS-DPSCH 1 subframe as shown in FIG. 21D.

According to some embodiments, the DTX indicator may be transmitted as a currently unused bit pattern of a 5 bit modulation/rank MR field of the HS-SCCH. FIG. 22 is a table illustrating 5 bit patterns used to communicate modulation and rank MR information in HS-SCCH Part 1 as shown in FIG. 21B. In particular, 5 bits may be used to identify 30 different combinations of modulations/ranks in a 4 layer MIMO system where two modulation schemes are mapped to the four layers, leaving 2 of the bit combinations (e.g., 11110 and 11111) unused. The first modulation (Modulation-1) may map to the first HARQ process (HARQ-1) and thus the first and fourth MIMO layers, and the second modulation (Modulation-2) may map to the second HARQ process (HARQ-2) and thus the second and third MIMO layers.

FIG. 23 is a table illustrating HS-SCCH combinations for modulation and transmission rank including use of the previously unused MR bit patterns (e.g., 11110 and 11111) to provide the DTX indicators discussed above with respect to FIGS. 19 and 20A-C. For example, the MR bit pattern 11110 may be used as a DTX indicator that the first HARQ process will not be used for retransmission during the second MIMO TTI, and more particularly, that the first and fourth MIMO layers will not be used for transmission/retransmission during the second MIMO TTI. Similarly, the MR bit pattern 11111 may be used as a DTX indicator that the second HARQ process will not be used for retransmission during the second MIMO TTI, and more particularly, that the second and third MIMO layers will not be used for transmission/retransmission during the second MIMO TTI. Because base station processor 101 may maintain the same transmit characteristics (e.g., including modulation, rank, and transport block size) from the first MIMO TTI during the second MIMO TTI used for retransmission, signaling of the rank and modulation for the retransmission is not required. Stated in other words, the DTX indicators may imply reuse of the modulation and rank information from the first MIMO TTI during the retransmission MIMO TTI.

According to some other embodiments, the DTX indicator may be transmitted as a currently unused bit pattern of the transmit block size TBS of HS-SCCH for the unused HARQ process. As discussed above with respect to FIG. 21C, HS-SCCH Part 2 includes a 6 bit TBS field (providing 64 bit combinations) for each HARQ process. Only 63 different transport block sizes are defined for a HARQ process, however, leaving one of the 64 bit combinations (e.g., 111111) unused. By setting TBS-1 of the HS-SCCH Part 2 slot for the retransmission MIMO TTI to 111111 as a DTX indicator for the first HARQ process, base station processor 101 may signal that the first HARQ process will not be used for retransmission during the second MIMO TTI, and more particularly, that the first and fourth MIMO layers will not be used for transmission/retransmission during the second MIMO TTI. By setting TBS-2 of the HS-SCCH Part 2 slot for the retransmission MIMO TTI to 111111 as a DTX indicator for the second HARQ process, base station processor 101 may signal that the second HARQ process will not be used for retransmission during the second MIMO TTI, and more particularly, that the second and third MIMO layers will not be used for transmission/retransmission during the second MIMO TTI.

Some embodiments may thus provide significant gain without significantly compromising delay (e.g., avoiding/reducing Radio Link Protocol retransmission).

For rank 2 and higher retransmissions when an ACK message is received for one HARQ process, when a NACK message is received for the other HARQ process, and when base station processor 101 is transmit buffer limited with respect to wireless terminal 200, base station processor 101 may thus transmit a DTX indicator to signal that no data is being transmitted/retransmitted using the transmission layer/layers corresponding to the ACK message. According to some embodiments discussed above with respect to FIGS. 21B and 23, a first unique (and previously unused) Modulation and Transmission Rank (modulation-rank or MR) bit pattern (e.g., 11110) may be used to indicate discontinuous transmission DTX for a transmission layer/layers corresponding to a first HARQ process, and a second unique (and previously unused) Modulation and Transmission Rank (modulation-rank or MR) bit pattern (e.g., 11111) may be used to indicate discontinuous transmission DTX for a transmission layer/layers corresponding to a second HARQ process. According to some other embodiments discussed above with respect to FIG. 21C, a unique and previously unused bit pattern (e.g., 111111) may be used for the respective transport block size TBS corresponding to the ACKed HARQ process to indicate discontinuous transmission DTX for a transmission layer/layers corresponding to the ACKed HARQ process. For example, the bit pattern 111111 may be used for TBS-1 (for transmission/reception layers 1 and/or 4) when the first HARQ process is ACKed and the second HARQ process is NACKed, and the bit pattern 111111 may be used for TBS-2 (for transmission/reception layers 2 and/or 3) when the first HARQ process is NACKed and the second HARQ process is ACKed.

A DTX indicator can thus be transmitted by base station processor 101 over a downlink signaling channel (HS-SCCH) to indicate discontinuous transmission over a first MIMO layer/layers corresponding to an ACK message when retransmitting over a second MIMO layer/layers corresponding to a NACK message when base station processor 101 is transmit buffer limited with respect to wireless terminal 200. In addition, base station processor 101 may transmit data indicators over the downlink signaling channel indicating new data transmission over the first MIMO layer/layers and indicating retransmission over the second MIMO layer/layers. More particularly, the data indicators may be provided in a redundancy version (RV) field of the downlink signaling channel (HS-SCCH).

In response to receiving such a DTX indicator and data indicators for a retransmission (indicating retransmission for a data block/blocks corresponding to one HARQ process and DTX for a data block/blocks corresponding to another HARQ process), embodiments discussed below may provide wireless terminal processor 201 operations to handle data received during the retransmission and to transmit feedback information related to the DTXed reception layer/layers.

In general, if a MIMO layer(s) is DTXed during a MIMO TTI (also referred to as a TTI and/or TFRE), then wireless terminal processor 201 may discard/disregard data/symbols associated with DTXed MIMO layer/layers for the TTI, and wireless terminal processor 201 may clear the soft buffer/buffers for the DTXed MIMO layer/layers for the TTI.

When wireless terminal 200 receives a DTX indicator for a first MIMO layer/layers (e.g., as a unique code in a downlink signaling MR field or in a downlink signaling TBS field), a data indicator for an initial transmission of the first MIMO layer/layers (e.g., in a downlink signaling RV field), and data indicator for a retransmission of a second MIMO layer/layers (e.g., in a downlink signaling RV field), then wireless terminal processor 201 may discard/disregard data/symbols received over the first MIMO layer/layers, and wireless terminal processor 201 may process retransmitted data received over the second MIMO layer/layers. More particularly, when wireless terminal processor 200 receives a DTX indicator and a data indicator for an initial transmission for a MIMO layer/layers, wireless terminal processor 201 may generate and transmit a default HARQ message for the MIMO layer/layers corresponding to the DTX, discard any received symbols/data for the DTXed MIMO layer/layers, and assume that the data for the DTXed MIMO layer/layers was successfully decoded in a previous TTI. According to some embodiments, the default HARQ message for a DTXed MIMO layer/layers may be an ACK message. According to some other embodiments, the default HARQ message for a DTXed MIMO layer/layers may be a NACK message. By discarding/disregarding symbols/data for a DTXed MIMO layer/layers, hardware resource utilization and/or processing overhead may be reduced.

According to some embodiments, the wireless terminal UE 200 discards data and flushes off the soft buffer for a DTXed codeword(s)/layer(s) and the wireless terminal UE 200 does not store data for a DTXed codeword(s)/layer(s) if a codeword(s)/layers(s) is DTXed. According to some embodiments:

1. Whenever a UE received 111111 along with a new data indicator (either explicit or implicit for example through RV indicator), then the UE should understand that the corresponding codeword is DTXed.
2. Whenever UE received 111111 along with new data indicator the UE should,
    a. Generate a positive acknowledgment (ACK) of the data in this HARQ process;
    b. Discard the received data;
    c. Assume the data had been successfully decoded.

As an alternative to operations 2.a. and 2.b., UE may: (2a) Generate a negative acknowledgment (NACK) of the data in this HARQ process, and (2b) discard the received data.

Figure 24:
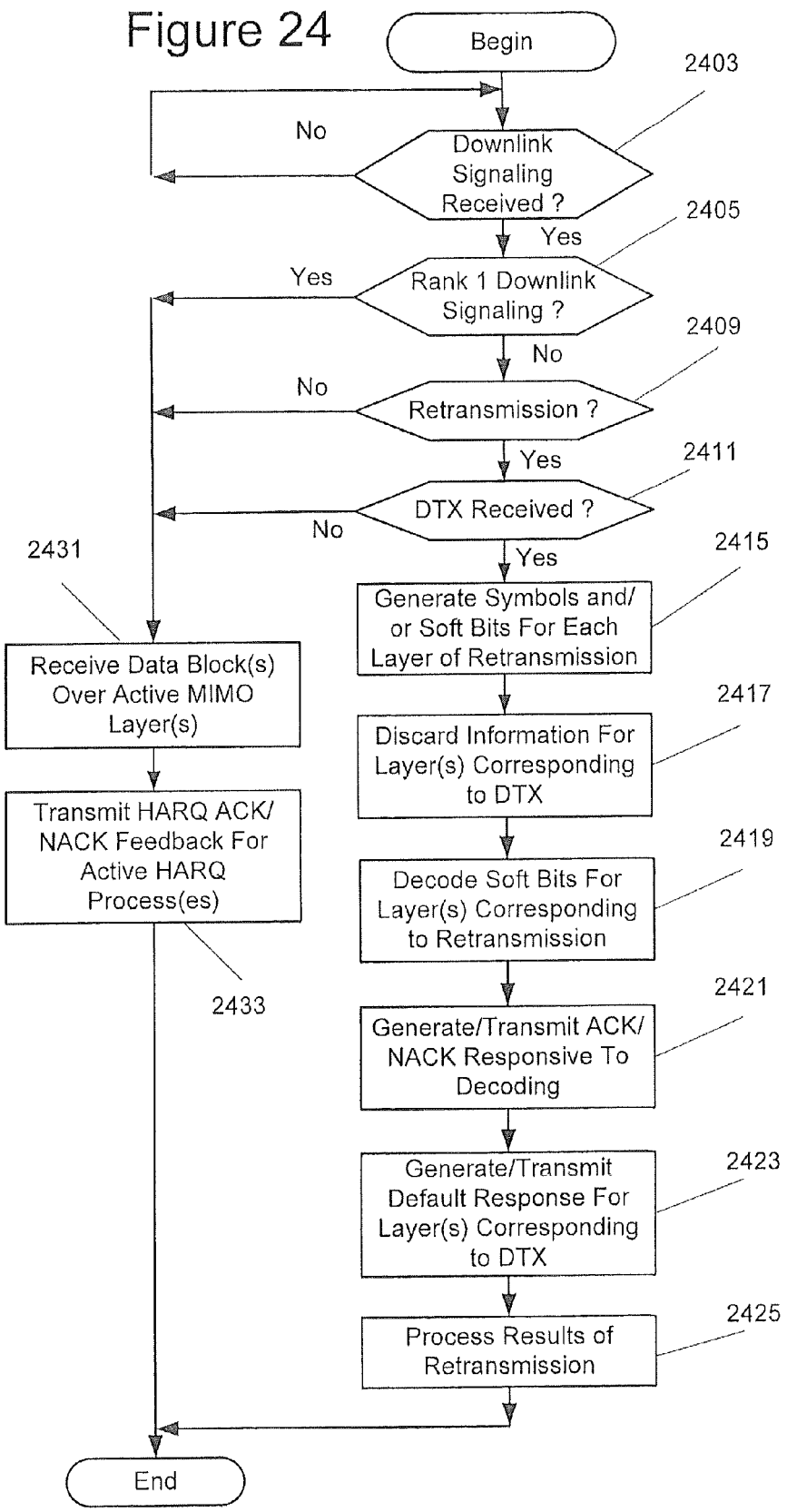
FIG. 24 is a flow chart illustrating operations of a wireless terminal processor according to some embodiments.

FIG. 24 is a flow chart illustrating operations of wireless terminal processor 201 according to some embodiments. At block 2403, processor 201 may receive downlink signaling (through antenna array 217 and transceiver 209) for a MIMO TTI over a downlink signaling channel (e.g., HS-SCCH). The downlink signaling may be provided, for example, according to a format illustrated in FIGS. 21A to 21D. If the downlink signaling indicates that the transmission for the MIMO TTI is a rank 1 MIMO transmission at block 2405, if the transmission is not a retransmission (indicated by a redundancy version RV field) at block 2408, and/or if no DTX indicator (e.g., included as a TBS code and/or as an MR code) is included for the MIMO TTI, wireless terminal processor 201 may receive a transport data block or blocks over a respective MIMO layer or layers during the MIMO TTI at block 2431. At block 2433, wireless terminal processor 201 may generate and transmit a HARQ ACK message for each active HARQ process for which all data is successfully decoded, and wireless terminal processor 201 may generate and transmit a HARQ NACK message for each active HARQ process for which all data is not successfully decoded.

For rank 2 and higher MIMO transmissions (at block 2405) where downlink signaling includes a new data indicator and a discontinuous transmission (DTX) indicator (at block 2411) for a first downlink multiple-input-multiple-output (MIMO) layer and a retransmission data indicator (at block 2409) for a second downlink MIMO layer, wireless terminal processor 201 may generate symbols (D) and/or soft bits (CW) for each MIMO layer of the MIMO TTI at block 2415. For a rank 2 MIMO TTI with the first layer DTXed, for example, wireless terminal processor 201 may generate symbols (D1') and/or soft bits (CW1') for a DTXed first MIMO layer associated with a first HARQ process, and processor 201 may generate symbols (D2') and soft bits (CW2') for a second MIMO layer associated with a second HARQ process of a retransmission.

According to some embodiments, the new data indicator for the first downlink MIMO layer and the retransmission data indicator for the second downlink MIMO layer may be included in a redundancy version (RV) field of the downlink signaling. According to some embodiments, the discontinuous transmission (DTX) indicator for the first downlink MIMO layer may be a unique transport block size code (e.g., 111111) in a transport block size field of the downlink signaling for the second MIMO layer. According to some other embodiments, the discontinuous transmission (DTX) indicator for a first downlink MIMO layer may be a unique modulation-rank code (e.g., 11110 or 11111) in a modulation and transmission rank (MR) field of the downlink signaling for the second MIMO layer.

At block 2417, wireless terminal processor 201 may discard/disregard information/data/symbols for the layer/layers corresponding to the DTX indicator. In the example of a rank 2 MIMO TTI with a DTX indicator for the first layer, processor 201 may discard/disregard the symbols for the first MIMO layer for the TTI without demodulating and/or decoding the symbols for the first MIMO layer. According to some other embodiments in a rank 2 MIMO TTI with a DTX indicator for the first layer, processor 201 may generate soft bits for the first MIMO layer for the TTI responsive to the symbols for the first MIMO layer and discard/disregard the soft bits for the first MIMO layer for the TTI without decoding the soft bits.

At block 2419, processor 201 may decode the soft bits for the layer/layers of the retransmission (that were not DTXed). In the example of a rank 2 MIMO TTI with a DTX indicator for the first layer, processor 201 may decode the soft bits for the second MIMO layer for the TTI. According to some embodiments, processor 201 may decode the soft bits for the second MIMO layer for the TTI responsive to the soft bits for the second MIMO layer for the TTI and responsive to soft bits for the second MIMO layer for a previous TTI (that were previously stored in soft buffer SB2).

At block 2421, processor 201 may generate/transmit an ACK or a NACK message for the layer/layers of the retransmission responsive to success/failure decoding the soft bits for the layer/layers of the retransmission. In the example of a rank 2 MIMO TTI with a DTX indicator for the first layer, processor 201 may generate/transmit (through transceiver 209 and antenna array 217) an acknowledgment (ACK) message for the second MIMO layer responsive to success decoding the soft bits for the second MIMO layer for the TTI, or processor 201 may generate/transmit a negative acknowledgment (NACK) message for the second MIMO layer responsive to failure decoding the soft bits for the second MIMO layer for the TTI.

At block 2423, processor 201 may generate/transmit a default response for the layer/layers corresponding to the DTX. According to some embodiments, the default response may be a HARQ ACK message for the layer/layers corresponding to the DTX, and according to some other embodiments, the default response may be a HARQ NACK message for the layer/layers corresponding to the DTX.

At block 2425, processor 201 may process the results of the retransmission. In the example of the rank 2 MIMO TTI, when decoding the soft bits for the second MIMO layer for the TTI at block 2419 results in successfully decoding the soft bits to generate hard bits for the second MIMO layer for the TTI, processor 201 generates/transmits an ACK message for the second MIMO layer at block 2421, and processor 201 combines the hard bits for the second MIMO layer for the TTI with hard bits for the first MIMO layer for a previous TTI to provide a received data stream at block 2425. In the example of the rank 2 MIMO TTI, when decoding the soft bits for the second MIMO layer for the TTI at block 2419 results in unsuccessfully decoding the soft bits, processor 201 generates/transmits a NACK message for the second MIMO layer at block 2421, and processor 201 saves the soft bits in a soft buffer (SB2) to be used decoding a subsequent retransmission over the second MIMO layer during a subsequent TTI at block 2425.

Embodiments discussed herein may thus define wireless terminal operations during a retransmission when one HARQ process is ACKed (indicating successful receipt of the transport data block/blocks received over the MIMO layer/layers associated with the ACK during the prior transmission) and anther HARQ process is NACKed (indicating unsuccessful receipt of the transport data block/blocks received over the MIMO layer/layers associated with the NACK during the prior transmission). While embodiments are discussed above for wireless terminal (receiver) operations in four transmit/receive antenna systems (supporting up to 4 layer MIMO) in HSDPA by way of example, embodiments may be implemented using higher or lower order antenna systems (e.g., two transmit/receive antenna systems supporting up to 2 layer MIMO, or eight transmit/receive antenna systems supporting up to 8 layer MIMO) and/or using other radio access technologies (e.g., LTE/LTE-A, WiMax, etc.). Moreover, while rank 2 retransmissions are discussed by way of example, operations of FIG. 24 may also apply to higher rank (e.g., rank 3 or 4) retransmissions where multiple HARQ processes are employed.

Figure 25:
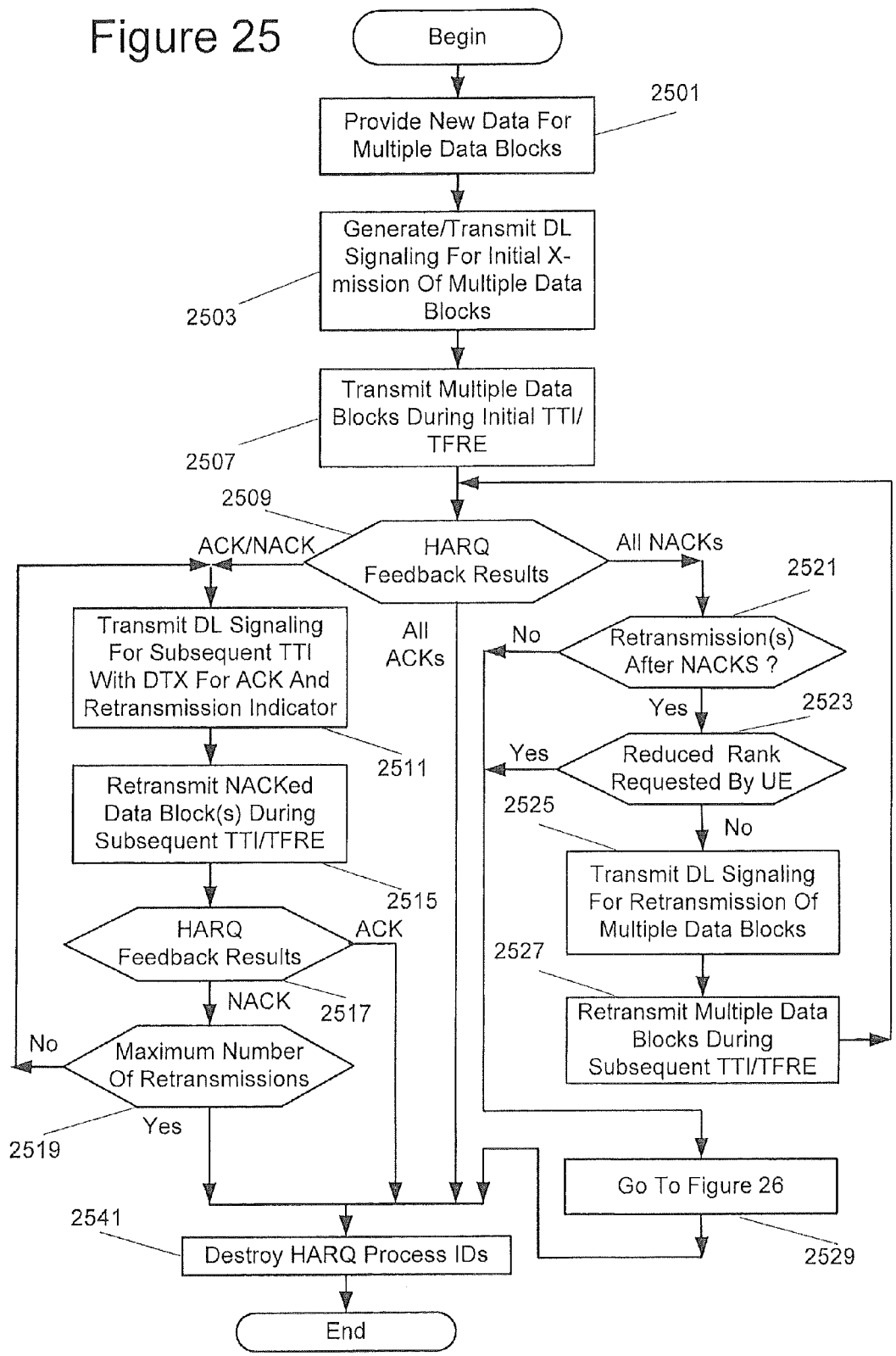
Figure 26:
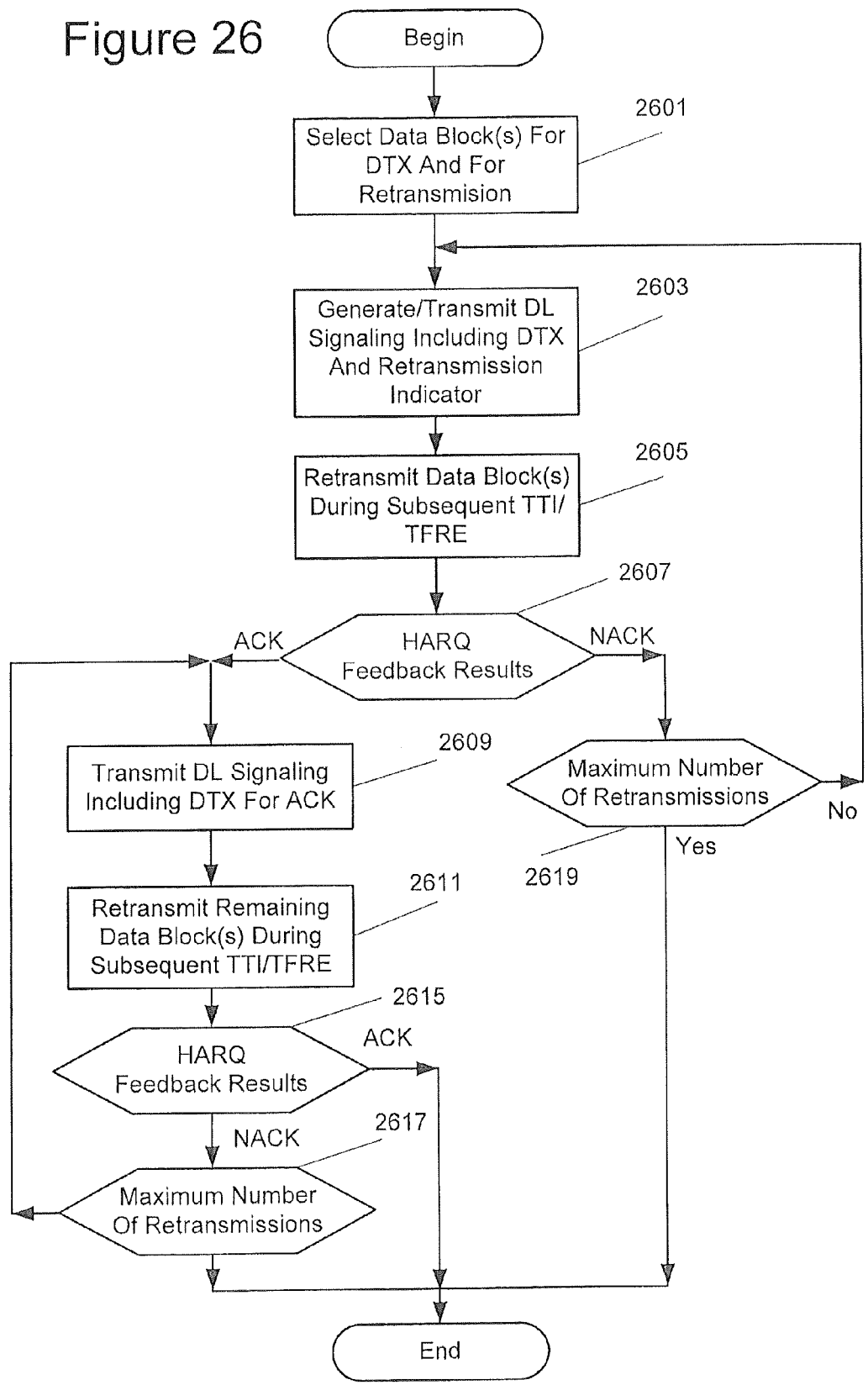

FIGS. 25, 26, and 27 are flow charts illustrating operations of base station processor 101 supporting HARQ feedback, retransmissions, HARQ process identifications, and discontinuous transmission (DTX) according to some embodiments. Operations of FIGS. 25, 26, and 27 may be applied for rank 2 and higher MIMO downlink DL transmissions using multiple HARQ processes/identifications (e.g., HARQ-1/H_a and HARQ-2/H_b). Discussion of rank 1 transmissions may be omitted because discontinuous transmission may not be applicable to rank 1 transmissions/retransmissions.

At block 2501 of FIG. 25, base station processor 101 may provide new data for two data blocks for a rank 2 transmission, three data blocks for a rank 3 transmission, or 4 data blocks for a rank 4 transmission. While examples of the following operations may be discussed for two data blocks for rank 2 transmission/retransmission, embodiments herein are also applicable for higher rank transmissions/retransmissions.

At block 2503, processor 101 may generate and transmit downlink DL signaling for an initial transmission of the first and second data blocks. Operations of generating downlink signaling are illustrated in FIG. 27. Responsive to the generation of downlink signaling for an initial transmission at blocks 2701 and 2702, processor 101 may select an unused HARQ process ID value (e.g., a value of one to eight) to be used as HARQ process ID H_a for HARQ-1 for the first MIMO layer at block 2703. At block 2707, processor 101 may select a HARQ process ID value H-b for HARQ-2 for the second MIMO layer. At block 2725, H_a and H_b may be provided for the DL signaling of block 2503 of FIG. 25.

At block 2507 of FIG. 25, processor 101 may transmit (through transceiver 109 and antenna array 117) the first and second data blocks over the respective first and second MIMO layers to a wireless terminal 200 during a first transmission time interval TTI/TFRE. Responsive to receiving acknowledgement (ACK) messages for both HARQ process IDs H_a and H_b at block 2509, HARQ process IDs H_a and H_b may be destroyed at block 2541 freeing the HARQ process ID values to be used for transmission of new data to wireless terminal 200. Receipt of ACK messages for both HARQ process IDs H_a and H_b indicates successful receipt and decoding of the first and second data blocks at wireless terminal 200 so that retransmission is not needed.

Responsive to receiving an ACK message for one of HARQ-1/H_a or HARQ-2/H_b and receiving a negative acknowledgment (NACK) message for another of HARQ-1/H_a or HARQ-2/H_b at block 2509 for the first TTI, processor 101 may generate and transmit downlink signaling to wireless terminal 200 for a second TTI used to retransmit the data block(s) corresponding to the NACK message at block 2511. More particularly, the downlink signaling may include a discontinuous transmission (DTX) indicator for the MIMO layer(s) corresponding to the ACK and a retransmission data indicator for the MIMO layer(s) corresponding to the NACK.

Operations of generating downlink signaling are illustrated in FIG. 27. Responsive to the generation of downlink signaling for a retransmission at blocks 2701 and 2702 and selecting discontinuous transmission at block 2709, processor 101 may reuse the HARQ process/ID for the HARQ process/ID corresponding to the NACK message at block 2717 or 2721, and processor 101 may generate a HARQ discontinuous transmission (DTX) process identification for the HARQ process corresponding to the ACK message at block 2719 or 2723. More particularly, the HARQ DTX process/ID may be generated as a function of the HARQ process/ID corresponding to the NACK. If the NACK is for HARQ-1/H_a so that DTX is applied to HARQ-2/H_b (corresponding to the ACK) at block 2715, H_a may be reused from the initial transmission at block 2717, and the HARQ-DTX ID may be selected as a function of H_a at block 2719. If the NACK is for HARQ-2 so that DTX is applied to HARQ-1/H_a (corresponding to the ACK) at block 2715, H_b may be reused from the initial transmission at block 2721, and the HARQ-DTX ID may be selected as a function of H_b at block 2723. At block 2725, the HARQ process/IDs may be provided for the DL signaling of block 2511 of FIG. 25.

At block 2515, processor 101 may retransmit the NACKed data block(s) over the respective MIMO layer(s) during a subsequent TTI/TFRE without retransmitting the data block(s) over the MIMO layer(s) corresponding to the ACK. Stated in other words, discontinuous transmission may be applied over the MIMO layer(s) corresponding to the ACK. If an ACK message is received responsive to the retransmission at block 2517, the HARQ process(es)/ID(s) for the data blocks of block 2501 may be destroyed at block 2541 thereby freeing the HARQ process ID values to be used for other data blocks. If a NACK message is received responsive to the retransmission at block 2517, operations of blocks 2511, 2515, and 2517 may be repeated until either an ACK is received at block 2517 or a maximum allowed number of retransmissions has occurred at block 2519. Operations of blocks 2511 and 2515 may be similar to and/or the same as those discussed above with respect blocks 2121 and 2123 of FIG. 19. If the maximum allowed number of retransmission has occurred at block 2519, the HARQ process ID for the data blocks of block 2501 may be destroyed at block 2541 thereby freeing the HARQ process ID values to be used for other data blocks.

Responsive to receiving NACK messages for both HARQ processes/IDs at block 2509 for the first TTI, processor 101 may determine at block 2521 if a subsequent retransmission of all NACKed data blocks is allowed. According to some embodiments, a predetermined number of retransmissions (e.g., two retransmissions) of all NACKed data blocks may be allowed at block 2521 (indicated by "yes") before invoking/using discontinuous transmission DTX. According to other embodiments, discontinuous transmission may be invoked at block 2521 (indicated by "no") after the initial transmission if NACK messages are received for both HARQ processes/IDs.

If one or more retransmissions of all NACKed data is permitted at block 2521, processor 101 may determine at block 2523 if wireless terminal 200 has requested a MIMO rank that is reduced relative to the MIMO rank of the initial transmission at block 2507. If wireless terminal continues to request a same or higher MIMO rank (indicating the same or improved channel quality) or if no further MIMO rank preference has been received from wireless terminal 200 since the initial transmission at block 2507, processor 101 may retransmit all NACKed data blocks at blocks 2525 and 2527 a predetermined number of times until an ACK/ACKs are received at block 2509, until a maximum allowed number of retransmissions of all data occurs at block 2521, or until wireless terminal 200 requests a lower MIMO rank (indicating a reduction in channel quality) at block 2523.

For each retransmission of all NACKed data (without discontinuous transmission), processor 101 may generate and transmit downlink signaling to wireless terminal 200 for a subsequent TTI used to retransmit the data blocks corresponding to the NACK messages at block 2525 without discontinuous transmission. Operations of generating downlink signaling are illustrated in FIG. 27. Responsive to the generation of downlink signaling for a retransmission at blocks 2701 and 2702 without discontinuous transmission at block 2709, processor 101 may reuse HARQ process IDs/values for all HARQ processes/IDs (e.g., HARQ-1/H_a and HARQ-2/H_b) corresponding to the NACK messages at block 2711. More particularly, values of H_a and H_b may be reused from the initial transmission at block 2711. At block 2725, the HARQ process ID values may be provided for the DL signaling of block 2525 of FIG. 25. At block 2527 of FIG. 25, processor 101 may retransmit (through transceiver 109 and antenna array 117) all NACKed data blocks over the respective MIMO layers to wireless terminal 200 during a subsequent transmission time interval TTI.

Responsive to retransmitting all data blocks a maximum number of times at block 2521 and/or responsive to receiving a preference from wireless terminal 200 for a second MIMO rank less than the first rank at block 2523, processor 101 may proceed to operations of FIG. 26 as indicated at block 2529 of FIG. 25. If the initial transmission of block 2507 was a rank 4 transmission with first and fourth data blocks transmitted over respective first and fourth MIMO layers mapped to HARQ-1/H_a and with second and third data blocks transmitted over respective second and third MIMO layers mapped to HARQ-2/H_b, a reduced rank would be rank 1, 2, or 3. If the initial transmission of block 2507 was a rank 3 transmission with a first data block transmitted over the first MIMO layer mapped to HARQ-1/H_a and with second and third data blocks transmitted over respective second and third MIMO layers mapped to HARQ-2/H_b, a reduced rank would be rank 1 or 2. If the initial transmission of block 2507 was a rank 2 transmission with a first data block transmitted over the first MIMO layer mapped to HARQ-1/H_a and with a second data block transmitted over the second MIMO layer mapped to HARQ-2/H_b, a reduced rank would be rank 1.

At block 2601, processor 101 may select a data block(s) and MIMO layer(s) corresponding to one HARQ process/ID for discontinuous transmission, and processor 101 may select a data block(s) and MIMO layer(s) corresponding to the other HARQ process/ID for retransmission. According to some embodiments, processor 101 may select data block(s) and MIMO layer(s) corresponding to the HARQ process/ID providing the greater spectral efficiency to provide a higher data rate. With rank 3 transmission, for example, processor 101 may select data blocks of the second and third MIMO layers corresponding to HARQ-2/H_b to provide an increased data rate relative to the data block of the first MIMO layer corresponding to HARQ-1/H_a. With rank two or rank 4 transmissions with the same number of data blocks mapped to each HARQ process/ID, processor 101 may determine spectral efficiency based on transport block sizes used for the different HARQ processes. According to other embodiments, processor 101 may select data block(s) and MIMO layer(s) corresponding to the HARQ process/ID providing the lesser spectral efficiency to provide a higher likelihood of successful reception/decoding at wireless terminal 200.

At block 2603, processor 101 may generate and transmit (through transceiver 109 and antenna array 117) downlink signaling to wireless terminal 200 for a subsequent TTI/TFRE wherein the downlink signaling for the second TTI/TFRE includes a retransmission data indicator for the data block(s) and MIMO layer(s) corresponding to the selected HARQ process and a discontinuous transmission (DTX) indicator for the data block(s) and MIMO layer(s) corresponding to the non-selected HARQ process/ID. The downlink signaling may also include a retransmission indicator for the data block(s) and MIMO layer(s) corresponding to the selected HARQ process/ID. Operations of generating downlink signaling may be the same as discussed above with respect to blocks 2715, 2717, 2719, 2721, 2723, and 2725 of FIG. 27.

At block 2605, processor 101 may retransmit (through transceiver 109 and antenna array 117) the selected data block(s) over the respective MIMO layer(s) to wireless terminal 200 during the second/subsequent TTI/TFRE without retransmitting the non-selected data block(s) corresponding to the non-selected HARQ process/ID. Even though wireless terminal 200 may have requested a reduced MIMO rank, the retransmission may maintain the MIMO rank of the initial transmission to maintain a same mapping of the retransmitted data to respective soft buffers of wireless terminal 200.

If an ACK message is received for the retransmission (of block 2605) at block 2607, processor 101 may transmit (through transceiver 109 and antenna array 117) downlink signaling to wireless terminal 200 for a subsequent TTI/TFRE wherein the downlink signaling for the subsequent TTI/TFRE includes a discontinuous transmission (DTX) indicator for the previously selected MIMO layer(s) and data block(s) corresponding to the previously selected HARQ process/ID and a retransmission data indicator for the previously non-selected MIMO layer(s) and data block(s) corresponding to the previously non-selected HARQ process/ID. Downlink signaling of block 2609 may be generated as discussed above with respect to blocks 2715, 2717, 2719, 2721, 2723, and 2725.

At block 2611, processor 101 may retransmit (through transceiver 109 and antenna array 117) the previously non-selected data block(s) over the previously non-selected MIMO layer corresponding to the previously non-selected HARQ process to wireless terminal 200 during the subsequent TTI/TFRE in accordance with the MIMO rank of the initial transmission. If an ACK message is received at block 2615 responsive to the retransmission of block 2611, the HARQ process ID(s) for the data blocks of blocks 2605 and 2611 may be destroyed at block 2541 (of FIG. 25) thereby freeing the HARQ process ID values to be used for other data blocks. If a NACK message is received responsive to the retransmission at block 2615, operations of blocks 2609, 2611, and 2615 may be repeated until either an ACK is received at block 2615 or a maximum allowed number of retransmissions has occurred at block 2617. Operations of blocks 2609 and 2611 are similar to and/or the same as those discussed above with respect to block 2511 and 2515 of FIG. 25 and/or blocks 2121 and 2123 of FIG. 19. If the maximum allowed number of retransmission has occurred at block 2617, the HARQ process ID(s) for the data blocks of blocks 2605 and 2611 may be destroyed at block 2541 (of FIG. 25) thereby freeing the HARQ process ID values to be used for other data blocks.

If NACKs are received for both HARQ processes/IDs at block 2509 of FIG. 25, processor 101 may select the data block(s) and MIMO layer(s) corresponding to one of the HARQ processes/IDs for initial retransmission. Retransmission of the non-selected data block(s) and MIMO layer(s) corresponding to the other HARQ process/ID may thus be delayed until an ACK is received for the selected data block(s). By reducing the data selected for retransmission when all NACKs are received for the initial transmission, a likelihood of success for the retransmission may be increased by reducing multi-antenna interference.

If a NACK message is received for the retransmission (of block 2605) at block 2607, processor 101 may repeat operations of blocks 2603, 2605, and 2607 either until an ACK message is received for the retransmission at block 2607 or until a maximum number of retransmissions has occurred at block 2619. If the maximum allowed number of retransmission has occurred at block 2619, the HARQ process ID(s) may be destroyed at block 2541 (of FIG. 25) thereby freeing the HARQ process ID values to be used for other data blocks.

Embodiments discussed herein may thus define use of discontinuous transmission DTX. If base station (nodeB) processor 101 initially transmits first through fourth data blocks over respective first through fourth MIMO layers during a rank 4 TTI/TFRE at block 2507 of FIG. 25, and if NACKs are received for HARQ-1/H_a (mapped to the first and fourth MIMO layers) and for HARQ-2/H_b (mapped to the second and third MIMO layers) at block 2509 of FIG. 25, then base station processor 101 may retransmit all four data blocks up to a maximum number of times at blocks 2521, 2523, 2525, and 2527 until either an ACK is received at block 2509, a maximum allowed number of retransmissions has occurred at block 2521, or a reduced MIMO rank is requested by wireless terminal 200 at block 2523. If a maximum allowed number of retransmissions (e.g., two retransmissions for a total of three transmissions/retransmissions) occurs without receiving an ACK for either HARQ-1/H_a or HARQ-2/H_b, HARQ gain may not be useful (as the HARQ gain may be reduced with increased numbers of retransmissions). Accordingly, discontinuous transmission DTX for one of the HARQ processes/IDs may be implemented as discussed above with respect to FIG. 26.

For example, HARQ-1/H_a (corresponding to the first and fourth data blocks) may be selected for discontinuous transmission DTX at block 2601 of FIG. 26, or HARQ-2/H_b (corresponding to the second and third data blocks) may be selected for discontinuous transmission DTX at block 2601 of FIG. 26. If HARQ-1/H_a is selected for discontinuous transmission, downlink signaling may include a DTX indicator for HARQ-1/H_a and a retransmission indicator for HARQ-2/H_b at block 2603, and at block 2605, the second and third data blocks may be retransmitted over the second and third MIMO layers using rank 4 without transmitting over the first and fourth MIMO layers. If HARQ-2/H_b is selected for discontinuous transmission, downlink signaling may include a DTX indicator for HARQ-2/H_b and a retransmission indicator for HARQ-1/H_a at block 2603, and at block 2605, the first and fourth data blocks may be retransmitted over the first and fourth MIMO layers using rank 4 without transmitting over the second and third MIMO layers. By retransmitting data blocks of only one HARQ process/ID, multi-antenna interference may be reduced thereby increasing signal quality of the retransmitted data and increasing a probability of successful receipt/decoding at wireless terminal 200.

Discontinuous transmission may thus be used when a NACK is received for any one or more of the HARQ processes/IDs. According to some embodiments, discontinuous transmission may be used when an ACK is received for a HARQ process/ID and a NACK is received for another HARQ process/ID as shown by the ACK/NACK output of block 2509 of FIG. 25. According to some embodiments, discontinuous transmission may be used when NACKS are received for all HARQ processes/IDs as shown by the all NACKs output of block 2509 of FIG. 25. If all NACKs are received, a number of retransmissions of all NACKed data blocks may be allowed at blocks 2521, 2523, 2525, 2527, and 2509 of FIG. 25 before using discontinuous transmission of FIG. 26. If all NACKs are received at block 2509 according to some other embodiments, processor 101 may use discontinuous transmission of FIG. 26 for a next retransmission omitting blocks 2521, 2523, 2525, and 2527 of FIG. 25.

If base station (node B) processor 101 initially transmits first through fourth data blocks over respective first through fourth MIMO layers during a rank 4 TTI/TFRE at block 2507 of FIG. 25, and if NACKs are received for HARQ-1/H_a and for HARQ-2/H_b at block 2509 of FIG. 25, then base station processor 101 may retransmit all four data blocks up to a maximum number of times at blocks 2521, 2523, 2525, and 2527 as discussed above, as long as wireless terminal 200 does not request a reduced MIMO rank (e.g., MIMO rank 1, 2, or 3). If wireless terminal 200 requests a reduced MIMO rank (indicating reduced downlink channel quality) at block 2523, base station processor 101 may use discontinuous transmission of FIG. 26. According to some embodiments, discontinuous transmission may be used for a retransmission responsive to any or all NACKs (e.g., if an ACK is received for one HARQ process/ID and a NACK is received for the other HARQ process/ID, or if NACKs are received for all HARQ processes/IDs) any time wireless terminal 200 requests a reduced MIMO rank. Discontinuous transmission may thus be used if the wireless terminal currently preferred MIMO rank is less than the MIMO rank of the initial transmission.

Base station (node B) processor 101 may initially transmit multiple data blocks using multiple HARQ processes/IDs, for example, using MIMO rank 2 (transmitting first and second data blocks over first and second MIMO layers), MIMO rank 3 (transmitting first, second, and third data blocks over first, second, and third MIMO layers), or MIMO rank 4 (transmitting first, second, third, and fourth data blocks over first, second, third, and fourth MIMO layers). As discussed above with respect to blocks 2107, 2121, and 2123 of FIG. 19, if base station processor 101 is transmit buffer limited with respect to wireless terminal 200 (e.g., there is no/insufficient data for a new data block for transmission to wireless terminal 200), discontinuous transmission may be used for the MIMO layer(s) corresponding to the ACK during the retransmission of data blocks corresponding to the NACK.

According to some embodiments, a HARQ process identification may be provided for a DTX codeword. In a four branch MIMO system (including four transmit and four receive antennas supporting up to four MIMO layers), HARQ process identifications may be defined for each transport data block. For example, first HARQ process identification H_a may be provided for first HARQ process HARQ-1 that is mapped to the first MIMO layer for ranks 1, 2, and 3 and to first and fourth MIMO layers for rank 4, and second HARQ process identification H_b may be provided for second HARQ process HARQ-2 that is mapped to the second MIMO layer for rank 2 and to the second and third MIMO layers for ranks 3 and 4. Moreover, values of HARQ process identifications H_a and H_b may be related according to the following equation:

$$H\_b = (H\_a + N/2) \bmod(N),$$

where N is a number of HARQ processes that may be configured for wireless terminal 200 by higher layers of base station 100 or radio network controller. Because H_b may be determined from H_a, only information relating to H_a may need to be transmitted from base station 100 to wireless terminal 200. Wireless terminal 200 may thus receive H_a and then derive H_b according to the formula discussed above.

If discontinuous transmission is used for a retransmission, the HARQ process identification for the DTXed HARQ process may be determined as follows. If discontinuous transmission is applied to HARQ-2 (e.g., if NACK was received for HARQ-1 and ACK was received for HARQ-2, or if HARQ-2 is selected for DTX after receiving both NACKs), then the HARQ process ID value for the DTX may be provided as:

$$HARQ\_DTX = (H\_a_{old} + N/2) \bmod(N),$$

where $H\_a_{old}$ is the HARQ process ID value of HARQ-1 that was NACKed in the previous transmission. Stated in other words, if DTX is applied to HARQ-2 during a retransmission (with two HARQ processes and 8 HARQ process ID values), the HARQ_DTX identification for the retransmission may be derived from $H\_a_{old}$ according to the following table (where $H\_a_{old}$ is the HARQ process ID of HARQ-1 during the previous transmission):

| $H\_a_{old}$ | HARQ_DTX |
|---|---|
| 1 | 5 |
| 2 | 6 |
| 3 | 7 |

-continued

| H_a$_{old}$ | HARQ_DTX |
|---|---|
| 4 | 8 |
| 5 | 1 |
| 6 | 2 |
| 7 | 3 |
| 8 | 4 |

If discontinuous transmission is applied to HARQ-1 (e.g., if ACK was received for HARQ-1 and NACK was received for HARQ-2, or if HARQ-1 is selected for DTX after receiving both NACKs), then the HARQ process ID for the DTX may be provided as:

$$HARQ\_DTX = H\_b_{old} + K*N/2,$$

where H_b$_{old}$ is the HARQ process ID of HARQ-2 that was NACKed in the previous transmission, where K=−1 if H_b$_{old}$>N/2, and where K=+1 if H_b$_{old}$≤N/2. Stated in other words, if DTX is applied to HARQ-1 during a retransmission (with two HARQ processes and 8 HARQ process ID values), the HARQ_DTX identification for the retransmission may be derived from H_b$_{old}$ according to the following table (where H_b$_{old}$ is the HARQ process ID of HARQ-2 during the previous transmission):

| H_b$_{old}$ | HARQ_DTX |
|---|---|
| 1 | 5 |
| 2 | 6 |
| 3 | 7 |
| 4 | 8 |
| 5 | 1 |
| 6 | 2 |
| 7 | 3 |
| 8 | 4 |

These HARQ process identifications for HARQ_DTX may be unique and may be the only solution to implement a DTX codeword and/or identification.

According to some embodiments, when a DTX codeword/indicator is sent to wireless terminal 200, wireless terminal 200 may generate an ACK for the DTX codeword. In this case, base station processor 101 should expect an ACK response for the DTX HARQ process, and base station processor 101 may destroy the HARQ process/ID for the DTX codeword. If DTX is required for another retransmission, the HARQ_DTX ID may be regenerated as discussed above. According to other embodiments, when a DTX codeword/indicator is sent to wireless terminal 200, wireless terminal 200 may generate a NACK for the DTX codeword. In this case, base station processor 101 should also assume that an ACK is received and destroy the HARQ process/ID for the DTX codeword. As before, if DTX is required for another retransmission, the HARQ_DTX ID may be regenerated as discussed above.

According to some embodiments, a DTX codeword/ID can be used when one of the codewords/HARQ processes fails (i.e., generates an ACK) and another of the codewords/HARQ processes passes (i.e., generates a NACK). According to some embodiments, a DTX codeword/ID can be used when both codewords/HARQ processes fail (i.e., generate NACKs). According to some embodiments, a DTX codeword/ID can be used when both codewords/HARQ processes fail (i.e., generate NACKs) for multiple transmission/retransmissions. According to some embodiments, a DTX codeword can be used when a current wireless terminal preferred/requested MIMO rank is less than the MIMO rank of the initial/previous transmission.

According to some embodiments, when using discontinuous transmission for MIMO layers corresponding to one HARQ process, a HARQ process ID for the discontinuous transmission may be determined as a function of the previous HARQ process ID for the other HARQ process. If discontinuous transmission is applied to HARQ-1, for example, the HARQ process ID for the discontinuous transmission may be determined according to the following formula:

$$HARQ\_DTX = H\_b_{old} + K*N/2,$$

where H_b$_{old}$ is the HARQ process ID of HARQ-2 from the initial/previous transmission, where K=−1 if H_b$_{old}$>N/2, and where K=+1 if H_b$_{old}$≤N/2. If discontinuous transmission is applied to HARQ-2, the HARQ process ID for the discontinuous transmission may be determined according to the following formula:

$$HARQ\_DTX = (H\_a_{old} + N/2) \bmod(N),$$

where H_a$_{old}$ is the HARQ process ID of HARQ-1 from the initial/previous transmission.

According to some embodiments, when a discontinuous transmission is applied to codeword and/or HARQ process, base station processor 101 may assume that an ACK is received for the discontinuous transmission and destroy the HARQ process/ID irrespective of the HARQ feedback information actually received from wireless terminal 200 over the feedback channel.

The following numbered embodiments are provided by way of example without limiting the scope of the present application.

Embodiment 1. A method of operating a node (100) of a radio access network, the method comprising: transmitting (2507) first and second data blocks from the radio access network over respective first and second multiple-input-multiple-output (MIMO) layers of a MIMO wireless channel to a wireless terminal (200) during a first transmission time interval (TTI); responsive to receiving an acknowledgment (ACK) message for the first data block and a negative acknowledgment (NACK) message for the second data block, transmitting (2511) downlink signaling for a second TTI from the radio access network to the wireless terminal (200) wherein the downlink signaling includes a discontinuous transmission (DTX) indicator for the first MIMO layer and a retransmission data indicator for the second MIMO layer; and responsive to receiving the acknowledgment (ACK) message for the first data block and the negative acknowledgment (NACK) message for the second data block, retransmitting (2515) the second data block from the radio access network over the second MIMO layer to the wireless terminal (200) during a second TTI.

Embodiment 2. The method according to Embodiment 1 wherein retransmitting the second data block during the second TTI comprises retransmitting the second data block without transmitting data over the first MIMO layer during the second TTI.

Embodiment 3. The method according to any one of Embodiments 1 or 2 further comprising: before transmitting the first and second data blocks during the first transmission time interval, selecting (2703, 2707) first and second HARQ process identifications for the first and second MIMO layers; and before transmitting the downlink signaling for the second TTI, generating (2719, 2723) a HARQ-DTX process identification for the first MIMO layer as a function of the second HARQ process identification for the second MIMO layer.

Embodiment 4. A method of operating a node (100) of a radio access network, the method comprising: transmitting (2507) first and second data blocks from the radio access network over respective first and second multiple-input-multiple-output (MIMO) layers of a MIMO wireless channel to a wireless terminal (200) during a first transmission time interval (TTI); responsive to receiving first and second negative acknowledgment (NACK) messages for the first and second data blocks, transmitting (2603) downlink signaling from the radio access network to the wireless terminal (200) for a second TTI wherein the downlink signaling for the second TTI includes a discontinuous transmission (DTX) indicator for the first MIMO layer and a retransmission data indicator for the second MIMO layer; and responsive to receiving the first and second negative acknowledgment (NACK) messages for the first and second data blocks, retransmitting (2605) the second data block from the radio access network over the second MIMO layer to the wireless terminal (200) during the second TTI.

Embodiment 5. The method according to Embodiment 4 wherein retransmitting the second data block during the second TTI comprises retransmitting the second data block without transmitting data over the first MIMO layer during the second TTI.

Embodiment 6. The method according to any one of Embodiments 4 or 5 further comprising: responsive to receiving an acknowledgment (ACK) message for the retransmission of the second data block during the second TTI, transmitting (2609) downlink signaling from the radio access network to the wireless terminal (200) for a third TTI wherein the downlink signaling for the third TTI includes a discontinuous transmission (DTX) indicator for the second MIMO layer and a retransmission data indicator for the first MIMO layer; and responsive to receiving the acknowledgment (ACK) message for the retransmission of the second data block during the second TTI, retransmitting (2611) the first data block from the radio access network over the first MIMO layer to the wireless terminal (200) during the third TTI.

Embodiment 7. The method according to any one of Embodiments 4-6 further comprising: before transmitting the first and second data blocks during the first transmission time interval, selecting (2703, 2707) first and second HARQ process identifications for the first and second MIMO layers; and before transmitting the downlink signaling for the second TTI, generating (2719, 2723) a HARQ-DTX process identification for the first MIMO layer as a function of the second HARQ process identification for the second MIMO layer.

Embodiment 8. A method of operating a node (100) of a radio access network, the method comprising: transmitting (2507) first and second data blocks from the radio access network over respective first and second multiple-input-multiple-output (MIMO) layers of a MIMO wireless channel to a wireless terminal (200) during a first transmission time interval in accordance with a first MIMO rank; responsive to receiving a negative acknowledgment (NACK) message for the first data block and receiving a preference for a second MIMO rank less than the first rank, transmitting (2603) downlink signaling from the radio access network to the wireless terminal (200) for a second TTI wherein the downlink signaling for the second TTI includes a retransmission data indicator for the first MIMO layer and a discontinuous transmission (DTX) indicator for the second MIMO layer; and responsive to receiving the negative acknowledgment (NACK) message for the first data block and receiving the preference for a second MIMO rank less than the first rank, retransmitting (2605) the first data block from the radio access network over the first MIMO layer to the wireless terminal (200) during the second TTI in accordance with the first MIMO rank.

Embodiment 9. The method of Embodiment 8 wherein transmitting the downlink signaling comprises transmitting the downlink signaling responsive to receiving the negative acknowledgment (NACK) message for the first data block, receiving a negative acknowledgment (NACK) for the second data block, and receiving the preference for the second MIMO rank less than the first rank.

Embodiment 10. The method of embodiment 9 further comprising: responsive to receiving an acknowledgment (ACK) message for the retransmission of the first data block during the second TTI, transmitting (2609) downlink signaling from the radio access network to the wireless terminal (200) for a third TTI wherein the downlink signaling for the third TTI includes a discontinuous transmission (DTX) indicator for the first MIMO layer and a retransmission data indicator for the second MIMO layer; and responsive to receiving the acknowledgment (ACK) message for the retransmission of the first data block during the second TTI, retransmitting (2611) the second data block from the radio access network over the second MIMO layer to the wireless terminal (200) during the third TTI in accordance with the first MIMO rank.

Embodiment 11. The method according to any one of Embodiments 8-10 further comprising: before transmitting the first and second data blocks during the first transmission time interval, selecting (2703, 2707) first and second HARQ process identifications for the first and second MIMO layers; and before transmitting the downlink signaling for the second TTI, generating (2719, 2723) a HARQ-DTX process identification for the second MIMO layer as a function of the first HARQ process identification for the first MIMO layer.

Embodiment 12. A method of operating a node (100) of a radio access network, the method comprising: selecting (2703, 2707) first and second HARQ process identifications for first and second MIMO layers; responsive to selecting the first and second HARQ process identifications, transmitting (2503) downlink signaling from the radio access network to the wireless terminal (200) for a first transmission time interval (TTI); transmitting (2507) first and second data blocks from the radio access network over respective first and second multiple-input-multiple-output (MIMO) layers of a MIMO wireless channel to a wireless terminal (200) during the first TTI; responsive to receiving a negative acknowledgment (NACK) message for the first data block, generating (2719, 2723) a HARQ discontinuous transmission (DTX) process identification for the second MIMO layer as a function of the first HARQ process identification for the first MIMO layer; responsive to generating the HARQ-DTX process identification and receiving the NACK message for the first data block, transmitting (2603) downlink signaling from the radio access network to the wireless terminal (200) for a second TTI wherein the downlink signaling for the second TTI includes a retransmission data indicator for the first MIMO layer and a discontinuous transmission (DTX) indicator for the second MIMO layer; and responsive to generating the HARQ-DTX process identification and receiving the NACK message for the first data block, retransmitting (2605) the first data block from the radio access network over the first MIMO layer to the wireless terminal (200) during the second TTI.

Acronyms/Abbreviations:
Tx Transmitter
HSDPA High Speed Downlink Packet Access
HARQ Hybrid Automatic Repeat Request
CRC Cyclic Redundancy Check NAK/NACK Non-Acknowledgment or Negative-Acknowledgment
ACK Acknowledgment
CC Chase Combining
IR Incremental Redundancy
UE User Equipment or Wireless Terminal
CQI Channel Quality Information
MMSE Minimum Mean Square Error
TTI Transmit Time Interval
PCI Precoding Control Index
DTX Discontinuous Transmission In the above-description of various embodiments, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of present inventive concepts. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from principles of present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the appended claims, and shall not be restricted or limited by the foregoing detailed description.

That which is claimed is:

1. A method of operating a node of a radio access network, the method comprising:
    selecting first and second HARQ process identifications for first and second multiple-input-multiple-output (MIMO) layers of a MIMO wireless channel;
    transmitting first and second data blocks from the radio access network respectively over the first and second MIMO layers of the MIMO wireless channel to a wireless terminal during a first transmission time interval (TTI);
    responsive to receiving a negative acknowledgment (NACK) message for the second data block, generating a HARQ discontinuous transmission (HARQ-DTX) process identification for the first MIMO layer as a function of the second HARQ process identification for the second MIMO layer;
    responsive to receiving the NACK message for the second data block, transmitting downlink signaling for a second TTI from the radio access network to the wireless terminal wherein the downlink signaling includes a discontinuous transmission (DTX) indicator for the first MIMO layer and a retransmission data indicator for the second MIMO layer, wherein the downlink signaling for the second TTI including the DTX indicator and the retransmission data indicator is transmitted using a downlink signaling channel; and
    responsive to receiving the NACK message for the second data block, retransmitting the second data block from the radio access network over the second MIMO layer to the wireless terminal during the second TTI, wherein the second data block is retransmitted over the second MIMO layer using a downlink traffic channel.

2. The method of claim 1 wherein transmitting the downlink signaling comprises transmitting the downlink signaling responsive to receiving an acknowledgment (ACK) message for the first data block and responsive to receiving the NACK message for the second data block, and wherein retransmitting the second data block comprises retransmitting the second data block responsive to receiving the ACK message for the first data block and responsive to receiving the NACK message for the second data block.

3. The method of claim 1 wherein retransmitting the second data block during the second TTI comprises retransmitting the second data block without transmitting data over the first MIMO layer during the second TTI.

4. The method of claim 1:
    wherein transmitting the first and second data blocks during the first transmission time interval (TTI) comprises transmitting the first and the second data blocks after selecting the first and second HARQ process identifications for the first and second MIMO layers; and
    wherein transmitting the downlink signaling for the second, TTI comprises transmitting the downlink signaling for the second TTI after generating the HARQ-DTX process identification for the first MIMO layer.

5. The method according to claim 1 further comprising:
    responsive to selecting the first and second HARQ process identifications, transmitting downlink signaling from the radio access network to the wireless terminal for the first transmission time interval (TTI);
    wherein transmitting the downlink signaling for the second TTI comprises transmitting the downlink signaling for the second TTI responsive to generating the HARQ-DTX process identification and responsive to receiving the NACK message for the second data block, and
    wherein retransmitting the second data block comprises retransmitting the second data block responsive to generating the HARQ-DTX process identification and responsive to receiving the NACK message for the second data block.

6. The method of claim 1 wherein the downlink signaling channel is a High Speed Shared Control Channel (HS-SCCH), and wherein the downlink traffic channel is a High Speed Physical Downlink Shared Channel (HS-PDSCH).

7. A method of operating a node of a radio access network, the method comprising:
    transmitting first and second data blocks from the radio access network over respective first and second multiple-input-multiple-output (MIMO) layers of a MIMO wireless channel to a wireless terminal during a first transmission time interval (TTI);
    responsive to receiving a negative acknowledgment (NACK) message for the first data block and a NACK message for the second data block, transmitting downlink signaling for a second TTI from the radio access network to the wireless terminal wherein the downlink signaling includes a discontinuous transmission (DTX) indicator for the first MIMO layer and a retransmission data indicator for the second MIMO layer; and
    responsive to receiving the NACK message for the first data block and the NACK message for the second data block, retransmitting the second data block from the radio access network over the second MIMO layer to the wireless terminal during the second TTI.

8. The method of claim 7 wherein retransmitting the second data block during the second TTI comprises retransmitting the second data block without transmitting data over the first MIMO layer during the second TTI.

9. The method of claim 7 further comprising:
    responsive to receiving an acknowledgment (ACK) message for the retransmission of the second data block during the second TTI, transmitting downlink signaling from the radio access network to the wireless terminal for a third TTI wherein the downlink signaling for the third TTI includes a discontinuous transmission (DTX) indicator for the second MIMO layer and a retransmission data indicator for the first MIMO layer; and responsive to receiving the ACK message for the retransmission of the second data block during the second TTI, retransmitting the first data block from the radio access network over the first MIMO layer to the wireless terminal during the third TTI.

10. The method of claim 7 further comprising:
before transmitting the first and second data blocks during the first transmission time interval, selecting first and second HARQ process identifications for the first and second MIMO layers; and
before transmitting the downlink signaling for the second TTI, generating a HARQ-DTX process identification for the first MIMO layer as a function of the second HARQ process identification for the second MIMO layer.

11. A method of operating a node of a radio access network, the method comprising:
transmitting first and second data blocks from the radio access network over respective first and second multiple-input-multiple-output (MIMO) layers of a MIMO wireless channel to a wireless terminal during a first transmission time interval (TTI) in accordance with a first MIMO rank;
responsive to receiving a negative acknowledgment (NACK) message for the second data block and responsive to receiving a preference for a second MIMO rank less than the first MIMO rank from the wireless terminal, transmitting downlink signaling for a second TTI from the radio access network to the wireless terminal wherein the downlink signaling includes a discontinuous transmission (DTX) indicator for the first MIMO layer and a retransmission data indicator for the second MIMO layer; and
responsive to receiving the NACK message for the second data block and responsive to receiving the preference for the second MIMO rank less than the first MIMO rank, retransmitting the second data block from the radio access network over the second MIMO layer to the wireless terminal during the second TTI in accordance with the first MIMO rank.

12. The method of claim 11 wherein transmitting the downlink signaling comprises transmitting the downlink signaling responsive to receiving a NACK for the first data block, responsive to receiving the NACK message for the second data block, and responsive to receiving the preference for the second MIMO rank less than the first rank.

13. The method of claim 12 wherein retransmitting the second data block during the second TTI comprises retransmitting the second data block without transmitting data over the first MIMO layer during the second TTI.

14. The method of claim 11 further comprising:
responsive to receiving an acknowledgment (ACK) message for the retransmission of the second data block during the second TTI, transmitting downlink signaling from the radio access network to the wireless terminal for a third TTI wherein the downlink signaling for the third TTI includes a retransmission data indicator for the first MIMO layer and a discontinuous transmission (DTX) indicator for the second MIMO layer; and
responsive to receiving the acknowledgment (ACK) message for the retransmission of the second data block during the second TTI, retransmitting the first data block from the radio access network over the second MIMO layer to the wireless terminal during the third TTI in accordance with the first MIMO rank.

15. The method according to claim 11 further comprising:
before transmitting the first and second data blocks during the first transmission time interval, selecting first and second HARQ process identifications for the first and second MIMO layers; and
before transmitting the downlink signaling for the second TTI, generating a HARQ-DTX process identification for the first MIMO layer as a function of the second HARQ process identification for the second MIMO layer.

16. A node of a radio access network, the node comprising:
a transceiver configured to communicate with a wireless terminal over a multiple-input-multiple-output (MIMO) wireless channel; and
a processor coupled to the transceiver, wherein the processor is configured to,
select first and second HARQ process identifications for first and second MIMO layers of the MIMO wireless channel;
transmit first and second data blocks through the transceiver respectively over the first and second MIMO layers of the MIMO wireless channel to a wireless terminal during a first transmission time interval (TTI),
generate a HARQ discontinuous transmission (HARQ-DTX) process identification for the first MIMO layer as a function of the second HARQ process identification for the second MIMO layer responsive to receiving a negative acknowledgment (NACK) message for the second data block;
transmit downlink signaling for a second TTI through the transceiver to the wireless terminal responsive to receiving the NACK message for the second data block, wherein the downlink signaling includes a discontinuous transmission (DTX) indicator for the first MIMO layer and a retransmission data indicator for the second MIMO layer, wherein the downlink signaling for the second TTI including the DTX indicator and the retransmission data indicator is transmitted using a downlink signaling channel, and
retransmit the second data block through the transceiver over the second MIMO layer to the wireless terminal during the second TTI responsive to receiving the NACK message for the second data block, wherein the second data block is retransmitted over the second MIMO layer using a downlink traffic channel.

17. The node of claim 16 wherein the processor is configured to transmit the downlink signaling responsive to receiving an acknowledgment (ACK) message for the first data block and responsive to receiving the NACK message for the second data block, and wherein the processor is configured to retransmit the second data block responsive to receiving the ACK message for the first data block and responsive to receiving the NACK message for the second data block.

18. The node of claim 16 wherein the processor is further configured to,
transmit downlink signaling from the radio access network to the wireless terminal for the first TTI responsive to selecting the first and second HARQ process identifications,
wherein transmitting the downlink signaling for the second TTI comprises transmitting the downlink signaling for the second TTI responsive to generating the HARQ- DTX process identification and responsive to receiving the NACK message for the second data block, and wherein retransmitting the second data block comprises retransmitting the second data block responsive to generating the HARQ-DTX process identification and responsive to receiving the NACK message for the second data block.

19. The node of claim 16 wherein the processor is configured to retransmit the second data block without transmitting data over the first MIMO layer during the second TTI.

20. The node of claim 16 wherein the downlink signaling channel is a High Speed Shared Control Channel (HS-SCCH), and wherein the downlink traffic channel is a High Speed Physical Downlink Shared Channel (HS-PDSCH).

21. A node of a radio access network, the node comprising:
a transceiver configured to communicate with a wireless terminal over a multiple-input-multiple-output (MIMO) wireless channel; and
a processor coupled to the transceiver, wherein the processor is configured to,
  transmit first and second data blocks through the transceiver over respective first and second MIMO layers of the MIMO wireless channel to a wireless terminal during a first transmission time interval (TTI),
  transmit downlink signaling for a second TTI through the transceiver to the wireless terminal responsive to receiving a negative acknowledgment (NACK) message for the first data block and a NACK message for the second data block, wherein the downlink signaling includes a discontinuous transmission (DTX) indicator for the first MIMO layer and a retransmission data indicator for the second MIMO layer, and
  retransmit the second data block through the transceiver over the second MIMO layer to the wireless terminal during the second TTI responsive to receiving the NACK message for the first data block and the NACK messages for the second data block.

22. The node of claim 21 wherein the processor is configured to retransmit the second data block during the second TTI by retransmitting the second data block without transmitting data over the first MIMO layer during the second TTI.

23. A node of a radio access network, the node comprising:
a transceiver configured to communicate with a wireless terminal over a multiple-input-multiple-output (MIMO) wireless channel; and
a processor coupled to the transceiver, wherein the processor is configured to,
  transmit first and second data blocks through the transceiver over respective first and second MIMO layers of the MIMO wireless channel to a wireless terminal in accordance with a first MIMO rank during a first transmission time interval (TTI),
  transmit downlink signaling for a second TTI through the transceiver to the wireless terminal responsive to receiving a negative acknowledgement (NACK) message for the second data block and responsive to receiving a preference for a second MIMO rank less than the first rank from the wireless terminal, wherein the downlink signaling includes a discontinuous transmission (DTX) indicator for the first MIMO layer and a retransmission data indicator for the second MIMO layer, and
  retransmit the second data block through the transceiver over the second MIMO layer to the wireless terminal during the second TTI in accordance with the first MIMO rank responsive to receiving the NACK message for the second data block and responsive to receiving the NACK message for the second data block and responsive to receiving the preference for the second MIMO rank less than the first MIMO rank.

24. The node of claim 23 wherein the processor is further configured to transmit the downlink signaling responsive to receiving a NACK for the first data block, responsive to receiving the NACK message for the second data block, and responsive to receiving the preference for the second MIMO rank less than the first rank.

* * * * *